US012482615B2

(12) United States Patent
Sun et al.

(10) Patent No.: US 12,482,615 B2
(45) Date of Patent: Nov. 25, 2025

(54) POWER SUPPLY SYSTEM AND SWITCH UNIT

(71) Applicant: Huawei Digital Power Technologies Co., Ltd., Shenzhen (CN)

(72) Inventors: Jisheng Sun, Shanghai (CN); Jianfei Ma, Shanghai (CN); Xiufeng Zhang, Dongguan (CN); Xiaokang Tian, Shenzhen (CN); Jiajing Wu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 180 days.

(21) Appl. No.: 18/323,612

(22) Filed: May 25, 2023

(65) Prior Publication Data

US 2023/0386763 A1 Nov. 30, 2023

(30) Foreign Application Priority Data

May 27, 2022 (CN) ........................ 202210589077.1
Aug. 3, 2022 (CN) ........................ 202210928742.5

(51) Int. Cl.
*H01H 3/08* (2006.01)
*H01H 9/02* (2006.01)
*H01H 9/36* (2006.01)

(52) U.S. Cl.
CPC ................ *H01H 9/36* (2013.01); *H01H 3/08* (2013.01); *H01H 9/02* (2013.01)

(58) Field of Classification Search
CPC .......... H01H 1/2041; H01H 3/08; H01H 9/36; H01H 9/02; H01H 9/341; H01H 9/30;
(Continued)

(56) References Cited

U.S. PATENT DOCUMENTS 7,728,247 B2 * 6/2010 Pikkala .................. H01H 9/342
218/35
9,123,481 B2 * 9/2015 Dahl .................. H01H 71/0214
(Continued)

FOREIGN PATENT DOCUMENTS

CN 105097374 A 11/2015
CN 109559946 A 4/2019
(Continued)

*Primary Examiner* — William A Bolton
(74) *Attorney, Agent, or Firm* — Maier & Maier, PLLC

(57) ABSTRACT

A power supply system includes a control unit, a switch, a direct current source, and a power change unit. The switch includes a switch unit and an operation mechanism. The operation mechanism is configured to receive a switch-off signal and control the switch unit to be turned on or off. The switch unit includes a first static contact, a movable contact, and a first arc extinguishing structure. When the switch unit is turned off, the movable contact rotates about a rotation center relative to the first static contact by a first included angle to be separated from the first static contact, to generate a first arc. The first arc extinguishing structure includes a first arc extinguishing end part and a second arc extinguishing end part. A connection line between the first arc extinguishing end part and the rotation center of the movable contact is a first line.

20 Claims, 34 Drawing Sheets

(58) Field of Classification Search
CPC .......... H01H 9/345; H01H 9/362; H01H 9/46; H01H 2009/365; H01H 33/596
USPC ........ 218/1, 15, 18, 31, 30, 34, 45, 46, 156, 218/155
See application file for complete search history.

(56) References Cited

U.S. PATENT DOCUMENTS

| | | | | |
|---|---|---|---|---|
| 9,431,197 | B2 * | 8/2016 | Engewald | H01H 33/182 |
| 9,508,495 | B2 * | 11/2016 | Philip | H01H 1/2041 |
| 10,418,215 | B2 * | 9/2019 | Grumel | H01H 71/025 |
| 10,896,789 | B2 * | 1/2021 | Strand | H01H 1/42 |
| 2021/0375566 | A1 * | 12/2021 | Lilja | H01H 33/04 |
| 2023/0121284 | A1 * | 4/2023 | Zhang | H02M 1/32 200/336 |

FOREIGN PATENT DOCUMENTS

| | | | |
|---|---|---|---|
| CN | 109559947 | A | 4/2019 |
| CN | 111900059 | A | 11/2020 |
| CN | 114464489 | A | 5/2022 |
| DE | 102011118418 | A1 | 5/2013 |

* cited by examiner

POWER SUPPLY SYSTEM AND SWITCH UNIT

CROSS-REFERENCE TO RELATED APPLICATION

This application claims priority to Chinese Patent Application No. 202210928742.5, filed on Aug. 3, 2022, and Chinese Patent Application No. 202210589077.1, filed on May 27, 2022. Both of the aforementioned applications are hereby incorporated by reference in their entireties.

TECHNICAL FIELD

The embodiments relate to the field of switch technologies, a power supply system, and a switch unit.

BACKGROUND

A switch is an electronic component for conducting or cutting off a current in one or more circuits. The switch may play a control and protection role in a power system. An arc is generated when the switch cuts off a current. The generated arc prolongs break time of the circuit. Due to a high temperature of the arc, the switch is prone to deformation and melting. Consequently, safe operation of a power supply system is endangered, and serious casualties and property losses are caused. In a process of using the switch, the arc needs to be extinguished, to reduce a harm caused by the arc. However, in a conventional technology, an arc extinguishing effect is not good enough.

SUMMARY

The embodiments may provide a power supply system and a switch unit with a good arc extinguishing effect.

According to a first aspect, the embodiments may provide a power supply system. The power supply system includes a control unit, a switch, a direct current source, and a power change unit. The switch is electrically connected between the direct current source and the power change unit. The control unit is configured to send a switch-off signal to the switch when the direct current source or the power change unit is faulty. The switch includes a switch unit and an operation mechanism. The operation mechanism is configured to receive the switch-off signal and control the switch unit to be turned on or off. The switch unit includes a first static contact, a movable contact, and a first arc extinguishing structure. The movable contact has a rotation center. The movable contact can rotate about the rotation center relative to the first static contact. The movable contact is configured to connect to or disconnect from the first static contact. When the switch unit is turned off, the movable contact rotates about the rotation center relative to the first static contact by a first included angle to be separated from the first static contact, to generate a first arc. The first arc extinguishing structure is located around the first static contact and is configured to extinguish the first arc. The first arc extinguishing structure includes a first arc extinguishing end part and a second arc extinguishing end part. A connection line between the first arc extinguishing end part and the rotation center of the movable contact is a first line. A connection line between the second arc extinguishing end part and the rotation center of the movable contact is a second line. An included angle between the first line and the second line is a second included angle. An angle value of the second included angle is greater than or equal to an angle value of the first included angle.

When the second included angle is greater than or equal to the first included angle, a size of the first arc extinguishing structure is greater than or at least equal to a size of the first arc. In other words, because the first arc moves away from the movable contact toward the first arc extinguishing structure, when the second included angle is greater than or equal to the first included angle, the first arc extinguishing structure can cover a part or the whole of a movement path of the first arc, so that the first arc can be better cut off and extinguished, to improve an arc extinguishing effect. The rotation center of the movable contact is an axis of rotation of the movable contact and is also referred to as a rotation axis of the movable contact.

In a possible implementation, the first static contact includes a first contact end. The movable contact includes a first end. The first end is configured to connect to or disconnect from the first contact end. The first arc is formed between the first end and the first contact end. The first end and the first contact end are located between the first line and the second line, to improve an arc extinguishing effect. The first arc is formed between the first end and the first contact end. In other words, arc feet at two ends of the first arc are respectively located at the first end and the first contact end. The first end and the first contact end are located between the first line and the second line, to improve an arc extinguishing effect of the first arc extinguishing structure.

In a possible implementation, when the movable contact is disconnected from the first static contact, a connection line between the first contact end and the rotation center of the movable contact is a third line, a connection line between the first end and the rotation center of the movable contact is a fourth line, and an included angle between the third line and the fourth line is the first included angle. A position of the first contact end obtained from the third line and a position of the first end obtained from the fourth line coincide when the movable contact is connected to the first static contact. A position of the first arc extinguishing end part obtained from the first line and a position of the second arc extinguishing end part obtained from the second line are positions that can maximize the second included angle, so that the first arc extinguishing structure can effectively extinguish an arc.

In a possible implementation, the third line and the fourth line are located between the first line and the second line, to improve an arc extinguishing effect. In this way, the first arc extinguishing structure can better cut off the first arc, to improve an arc extinguishing effect.

In a possible implementation, an end of the first contact end has a first static contact surface. The first static contact surface has a first contact point. The first contact point is located at an end that is of the first static contact surface and that is adjacent to the first arc extinguishing structure. The first end is configured to be separated from the first contact end through the first contact point when the first end is disconnected from the first contact end. In this implementation, the first contact point is a position at which the first end of the movable contact is separated from the first static contact and is also a position at which the first arc starts. When the first contact point is located at the end that is of the first static contact surface and that is adjacent to the first arc extinguishing structure, once being generated, the first arc can quickly enter the first arc extinguishing structure to be cut off and extinguished by the first arc extinguishing structure, to improve an arc extinguishing effect.

In a possible implementation, when the movable contact is disconnected from the first static contact, a first fracture is formed between the movable contact and the first static contact. The first arc extinguishing structure includes a plurality of first arc extinguishing gate plates that are sequentially arranged at spacings. A gap between every two adjacent first arc extinguishing gate plates forms a first arc extinguishing opening. The first arc extinguishing opening is communicated with and disposed opposite to the first fracture, to improve an arc extinguishing effect. The first arc is cut by the first arc extinguishing gate plate and enters the first arc extinguishing opening. The first arc extinguishing opening is equivalent to an air resistor. The first arc may need to break through the first arc extinguishing opening and therefore may consume energy. The first arc extinguishing structure has a plurality of first arc extinguishing openings, and the plurality of first arc extinguishing openings can improve an arc extinguishing effect.

In a possible implementation, a housing includes a first side frame and a second side frame that are disposed opposite to each other in a first direction. The first side frame is disposed more adjacent to the first static contact than the second side frame. The second side frame is disposed more adjacent to the second static contact than the first side frame. In the first direction, the first arc extinguishing structure is located between the first side frame and the second side frame. The first arc extinguishing structure includes the plurality of first arc extinguishing gate plates that are arranged at spacings in the first direction.

The first arc extinguishing structure is located between the first side frame and the second side frame. More first arc extinguishing gate plates can be accommodated between the first side frame and the second side frame. The plurality of first arc extinguishing gate plates may be arranged at spacings in the first direction. The first arc extinguishing gate plates extend in a second direction, to improve an arc extinguishing effect. In addition, the first static contact is disposed adjacent to the first side frame. The first end of the movable contact is disposed adjacent to the second side frame when the first end is disconnected. Two ends of the first arc are respectively located at the first static contact and the first end, so that the first arc extinguishing structure can effectively extinguish the first arc. The first arc and the first arc extinguishing structure are disposed opposite to each other in the second direction, so that the first arc extinguishing structure can accommodate most of the first arc, to extinguish the first arc. The first arc extinguishing gate plate is made of metal and is configured to cut the first arc to extinguish the arc.

In a possible implementation, a size of the first arc extinguishing structure in the first direction is greater than a size of the first fracture in the first direction, to improve an arc extinguishing effect. Because the first arc is formed in the first fracture, the size of the first arc extinguishing structure in the first direction is greater than a size of the first arc in the first direction, so that the first arc can be effectively absorbed, to improve an arc extinguishing effect.

In a possible implementation, a ratio of a size of a gap between adjacent first arc extinguishing gate plates in the first direction to a size of the first arc extinguishing gate plate in the first direction is (1-1.5):1. In other words, a ratio of a size of the first arc extinguishing opening in the first direction to the size of the first arc extinguishing gate plate in the first direction is (1-1.5):1. This size ratio setting may enable a large quantity of first arc extinguishing gate plates to be distributed in the housing, to improve an arc extinguishing effect.

In a possible implementation, sizes of the first arc extinguishing gate plates between the first arc extinguishing end part and the second arc extinguishing end part in the first direction are the same, so that a processing process is simple.

In a possible implementation, sizes of the first arc extinguishing gate plates in the second direction gradually increase from the middle of the first arc extinguishing structure to two ends, so that an end that is of the first arc extinguishing structure and that faces the movable contact is arc-shaped, to increase a size of the gate plate for cutting off the first arc. Sizes of the first arc extinguishing gate plates between the first arc extinguishing end part and the second arc extinguishing end part in the first direction are the same, so that a processing process is simple.

In a possible implementation, the first arc extinguishing structure is disposed in an arc shape and is disposed around a periphery of the first fracture, to improve an arc extinguishing effect. The arc-shaped first arc extinguishing structure may adapt to a case in which the housing is a circular structure or an elliptical structure.

In a possible implementation, at least a part of the first arc extinguishing structure is an arc-shaped structure. The at least a part of the first arc extinguishing structure is set to the arc-shaped structure, so that a quantity of first arc extinguishing gate plates can be increased, to improve an arc extinguishing effect.

In a possible implementation, the first arc extinguishing structure is an arc-shaped structure. In an implementation, a second arc extinguishing structure in the switch unit is an arc-shaped structure. The first arc extinguishing structure and the second arc extinguishing structure are set to the arc-shaped structures, so that a quantity of arc extinguishing gate plates in the switch unit can be increased, to improve an arc extinguishing effect. Alternatively, a same quantity of arc extinguishing gate plates in the first arc extinguishing structure and the second arc extinguishing structure may be distributed more compactly, so that a size of the first arc extinguishing structure and the second arc extinguishing structure is smaller, and a size of the switch unit may be reduced.

In a possible implementation, an angle value of the second included angle is greater than or equal to 120°. In this way, the first arc extinguishing structure has a good arc extinguishing effect.

In a possible implementation, the first arc extinguishing structure is an arc-shaped structure. An angle value of the second included angle is greater than or equal to 140° and less than or equal to 180°. In this way, the first arc extinguishing structure has a good arc extinguishing effect.

In a possible implementation, the first arc extinguishing structure includes a plurality of first arc extinguishing gate plates that are sequentially arranged at spacings. The plurality of first arc extinguishing gate plates may be arranged in a sector shape. Extension directions of two adjacent first arc extinguishing gate plates intersect. In this implementation, the plurality of first arc extinguishing gate plates may be arranged in the sector shape. One end of each of the first arc extinguishing gate plates is folded toward the rotation center, and the other end of each of the first arc extinguishing gate plates is unfolded away from the rotation center, so that more first arc extinguishing gate plates can be accommodated in the switch unit, to improve an arc extinguishing effect.

In a possible implementation, the first arc extinguishing structure includes a first arc extinguishing part and a second arc extinguishing part. The first arc extinguishing part includes a plurality of first arc extinguishing gate plates that are sequentially arranged at spacings. The second arc extinguishing part includes a plurality of first arc extinguishing gate plates that are sequentially arranged at spacings. An arrangement direction of the plurality of first arc extinguishing gate plates in the first arc extinguishing part intersects with an arrangement direction of the plurality of first arc extinguishing gate plates in the second arc extinguishing part. In this implementation, the arrangement direction of the plurality of first arc extinguishing gate plates in the first arc extinguishing part intersects with the arrangement direction of the plurality of first arc extinguishing gate plates in the second arc extinguishing part, so that the first arc extinguishing gate plates in the first arc extinguishing structure are distributed more flexibly. A shape of the first arc extinguishing structure may be flexibly set based on a structure in the switch unit, so that more first arc extinguishing gate plates are placed in limited space, to improve an arc extinguishing effect.

In a possible implementation, all the first arc extinguishing gate plates in the first arc extinguishing part are sequentially arranged in a direction from the second arc extinguishing part to the first static contact, so that the first arc extinguishing part can effectively extinguish the first arc. In this implementation, an extension direction of the first arc extinguishing part is adjacent to the first static contact, so that the first arc generated when the first static contact is separated from the movable contact can quickly enter the first arc extinguishing part, to improve an arc extinguishing effect.

In a possible implementation, the first arc extinguishing part is an arc-shaped structure. The plurality of first arc extinguishing gate plates in the first arc extinguishing part are arranged along a first arc shape. The first arc extinguishing part is more adjacent to the first static contact than the second arc extinguishing part. The plurality of first arc extinguishing gate plates in the second arc extinguishing part are arranged along a second arc shape. A curvature radius of the first arc shape is less than a curvature radius of the second arc shape. A larger curvature radius indicates a larger bending degree. In this implementation, a curvature radius of the first arc extinguishing part is less than a curvature radius of the second arc extinguishing part. Ends that are of the first arc extinguishing gate plates in the second arc extinguishing part and that are adjacent to the rotation center are gathered more closely, to reduce space consumption and reduce a size of the second arc extinguishing part. Because the first arc extinguishing part is more adjacent to the first static contact, the first arc extinguishing part has a narrow disposing space. The curvature radius of the first arc extinguishing part is reduced, to facilitate installation and manufacturing and reduce process difficulty. In this implementation, the first arc extinguishing part and the second arc extinguishing part are used in combination, to improve an arc extinguishing effect and also simplify a manufacturing process.

In a possible implementation, the plurality of first arc extinguishing gate plates in the first arc extinguishing part are arranged in a sixth direction. The sixth direction intersects with an extension direction of the first arc extinguishing gate plates in the first arc extinguishing part. The first arc extinguishing part is more adjacent to the first static contact than the second arc extinguishing part. The second arc extinguishing part is an arc-shaped structure. The plurality of first arc extinguishing gate plates in the second arc extinguishing part are arranged along a second arc shape. The sixth direction intersects with an extension direction of the second arc shape. In this implementation, the first arc extinguishing structure also has a good arc extinguishing effect, and may adapt to different application scenarios, to improve installation flexibility of the first arc extinguishing structure.

In a possible implementation, the plurality of first arc extinguishing gate plates in the first arc extinguishing part are arranged in a seventh direction. The seventh direction intersects with an extension direction of the first arc extinguishing gate plates in the first arc extinguishing part. The plurality of first arc extinguishing gate plates in the second arc extinguishing part are arranged in an eighth direction. The eighth direction intersects with an extension direction of the first arc extinguishing gate plates in the second arc extinguishing part. The seventh direction intersects with the eighth direction. The first arc extinguishing part is more adjacent to the first static contact than the second arc extinguishing part. In this implementation, the first arc extinguishing structure also has a good arc extinguishing effect, and may adapt to different application scenarios, to improve installation flexibility of the first arc extinguishing structure.

In a possible implementation, the first arc extinguishing structure includes the plurality of first arc extinguishing gate plates that are sequentially arranged at spacings. A first groove that is concave in a direction away from the movable contact is disposed at an end that is of the first arc extinguishing gate plate and that faces the movable contact. The first end that is of the movable contact and that is away from the rotation center is located in the first groove and is spaced from an inner wall of the first groove. In this implementation, the first end of the movable contact moves in the first groove. The first grooves in all the first arc extinguishing gate plates form a channel for the first end of the movable contact to move. The first arc generated when the first end is separated from the first static contact can more quickly enter the first arc extinguishing structure, to improve an arc extinguishing effect. In addition, a length of the inner wall of the first groove is increased, thereby improving an effect of cutting off the first arc.

In a possible implementation, the first end of the movable contact includes a first movable contact plate and a second movable contact plate that are arranged at a spacing. When the movable contact is connected to the first static contact, the first movable contact plate and the second movable contact plate are clamped on two sides of the first static contact and electrically connected to the first static contact. A first extension part is disposed at an end that is of the first movable contact plate and that is away from the rotation center. The first extension part extends into the first groove. In this implementation, the first extension part and the first movable contact plate are of an integrated structure. The first extension part is electrically connected to the first movable contact plate. The first extension part is located in the first groove, so that when the first movable contact plate and the first static contact generate the first arc, the first arc is guided into the first groove in the first arc extinguishing gate plate by using the first extension part, to improve an arc extinguishing effect.

In a possible implementation, the first extension part includes a first bent part and a first horizontal part. The first horizontal part and the first movable contact plate are located at two ends of the first bent part in a third direction. The first horizontal part is located in the first groove. In this implementation, the first horizontal part is disposed in a direction approaching the second movable contact plate by using the first bent part, so that the first horizontal part can be accommodated in the first groove, and a size of the first arc extinguishing gate plate can be equivalent to a size of the movable contact in the third direction, to reduce a size of the switch unit in the third direction.

In a possible implementation, a first insulation structure is disposed on the first arc extinguishing structure. The first insulation structure covers an end face that is of the first arc extinguishing gate plate and that faces the rotation center and covers a part of a side wall of the first groove. In this way, when the first arc is generated, the first insulation structure is heated, so that the first insulation structure absorbs heat and burns to generate more hot gases and more hot substances. The hot gases and the hot substances move toward the groove bottom of the first groove and drive the first arc to move toward the groove bottom of the first groove, to improve an arc extinguishing effect.

In a possible implementation, a groove wall of the first groove includes a first side wall and a second side wall that are disposed opposite to each other in the third direction, and a first bevel wall and a second bevel wall that are located between the first side wall and the second side wall. The first bevel wall and the second bevel wall intersect at an included angle, and an end that is of the first extension part and that is away from the first movable contact plate is disposed directly opposite to the included angle between the first bevel wall and the second bevel wall, to improve an arc extinguishing effect. In this implementation, the switch unit includes two first insulation structures that are disposed opposite to each other in the third direction. The end face that is of the first arc extinguishing gate plate and that faces the rotation midline includes a first sub end face and a second sub end face that are separated by the first groove. The first sub end face is disposed adjacent to the first side wall. The second sub end face is disposed adjacent to the second side wall. One first insulation structure covers the first sub end face that is of the first arc extinguishing gate plate and that faces the rotation midline and covers the first side wall of the first groove. The other first insulation structure covers the second sub end face that is of the first arc extinguishing gate plate and that faces the rotation midline and covers the second side wall of the first groove.

In a possible implementation, the first extension part and the first movable contact plate are coplanar. The groove wall of the first groove includes a first side wall and a second side wall that are disposed opposite to each other in the third direction. The first arc extinguishing gate plate includes a first surface and a second surface that are disposed opposite to each other in the third direction. The first side wall is disposed adjacent to the first surface. The second side wall is disposed adjacent to the second surface. A size between the first side wall and the first surface in the third direction is less than a size between the second side wall and the second surface in the third direction, so that the first extension part can extend into the first groove. In this implementation, because the first extension part and the first movable contact plate are coplanar, if thicknesses of the two gate pins that are of the first groove and that face the rotation center are the same, the first extension part cannot extend into the first groove. In this implementation, a thickness of an upper gate pin of the first groove is set to be less than a thickness of a lower gate pin. In other words, a size between the first side wall and the first surface in the third direction is less than a size between the second side wall and the second surface in the third direction, so that the first extension part can extend into the first groove, and a size of the switch unit in the third direction does not need to be additionally increased.

In a possible implementation, the first arc extinguishing structure includes a plurality of first arc extinguishing gate plates that are sequentially arranged at spacings. A first arc extinguishing gate plate located at the first arc extinguishing end part is a first end-part arc extinguishing gate plate. The first end-part arc extinguishing gate plate is electrically connected to the first static contact. The first end-part arc extinguishing gate plate is electrically connected to the first static contact, so that the first arc can be guided from the first static contact into the first end-part arc extinguishing gate plate, and sequentially flows into all the first arc extinguishing gate plates by using the first end-part arc extinguishing gate plate, and the first arc extinguishing gate plates are fully used, to improve an arc extinguishing effect.

In a possible implementation, the first end-part arc extinguishing gate plate includes a first curved part and a first flat plate part that are connected to each other. The first arc extinguishing gate plate adjacent to the first flat plate part and the first flat plate part are arranged at a spacing. An end that is of the first curved part and that is away from the first flat plate part is electrically connected to the first static contact. The first curved part is configured to drive the first arc to move toward the first arc extinguishing structure when the first contact end is separated from the first end, to improve an arc extinguishing effect. When the switch unit is turned off, there is a current in the first curved part, and the first curved part generates a magnetic field line in an area in which the first arc is located. The magnetic field line generates, on the first arc, an ampere force in a direction toward the first arc extinguishing structure. The ampere force drives the first arc to move toward the first arc extinguishing structure. A path of the first arc is extended to cool the first arc, and the first arc can be more guided into the first arc extinguishing structure, to jointly improve an arc extinguishing effect.

In a possible implementation, the first curved part includes a first straight subpart, a first curved subpart, a second straight subpart, a second curved subpart, and a third straight subpart that are sequentially connected. The first static contact further includes a first connection end. Compared with the first contact end, the first contact end is configured to connect to or disconnect from the first end. An end that is of the first straight subpart and that is away from the first curved subpart is connected to the first connection end. Curvature centers of the first curved subpart and the second curved subpart are disposed away from the first static contact. The second curved subpart is disposed adjacent to the first contact end, to extend a movement path of the first arc toward the first arc extinguishing structure. The two curved subparts may extend the movement path of the first arc toward the first arc extinguishing structure, to improve an arc extinguishing effect.

In an implementation, the first curved part is disposed in a triangle shape, so that internal space of a housing can be fully used, and internal structure distribution is more appropriate, to reduce a size of the switch unit. The two curved subparts are disposed, to improve an arc extinguishing effect.

In an implementation, the second curved subpart is disposed adjacent to the first contact end, so that the first arc can be transferred into the second curved subpart by using the first contact end, to improve an arc extinguishing effect.

In a possible implementation, the first curved part includes a first straight subpart, a first curved subpart, and a second straight subpart that are sequentially connected. The first straight subpart is fastened to the first contact end. The second straight subpart is connected to the first flat plate part. The first curved subpart is located on a periphery of the first contact end. An angle value of a sixth included angle between the first straight subpart and the second straight subpart is less than or equal to 45°. In this implementation, when the first static contact is separated from the first end of the movable contact, the first curved part is electrically connected to the first static contact, so that at least a part of the first arc can flow into the first curved part by using the first static contact. There is a current in the first curved part. According to an amperes rule in an electrified solenoid, a magnetic field line is generated on an inner side of the first curved part. According to a left-hand rule, the magnetic field line generates, on the first arc, an ampere force in a direction toward the first arc extinguishing structure. The ampere force drives the first arc to move toward the first arc extinguishing structure. A path of the first arc is extended to cool the first arc, and the first arc can be more guided into the first arc extinguishing structure, to jointly improve an arc extinguishing effect. In this implementation, the first contact end is disposed more adjacent to the first curved subpart than the first connection end, so that a magnetic field line at a position of the first arc is increased, and a speed of driving the first arc to move toward the first arc extinguishing structure is increased, to improve an arc extinguishing effect.

In a possible implementation, the first static contact is located on a side that is of the first curved part and that is adjacent to the movable contact. A first bent part is disposed between the first contact end and the first connection end. A curvature center of the first bent part faces the first curved part. The first bent part is configured to drive the first arc to move toward the first arc extinguishing structure when the first static contact is separated from the first end of the movable contact, to improve an arc extinguishing effect. The first bent part also has a curved section. When the first static contact is separated from the first end of the movable contact, a current direction in the first static contact is flowing from the first connection end to the first contact end. According to an amperes rule in an electrified solenoid, a magnetic field line outward perpendicular to paper is generated on an inner side of the first bent part, and a magnetic field line inward perpendicular to paper is generated on an outer side of the first bent part. The first arc is located in an external area of the first bent part. The magnetic field line generates, on the first arc, an ampere force in a direction toward the first arc extinguishing structure. The ampere force drives the first arc to move toward the first arc extinguishing structure. A path of the first arc is extended to cool the first arc, and the first arc can be more guided into the first arc extinguishing structure, to jointly improve an arc extinguishing effect.

In a possible implementation, the first arc extinguishing structure further includes a first curved gate plate. A curvature center of the first curved gate plate is disposed away from the movable contact. The first curved gate plate is configured to drive the first arc to move toward the first arc extinguishing structure, to improve an arc extinguishing effect. When the first static contact is separated from the first end of the movable contact, a current sequentially enters the first arc extinguishing gate plates distributed in the first direction by using the first end-part arc extinguishing gate plate. When the current flows through the first curved gate plate, a curvature center of the first curved gate plate is disposed away from the movable contact. A current direction is flowing from the first connection end to the first contact end. According to an amperes rule in an electrified solenoid, a magnetic field line outward perpendicular to paper is generated on an inner side of the first curved gate plate, and a magnetic field line inward perpendicular to paper is generated on an outer side of the first curved gate plate. The first arc is located in an external area of the first curved gate plate. The magnetic field line generates, on the first arc, an ampere force in a direction toward the first arc extinguishing structure. The ampere force drives the first arc to move toward the first arc extinguishing structure. A path of the first arc is extended to cool the first arc, and the first arc can be more guided into the first arc extinguishing structure, to jointly improve an arc extinguishing effect.

In a possible implementation, a first arc extinguishing gate plate located at the second arc extinguishing end is a second end-part arc extinguishing gate plate. The second end-part arc extinguishing gate plate includes a second curved part and a second flat plate part that are connected to each other. The first arc extinguishing gate plate adjacent to the second flat plate part and the second flat plate part are arranged at a spacing in a first direction. An end that is of the second curved part and that is away from the second flat plate part is disposed adjacent to the first end of the movable contact. In an implementation, the second flat plate part is disposed in parallel to the first arc extinguishing gate plate. The second curved part is configured to drive the first arc to move toward the first arc extinguishing structure when the first static contact is separated from the first end of the movable contact, to improve an arc extinguishing effect.

In a possible implementation, the second curved part includes a fifth straight subpart, a fourth curved subpart, and a sixth straight subpart that are sequentially connected. The fifth straight subpart is connected to the second flat plate part. A curvature center of the fourth curved subpart is disposed away from the first end. The fourth curved subpart is disposed adjacent to the first end, to extend a movement path of the first arc toward the first arc extinguishing structure. When the first static contact is separated from the first end of the movable contact, the first end is more adjacent to the fourth curved subpart, so that the first arc is better guided into the fourth curved subpart, to improve an arc extinguishing effect.

In a possible implementation, the switch unit further includes a first guide member. The first guide member is located on a side that is of the first arc extinguishing structure and that is away from the movable contact and is configured to discharge hot air generated by the first arc. The first guide member is used to discharge hot air sequentially and orderly to a maximum extent, thereby avoiding arc rollback caused by air flow disorder.

In a possible implementation, the first guide member is located at an end that is of the first arc extinguishing gate plate and that is away from the movable contact. The first guide member and the first arc extinguishing gate plate are disposed at an included angle. An extension direction of the first guide member points to an air flow outlet. In this implementation, the extension direction of the first guide member is disposed corresponding to a first outlet, to discharge hot air sequentially and orderly to a maximum extent, thereby avoiding arc rollback caused by air flow disorder. A quantity of the first guide members may be set based on a requirement. This is not limited.

In a possible implementation, the first guide member is located between a third side frame and the first arc extinguishing structure. The first guide member extends in the first direction. The third side frame and the first guide member are spaced to form a guiding channel. In this implementation, the first guide member extends in the first direction. After the first arc generated when the first end of the movable contact is separated from the first static contact enters the first arc extinguishing structure, the generated hot gas flows from a gap between the first arc extinguishing structure and the first guide member, bypasses an end of the first guide member to enter the guiding channel, and then flows through the guiding channel to be discharged out of the switch unit through the first outlet. In this implementation, the first guide member is disposed to increase a flow path of the hot gas generated by the first arc, so that the hot gas is effectively cooled, and a temperature of the gas discharged through the first outlet is low, to avoid that high-temperature hot gas discharged out of the switch unit burns an external device.

In a possible implementation, the switch unit further includes a second guide member. The second guide member is located between the third side frame and the second arc extinguishing structure. The second guide member includes a plurality of second guide submembers that are arranged at spacings in the first direction. There is a gap between two adjacent second guide submembers. The hot gas generated by the second arc passes through the gap between the two second guide submembers, to implement an effect of cooling the hot gas.

In a possible implementation, the switch unit further includes a second arc extinguishing structure and a second static contact. The movable contact is configured to connect to or disconnect from the second static contact. When the switch unit is turned off, the movable contact is separated from the second static contact, to generate a second arc. The second arc extinguishing structure is located around the second static contact and is configured to extinguish the second arc. The second arc extinguishing structure includes a third arc extinguishing end part and a fourth arc extinguishing end part. A connection line between the third arc extinguishing end part and the rotation center of the movable contact is a fifth line. A connection line between the fourth arc extinguishing end part and the rotation center of the movable contact is a sixth line. An included angle between the fifth line and the sixth line is a third included angle. An angle value of the third included angle is greater than or equal to the angle value of the first included angle.

When the third included angle is greater than or equal to the first included angle, a size of the second arc extinguishing structure is greater than or at least equal to a size of the second arc. In other words, because the second arc moves away from the movable contact toward the second arc extinguishing structure, when the third included angle is greater than or equal to the first included angle, the second arc extinguishing structure can cover a part or the whole of a movement path of the second arc, so that the second arc can be better cut off and extinguished, to improve an arc extinguishing effect.

A position of the third arc extinguishing end part obtained from the fifth line and a position of the fourth arc extinguishing end part obtained from the sixth line are positions that can maximize the third included angle, so that the second arc extinguishing structure can effectively extinguish an arc.

In a possible implementation, the first line and the fifth line are collinear, and the second line and the sixth line are collinear, so that a structure distribution of the switch unit may be more regular and neat.

In a possible implementation, a second end and a second contact end are located between the fifth line and the sixth line, to improve an arc extinguishing effect.

In a possible implementation, a distance between the third arc extinguishing end part and the fourth arc extinguishing end part is greater than a distance between the second end and the second contact end, to improve an arc extinguishing effect.

In a possible implementation, the switch unit further includes a connecting piece. The connecting piece is connected between the second arc extinguishing end part and the fourth arc extinguishing end part. The second arc extinguishing end part is connected to the fourth arc extinguishing end part through the connecting piece. For the first arc, the first arc is guided into the first arc extinguishing structure and flows out of the second end-part arc extinguishing gate plate. If the connecting piece is not disposed to connect the second end-part arc extinguishing gate plate and the fourth end-part arc extinguishing gate plate, there is a risk that a current flowing into the second end-part arc extinguishing gate plate breaks down air, flows into the first end of the movable contact, and then burns the first end of the movable contact. When the movable contact is disconnected, the movable contact has a risk of rebounding to the first static contact and the second static contact, affecting an off effect of the switch unit. By using the connecting piece, a current of the first arc extinguishing structure may be guided into the connecting piece, to reduce a risk of burning the first end of the movable contact and reduce a risk that the movable contact rebounds to the first static contact and the second static contact. For the second arc, the second arc is guided into the second arc extinguishing structure, to reduce a risk of burning the second end of the movable contact. The first arc extinguishing structure and the second arc extinguishing structure are connected through the connecting piece, so that potentials of the first arc extinguishing structure and the second arc extinguishing structure are equal, to improve safety of the switch unit.

In a possible implementation, the second arc extinguishing structure includes a plurality of second arc extinguishing gate plates that are sequentially arranged at spacings. A second arc extinguishing gate plate located at the fourth arc extinguishing end part is a fourth end-part arc extinguishing gate plate. The fourth end-part arc extinguishing gate plate is electrically connected to the second static contact. A second arc extinguishing gate plate located at the third arc extinguishing end part is a third end-part arc extinguishing gate plate. The third end-part arc extinguishing gate plate is electrically connected to the connecting piece. The second arc flows into the second arc extinguishing structure by using the fourth end-part arc extinguishing gate plate, and all or most of the second arc extinguishing gate plates in the second arc extinguishing structure can be fully used. The second arc extinguishing gate plates in the second arc extinguishing structure are all disposed at spacings, so that the second arc needs to break down the arranged second arc extinguishing gate plates one by one. This is equivalent to guiding the second arc into a large resistor (the second arc extinguishing structure), so that the second arc is cut off and extinguished, to improve an off effect of the switch unit.

In a possible implementation, when the second end of the movable contact is disconnected from the second static contact, a second fracture is formed between the second end and the second static contact. The second arc is formed in the second fracture. The second arc extinguishing structure includes a plurality of second arc extinguishing gate plates that are sequentially arranged at spacings. A gap between every two adjacent second arc extinguishing gate plates forms a second arc extinguishing opening. The second arc extinguishing opening is communicated with and disposed opposite to the second fracture, to improve an arc extinguishing effect.

In an implementation, the second static contact is disposed adjacent to the second side frame, and when receiving the switch-off signal, the operation mechanism controls the switch unit to be turned off, so that the second end of the movable contact is separated from the second static contact and moves toward the first side frame. In a process in which the second end of the movable contact is separated from the second static contact, a second arc is formed between the second end of the movable contact and the second static contact. The second arc extinguishing structure and the first arc extinguishing structure are distributed on two sides of the movable contact in a second direction. The second direction intersects with a first direction. In the first direction, the second arc extinguishing structure is located between the first side frame and the second side frame. The second arc extinguishing structure includes a plurality of second arc extinguishing gate plates that are arranged at spacings in the first direction. The second arc extinguishing structure is configured to cool the second arc. The second static contact is electrically connected to a second arc extinguishing gate plate adjacent to the second side frame, to improve a cooling effect of the second arc extinguishing structure on the second arc.

In a possible implementation, the first static contact and the second static contact are disposed opposite to each other in a fourth direction. The fourth direction intersects with the first direction. The first end and the second end of the movable contact are disposed opposite to each other in a fifth direction. The fifth direction intersects with the first direction. In an implementation, the fifth direction and the first direction are disposed at an included angle of 45°. In this arrangement, the first arc in the first fracture and the second arc in the second fracture may be radiated to the first arc extinguishing structure and the second arc extinguishing structure respectively, and each arc extinguishing gate plate in the first arc extinguishing structure and the second arc extinguishing structure is fully used, to improve an arc extinguishing effect.

In a possible implementation, a ratio of a size of a gap between adjacent second arc extinguishing gate plates in the first direction to a size of the second arc extinguishing gate plate in the first direction is (1-1.5):1. In other words, a ratio of a size of the second arc extinguishing opening in the first direction to the size of the second arc extinguishing gate plate in the first direction is (1-1.5):1. This size ratio setting may enable a large quantity of second arc extinguishing gate plates to be distributed in the housing, to improve an arc extinguishing effect. The second arc extinguishing structure is arranged along a fourth side frame, so that more first arc extinguishing gate plates can be distributed.

In a possible implementation, a size of the second arc extinguishing structure in the first direction is greater than a size of the second fracture in the first direction, to improve an arc extinguishing effect. Because the second arc is formed in the second fracture, the size of the second arc extinguishing structure in the first direction is greater than a size of the second arc in the first direction, so that the second arc can be effectively absorbed, to improve an arc extinguishing effect.

In a possible implementation, sizes of the second arc extinguishing gate plates between the third arc extinguishing end part and the fourth arc extinguishing end part in the first direction are the same, so that a processing process is simple.

In a possible implementation, sizes of the second arc extinguishing gate plates in the first direction gradually increase from the middle of the second arc extinguishing structure to two ends, so that an end that is of the second arc extinguishing structure and that faces the movable contact is arc-shaped, to increase a size of the gate plate for cutting off the second arc. Sizes of the second arc extinguishing gate plates between the third arc extinguishing end part and the fourth arc extinguishing end part in the first direction are the same, so that a processing process is simple.

In a possible implementation, the second arc extinguishing structure is disposed in an arc shape and is disposed around a periphery of the second fracture, to improve an arc extinguishing effect. The arc-shaped second arc extinguishing structure may adapt to a case in which the housing is a circular structure or an elliptical structure.

In a possible implementation, the second arc extinguishing gate plate that is in the second arc extinguishing structure and that is adjacent to the second side frame is a third end-part arc extinguishing gate plate. The third end-part arc extinguishing gate plate includes a third curved part and a third flat plate part that are connected to each other. The second arc extinguishing gate plate adjacent to the third flat plate part and the third flat plate part are arranged at a spacing in the first direction. An end that is of the third curved part and that is away from the third flat plate part is electrically connected to the second static contact. The third curved part is configured to drive the second arc to move toward the second arc extinguishing structure when the second static contact is separated from the second end of the movable contact, to improve an arc extinguishing effect.

In a possible implementation, the third curved part includes a seventh straight subpart, a fifth curved subpart, an eighth straight subpart, a sixth curved subpart, and a ninth straight subpart that are sequentially connected. The second static contact includes a second contact end and a second connection end. The second connection end is disposed more adjacent to the second side frame than the second contact end. The second contact end is configured to connect to or disconnect from the second end of the movable contact. An end that is of the seventh straight subpart and that is away from the fifth curved subpart is connected to the second connection end. Curvature centers of the fifth curved subpart and the sixth curved subpart are disposed away from the second static contact. The sixth curved subpart is disposed adjacent to the second contact end, to extend a movement path of the second arc toward the second arc extinguishing structure.

In a possible implementation, the second static contact is located on a side that is of the third curved part and that is adjacent to the movable contact. A second bent part is disposed between the second contact end and the second connection end. A curvature center of the second bent part faces the third curved part. The second bent part is configured to drive the second arc to move toward the second arc extinguishing structure when the second static contact is separated from the second end of the movable contact, to improve an arc extinguishing effect.

In a possible implementation, the switch unit further includes a housing. The first static contact, the second static contact, the movable contact, the first arc extinguishing structure, and the second arc extinguishing structure are located in the housing. The housing includes a first side frame and a second side frame that are disposed opposite to each other in a first direction. The first side frame is disposed more adjacent to the first static contact than the second side frame. The second side frame is disposed more adjacent to the second static contact than the first side frame. When the switch unit is turned off, the first end of the movable contact moves toward the second side frame, and a second end of the movable contact moves toward the first side frame. The first arc extinguishing structure and the second arc extinguishing structure are located between the first side frame and the second side frame and extend in the first direction.

In a possible implementation, the second arc extinguishing structure further includes a second curved gate plate. The second curved gate plate is distributed between the second arc extinguishing gate plates in the first direction. The first curved gate plate is configured to drive the first arc to move toward the first arc extinguishing structure, to improve an arc extinguishing effect.

In a possible implementation, a second arc extinguishing gate plate that is of the second arc extinguishing structure and that is adjacent to the first side frame is a fourth end-part arc extinguishing gate plate. The fourth end-part arc extinguishing gate plate includes a fourth curved part and a fourth flat plate part that are connected to each other. The second arc extinguishing gate plate adjacent to the fourth flat plate part and the fourth flat plate part are arranged at a spacing in the first direction. An end that is of the fourth curved part and that is away from the fourth flat plate part is disposed adjacent to the second end of the movable contact. The fourth curved part is configured to drive the second arc to move toward the second arc extinguishing structure when the second static contact is separated from the second end of the movable contact, to improve an arc extinguishing effect.

In a possible implementation, the switch unit further includes a second guide member. The second guide member is located on a side that is of the second arc extinguishing structure and that is away from the movable contact and is configured to discharge hot air generated by the second arc. The second guide member is used to discharge hot air sequentially and orderly to a maximum extent, thereby avoiding arc rollback caused by air flow disorder.

In a possible implementation, the housing further includes a first side panel and a second side panel that are disposed opposite to each other in the third direction. The movable contact, the first static contact, the second static contact, the first arc extinguishing structure, and the second arc extinguishing structure are located between the first side panel and the second side panel. The connecting piece is located on a side that is of the second side panel and that is away from the first side panel. The second arc extinguishing end part and the fourth arc extinguishing end part penetrate through the second side panel to be electrically connected to the connecting piece. In this way, the connecting piece is insulated from the movable contact, and safety is improved.

In a possible implementation, the first arc extinguishing structure further includes a first fastening plate. The first fastening plate is configured to fasten the first arc extinguishing gate plate in a specified direction, for example, the first direction or an arc-shaped direction. The first fastening plate is made of an insulation material, for example, a paper sheet.

In a possible implementation, the second arc extinguishing structure further includes a second fastening plate. The second fastening plate is configured to fasten the second arc extinguishing gate plate in a specified direction, for example, the first direction or the arc-shaped direction. The second fastening plate is made of an insulation material, for example, a paper sheet.

In an implementation, when the switch unit is turned on, an extension direction of the movable contact and the second direction are disposed at an included angle of 45°. When the switch unit is turned off, the movable contact rotates clockwise by 90°. Therefore, the movable contact in an off state and the movable contact in an on state are in mirror symmetry with respect to the second direction. In this case, the included angle between the extension direction of the movable contact and the second direction is 45°.

In a possible implementation, the first arc extinguishing structure and the second arc extinguishing structure rotate about the rotation center of the movable contact to implement 180° symmetry, and the first static contact and the second static contact rotate about the rotation center of the movable contact to implement 180° symmetry, so that the switch unit has a more regular structure and is convenient to install and prepare.

According to a second aspect, the embodiments may provide a switch unit. The switch unit is used in a switch. The switch includes a knob, the switch unit, and an operation mechanism connected between the knob and the switch unit. The knob can control, by using the operation mechanism, the switch unit to be turned on or off. The switch unit includes:

- a first static contact;
- a movable contact, having a rotation center, where the movable contact can rotate about the rotation center relative to the first static contact, the movable contact is configured to connect to or disconnect from the first static contact, and when the switch unit is turned off, the movable contact rotates about the rotation center relative to the first static contact by a first included angle to be separated from the first static contact, to generate a first arc;
- a first arc extinguishing structure, located around the first static contact, and configured to extinguish the first arc, where the first arc extinguishing structure includes a first arc extinguishing end part and a second arc extinguishing end part, a connection line between the first arc extinguishing end part and the rotation center of the movable contact is a first line, a connection line between the second arc extinguishing end part and the rotation center of the movable contact is a second line, an included angle between the first line and the second line is a second included angle, and an angle value of the second included angle is greater than or equal to an angle value of the first included angle.

In a possible implementation, the first arc extinguishing structure includes a plurality of first arc extinguishing gate plates that are sequentially arranged at spacings. A first arc extinguishing gate plate located at the first arc extinguishing end part is a first end-part arc extinguishing gate plate. The first end-part arc extinguishing gate plate is electrically connected to the first static contact.

In a possible implementation, at least a part of the first arc extinguishing structure is an arc-shaped structure.

In a possible implementation, the first arc extinguishing structure is an arc-shaped structure. An angle value of the second included angle is greater than or equal to 120°; or the first arc extinguishing structure is an arc-shaped structure, and the angle value of the second included angle is greater than or equal to 140° and less than or equal to 180°.

In a possible implementation, the first arc extinguishing structure includes a first arc extinguishing part and a second arc extinguishing part. The first arc extinguishing part includes a plurality of first arc extinguishing gate plates that are sequentially arranged at spacings. The second arc extinguishing part includes a plurality of first arc extinguishing gate plates that are sequentially arranged at spacings. An arrangement direction of the plurality of first arc extinguishing gate plates in the first arc extinguishing part intersects with an arrangement direction of the plurality of first arc extinguishing gate plates in the second arc extinguishing part.

In a possible implementation, the first arc extinguishing structure includes the plurality of first arc extinguishing gate plates that are sequentially arranged at spacings. A first groove that is concave in a direction away from the movable contact is disposed at an end that is of the first arc extinguishing gate plate and that faces the movable contact. The first end that is of the movable contact and that is away from the rotation center is located in the first groove and is spaced from an inner wall of the first groove.

In a possible implementation, the first end-part arc extinguishing gate plate includes a first curved part and a first flat plate part that are connected to each other. The first arc extinguishing gate plate adjacent to the first flat plate part and the first flat plate part are arranged at a spacing. An end that is of the first curved part and that is away from the first flat plate part is electrically connected to the first static contact. The first curved part is configured to drive the first arc to move toward the first arc extinguishing structure when the first contact end is separated from the first end, to improve an arc extinguishing effect.

In a possible implementation, the first static contact is located on a side that is of the first curved part and that is adjacent to the movable contact. A first bent part is disposed between the first contact end and the first connection end. A curvature center of the first bent part faces the first curved part. The first bent part is configured to drive the first arc to move toward the first arc extinguishing structure when the first static contact is separated from the first end of the movable contact, to improve an arc extinguishing effect.

In a possible implementation, the switch unit further includes a second arc extinguishing structure and a second static contact. The movable contact is configured to connect to or disconnect from the second static contact. When the switch unit is turned off, the movable contact is separated from the second static contact, to generate a second arc. The second arc extinguishing structure is located around the second static contact and is configured to extinguish the second arc. The second arc extinguishing structure includes a third arc extinguishing end part and a fourth arc extinguishing end part. A connection line between the third arc extinguishing end part and the rotation center of the movable contact is a fifth line. A connection line between the fourth arc extinguishing end part and the rotation center of the movable contact is a sixth line. An included angle between the fifth line and the sixth line is a third included angle. An angle value of the third included angle is greater than or equal to the angle value of the first included angle.

In a possible implementation, the switch unit further includes a connecting piece. The connecting piece is connected between the second arc extinguishing end part and the fourth arc extinguishing end part.

In a possible implementation, the switch unit further includes a housing. The first static contact, the second static contact, the movable contact, the first arc extinguishing structure, and the second arc extinguishing structure are located in the housing. The housing includes a first side frame and a second side frame that are disposed opposite to each other in a first direction. The first side frame is disposed more adjacent to the first static contact than the second side frame. The second side frame is disposed more adjacent to the second static contact than the first side frame. When the switch unit is turned off, the first end of the movable contact moves toward the second side frame, and a second end of the movable contact moves toward the first side frame. The first arc extinguishing structure and the second arc extinguishing structure are located between the first side frame and the second side frame and extend in the first direction.

Descriptions and deformation solutions of the housing, the first static contact, the second static contact, the movable contact, the first arc extinguishing structure, the second arc extinguishing structure, and the connecting piece in the power supply system in the foregoing embodiments may be applicable to the housing, the first static contact, the second static contact, the movable contact, the first arc extinguishing structure, the second arc extinguishing structure, and the connecting piece in the switch unit in this embodiment. Descriptions and deformation solutions of position relationships of the housing, the first static contact, the second static contact, the movable contact, the first arc extinguishing structure, the second arc extinguishing structure, and the connecting piece in the power supply system in the foregoing embodiments may be applicable to position relationships of the housing, the first static contact, the second static contact, the movable contact, the first arc extinguishing structure, the second arc extinguishing structure, and the connecting piece in the switch unit in this embodiment. Details are not described herein again.

BRIEF DESCRIPTION OF THE DRAWINGS

To describe the embodiments clearly, the following describes the accompanying drawings.

DETAILED DESCRIPTION OF THE EMBODIMENTS

The following describes the embodiments with reference to the accompanying drawings. The described embodiments are merely some, rather than all, of the embodiments.

The terms "first", "second", and the like are merely intended for a purpose of description and shall not be understood as an indication or implication of relative importance or implicit indication of a quantity of indicated features. Therefore, a feature limited by "first" or "second" may explicitly or implicitly include one or more features. In the description, unless otherwise stated, "a plurality of" means two or more than two.

In addition position terms such as "top" and "bottom" are defined relative to positions of structures in the accompanying drawings. It should be understood that these position terms are relative concepts used for relative description and clarification and may correspondingly change according to changes in the positions of the structures.

For ease of understanding, the following first explains and describes English abbreviations and related terms used in embodiments.

Left-hand rule: Stretch the left hand and make the thumb vertical to the other four fingers in a same plane, so that a magnetic induction line flows from the palm. The four fingers point to a current direction, and the thumb points to an ampere force direction, namely, a direction in which a conductor bears force.

Ampere's rule in an electrified solenoid: Hold the electrified solenoid with the right hand and let the four fingers point to a current direction. The thumb points to an N pole of the electrified solenoid.

Figure 1:
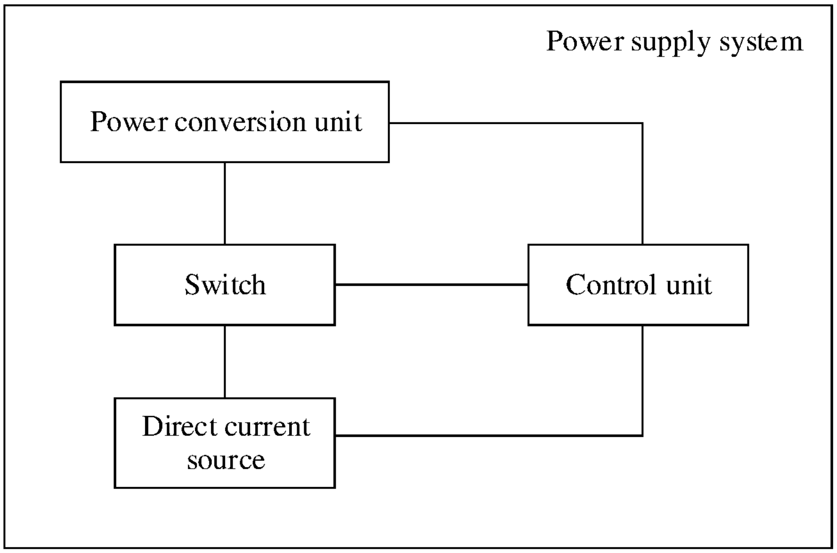
FIG. 1 is a schematic diagram of a power supply system according to an embodiment.

FIG. 1 is a schematic diagram of a power supply system according to an embodiment. An embodiment may provide a power supply system and a switch used in the power supply system. The power supply system includes a control unit, the switch, a direct current source, and a power change unit. The switch is electrically connected between the direct current source and the power change unit. The control unit is configured to send a switch-off signal to the switch when the direct current source or the power change unit is faulty. The direct current source may be a photovoltaic module, or a photovoltaic string, or a series-parallel circuit of a photovoltaic module and a photovoltaic string, or the direct current source may be a power conversion unit. The power conversion unit may be a DC/DC converter or a DC/AC converter. Both the direct current source and the power conversion unit may be considered as a power supply circuit. When the power supply circuit is faulty, for example, if the direct current source or the power conversion unit is faulty, the control unit detects occurrence of the fault, and the control unit can send the switch-off signal to the switch. The switch-off signal is used to trigger (that is, drive) switch-off and cut off the circuit.

In an implementation, the control unit may be an independent controller. The controller is disposed in the power supply system independent of the direct current source and the power conversion unit, and is electrically connected to the power conversion unit, the direct current source, and the switch through a signal cable. In an implementation, the power conversion unit may be an independent power conversion apparatus, for example, an inverter. In an implementation, the control unit may alternatively be integrated in another functional apparatus. For example, the control unit may be integrated in an inverter, and may be a control circuit or a control chip on a mainboard in the inverter. In this way, the power conversion apparatus, as an independent apparatus, can automatically trip in any scenario.

Figure 2:
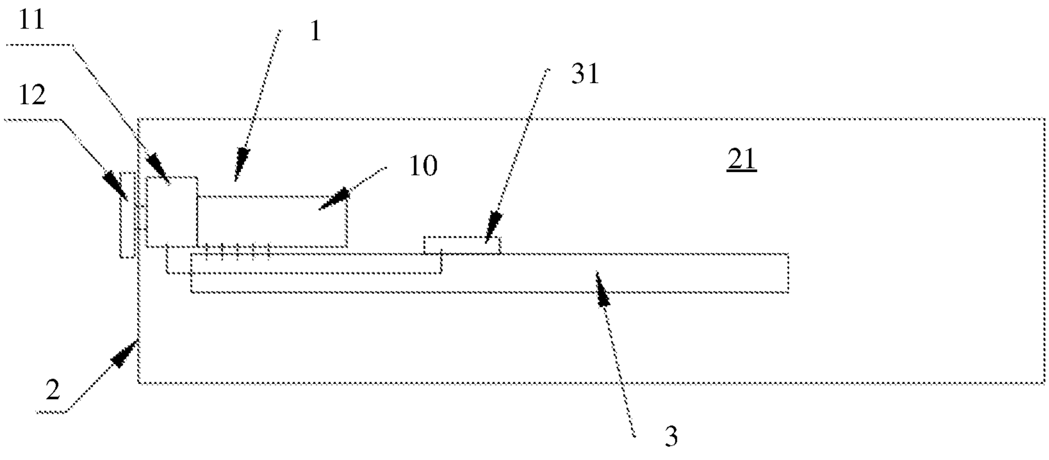
FIG. 2 is a schematic diagram of a power conversion apparatus according to an embodiment.

The switch may be an independent switch device disposed in the power supply system, or the switch may be disposed on a functional apparatus in the power supply system. For example, in an implementation, the switch is disposed on the power conversion apparatus. As shown in FIG. 2, the power conversion apparatus includes a housing 2, a switch 1, and a circuit board 3. The housing 2 encloses an accommodation space 21. The circuit board 3 is disposed in the accommodation space 21. The switch 1 includes a knob 12, an operation mechanism 11, and a switch unit 10. The switch unit 10 and the operation mechanism 11 are located in the accommodation space 21 and are electrically connected to the circuit board 3. The knob 12 is located on one side of an outer surface of the housing 2. In an implementation, a control unit 31 is disposed on the circuit board 3. The control unit 31 is electrically connected to the operation mechanism 11. The control unit 31 is configured to send a switch-off signal to the operation mechanism 11, so that the operation mechanism 11 can drive the switch unit 10 to switch off. In an implementation, the operation mechanism 11 is a free tripping structure.

Figure 3:
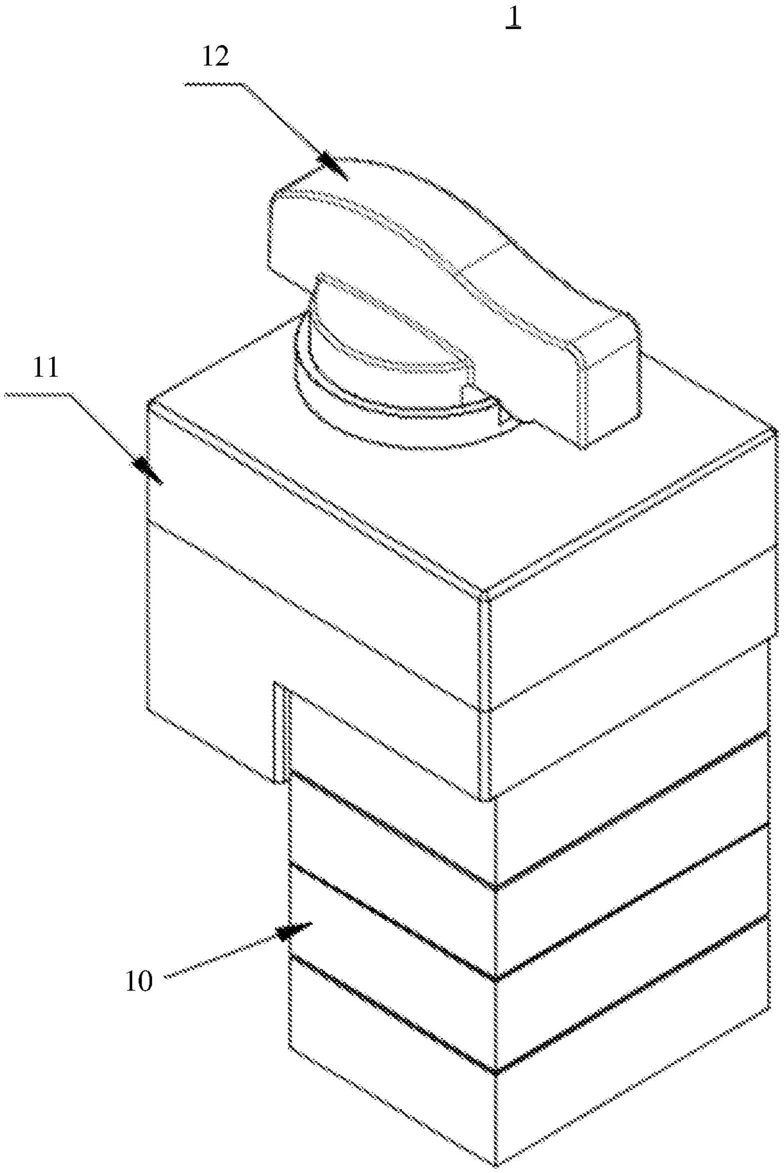
FIG. 3 is a three-dimensional diagram of a structure of a switch according to an embodiment.

FIG. 3 is a three-dimensional diagram of a structure of a switch 1 according to an embodiment. The switch 1 includes a switch unit 10 and an operation mechanism 11. The operation mechanism 11 is configured to receive a switch-off signal and control the switch unit 10 to turned off or on. In an implementation, the switch 1 may include a plurality of stacked switch units 10. In an implementation, the switch 1 further includes a knob 12. The knob 12 drives, by using the operation mechanism 11, the switch unit 10 to turned off or on.

Figure 4:
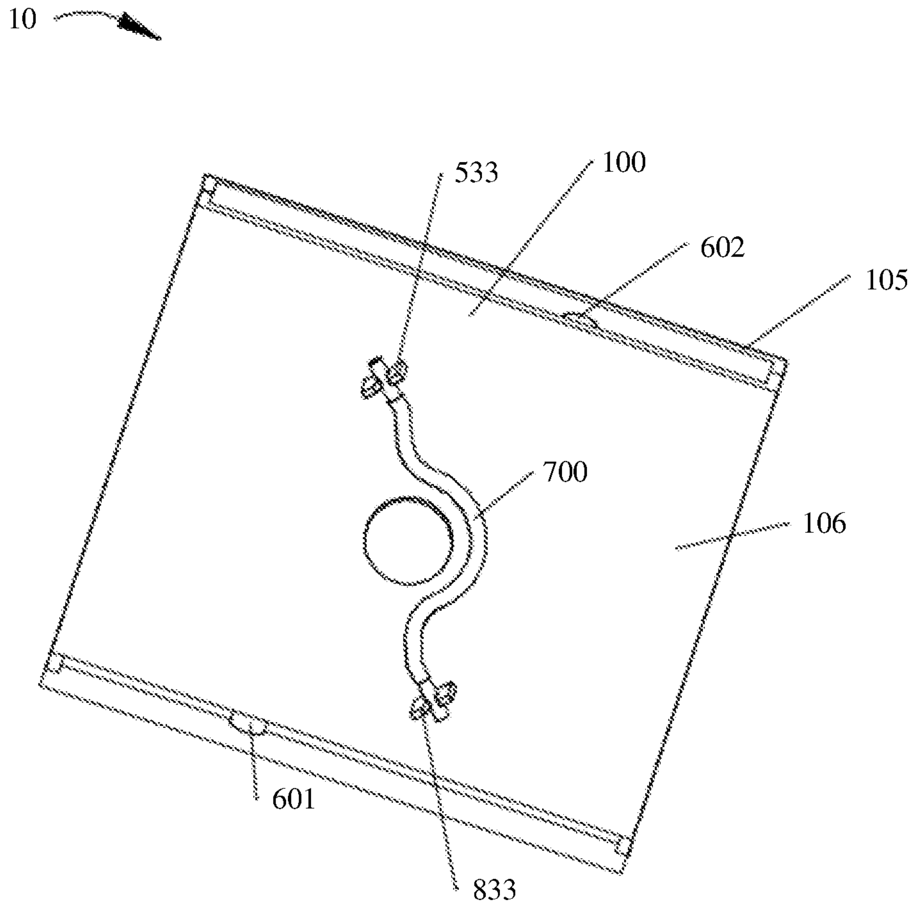
FIG. 4 is a schematic diagram of a switch unit according to an embodiment.
Figure 5:
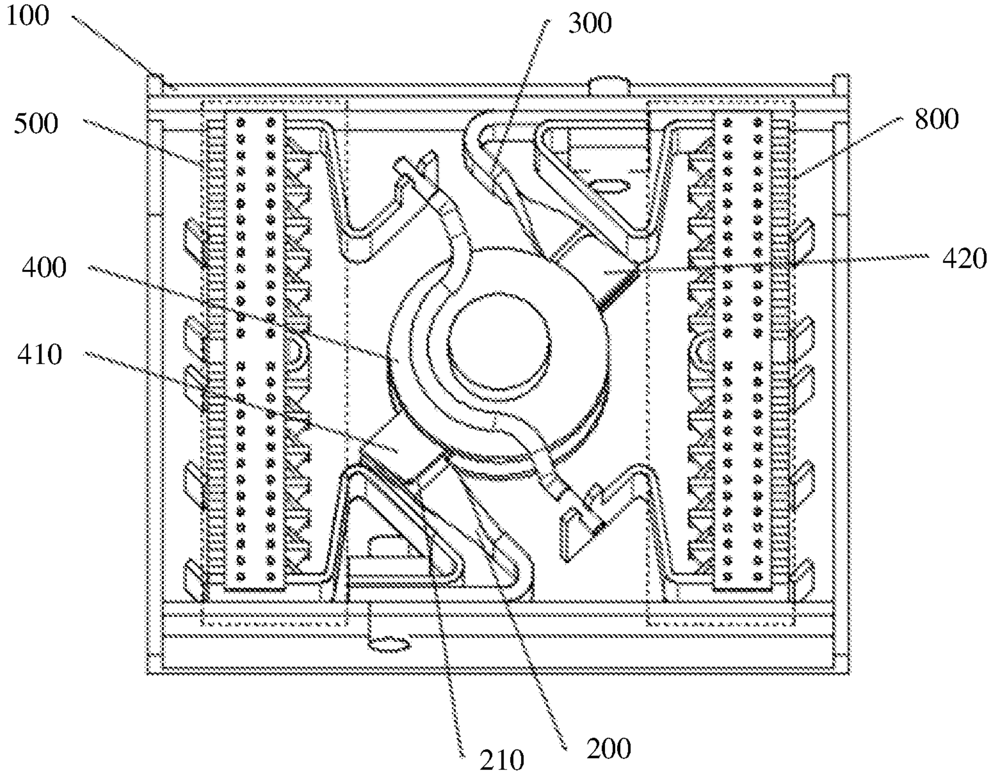
FIG. 5 is a schematic diagram of a structure of a turned-on switch unit according to an embodiment.
Figure 6:
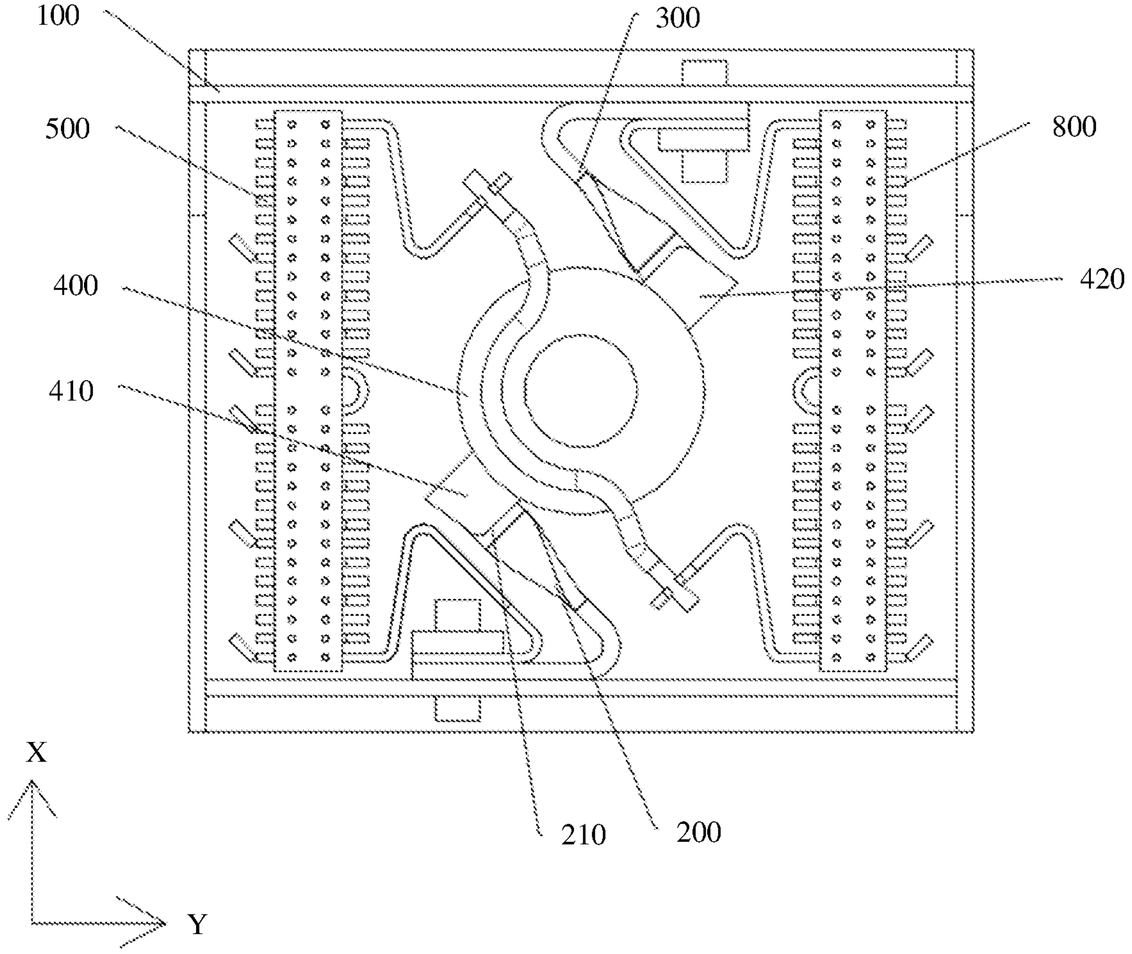
FIG. 6 is a schematic diagram of a structure of a turned-on switch unit according to an embodiment.
Figure 7:
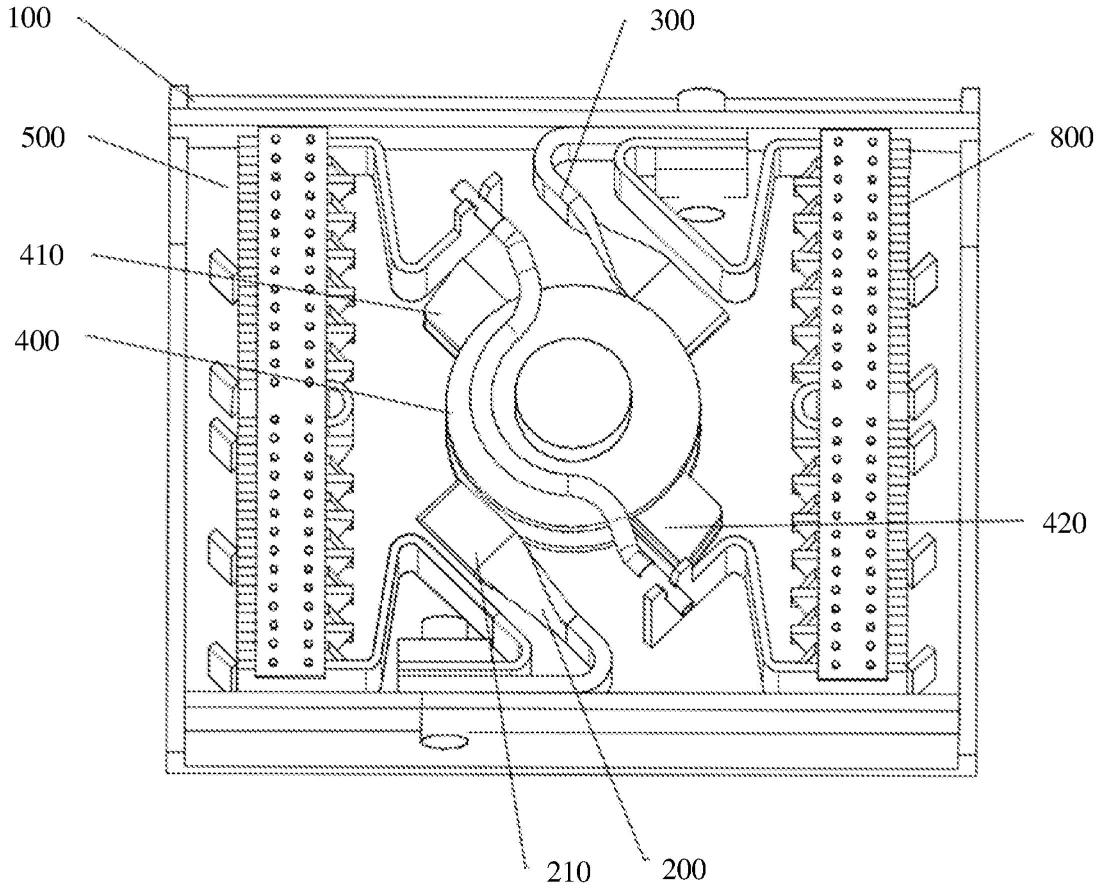
FIG. 7 is a schematic diagram of a structure of a turned-off switch unit according to an embodiment.
Figure 8:
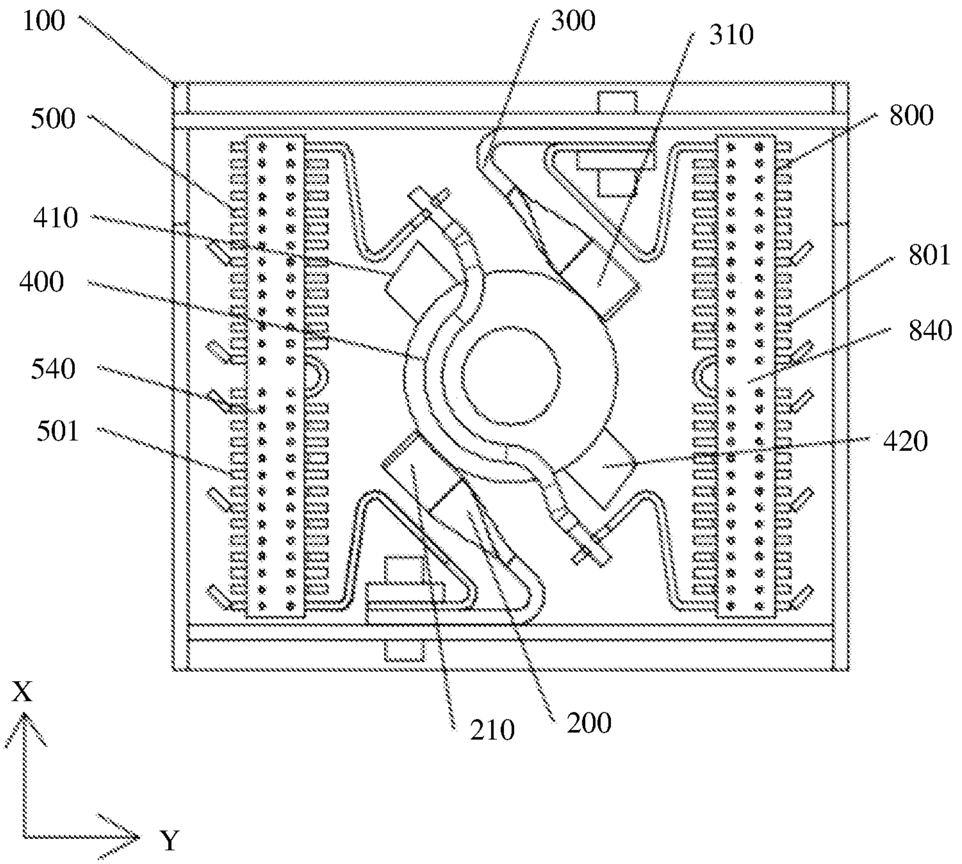
FIG. 8 is a schematic diagram of a structure of a turned-off switch unit according to an embodiment.
Figure 9:
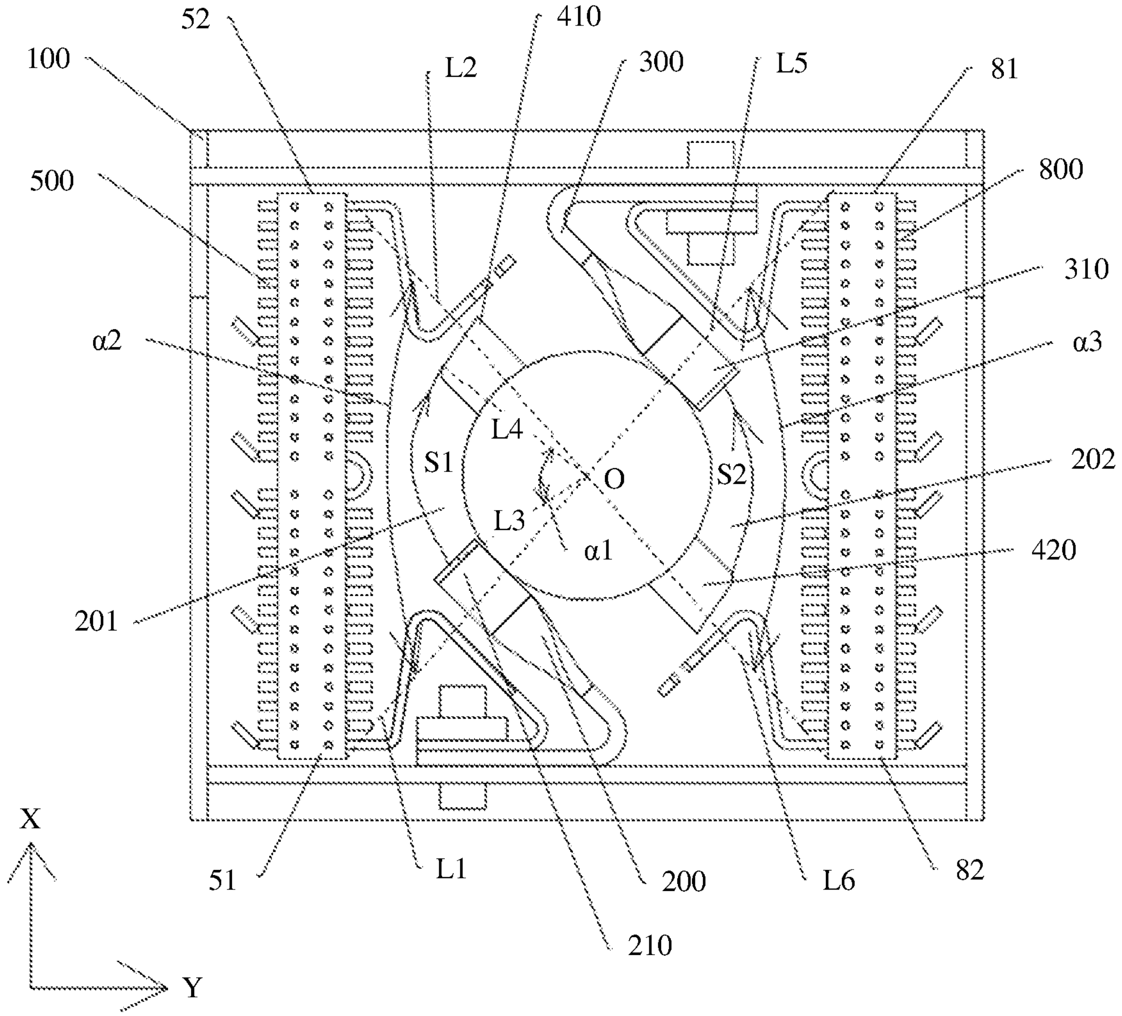
FIG. 9 is a schematic diagram of a structure of a turned-off switch unit according to an embodiment.

FIG. 4 is a schematic diagram of a switch unit 10 according to an embodiment. FIG. 5 and FIG. 6 are schematic diagrams of a structure of a turned-on switch unit 10 in FIG. 4. FIG. 7 and FIG. 8 are schematic diagrams of a structure of a turned-off switch unit 10 in FIG. 4. FIG. 9 is a schematic diagram of a turned-off switch unit 10. The switch unit 10 includes a housing 100, a first static contact 200, a second static contact 300, a movable contact 400, and a first arc extinguishing structure 500. The first static contact 200, the second static contact 300, the movable contact 400, and the first arc extinguishing structure 500 are located in the housing 100. The movable contact 400 has a rotation center O. The movable contact 400 can rotate about the rotation center O relative to the first static contact 200. The movable contact 400 is configured to connect to or disconnect from the first static contact 200. When the switch unit 10 is turned off, the movable contact 400 rotates about the rotation center O by a first included angle $\alpha 1$ relative to the first static contact 200 to be separated from a first contact end 210, to generate a first arc S1. The first arc extinguishing structure 500 is located around the first static contact 200 and is configured to extinguish the first arc S1. The first arc extinguishing structure 500 includes a first arc extinguishing end part 51 and a second arc extinguishing end part 52. A connection line between the first arc extinguishing end part 51 and the rotation center O of the movable contact 400 is a first line L1. A connection line between the second arc extinguishing end part 52 and the rotation center O of the movable contact 400 is a second line L2. An included angle between the first line L1 and the second line L2 is a second included angle $\alpha 2$. An angle value of the second included angle $\alpha 2$ is greater than or equal to an angle value of the first included angle $\alpha 1$.

When the switch 1 is in an on state, the switch unit 10 is in an on state. In this case, the first static contact 200 and the second static contact 300 come into contact with and are electrically connected to two ends of the movable contact 400 respectively, and currents between the movable contact 400 and both of the first static contact 200 and the second static contact 300 are conducted (as shown in FIG. 6). When the switch 1 is in an off state, the switch unit 10 is in an off state. In this case, the first static contact 200 and the second static contact 300 are separated from two ends of the movable contact 400, and currents between the movable contact 400 and both of the first static contact 200 and the second static contact 300 are cut off (as shown in FIG. 9).

In a process in which the first static contact 200 is separated from the movable contact 400, gas with a high temperature, strong light emission, and strong conductivity, namely, the first arc S1 (as shown in FIG. 9), is generated between the first static contact 200 and the movable contact 400. The first arc S1 is a gas discharge phenomenon, and the first arc S1 has light mass and easily changes a form. The generated first arc S1 prolongs break time of the circuit. If the circuit of the power supply system is faulty, the switch 1 needs to be switched off. Due to the generated first arc S1, the switch 1 cannot be switched off in time, thereby causing greater damage to the power supply system. In addition, due to a high temperature of the first arc S1, the first static contact 200 and the movable contact 400 are prone to deformation and melting, and even events such as explosion of the switch 1 and burns of a person are caused. In addition, the strong light of the first arc S1 may also damage eyesight of a person. Further, the conductivity of the first arc S1 easily causes a short circuit of another device. Consequently, safe operation of the power supply system is endangered, and serious casualties and property losses are caused. The shape of the first arc S1 in FIG. 9 is merely an example. In practice, the shape of the first arc S1 affected by a surrounding environment may be a curve or another shape.

When the second included angle $\alpha 2$ is greater than or equal to the first included angle $\alpha 1$, a size of the first arc extinguishing structure 500 is greater than or at least equal to a size of the first arc S1. In other words, because the first arc S1 moves away from the movable contact 400 toward the first arc extinguishing structure 500, when the second included angle $\alpha 2$ is greater than or equal to the first included angle $\alpha 1$, the first arc extinguishing structure 500 can cover a part or the whole of a movement path of the first arc S1, so that the first arc S1 can be better cut off and extinguished, to improve an arc extinguishing effect. It should be understood that the first line L1 and the second line L2 may or may not exist in an actual product structure and are used to describe position relationships between the first arc extinguishing structure 500, the movable contact 400, and the first static contact 200.

In a possible implementation, the first static contact 200 includes a first contact end 210. The movable contact 400 includes a first end 410. The first end 410 is configured to connect to or disconnect from the first contact end 210. The first arc S1 is formed between the first end 410 and the first contact end 210. The first end 410 and the first contact end 210 are located between the first line L1 and the second line L2, to improve an arc extinguishing effect.

In a possible implementation, when the movable contact 400 is disconnected from the first static contact 200, a connection line between the first contact end 210 and the rotation center O of the movable contact 400 is a third line L3, a connection line between the first end 410 and the rotation center O of the movable contact 400 is a fourth line L4, and an included angle between the third line L3 and the fourth line L4 is the first included angle $\alpha 1$. A position of the first contact end 210 obtained from the third line L3 and a position of the first end 410 obtained from the fourth line L4 coincide when the movable contact 400 is connected to the first static contact 200. A position of the first arc extinguishing end part 51 obtained from the first line L1 and a position of the second arc extinguishing end part 52 obtained from the second line L2 are positions that can maximize the second included angle α2, so that the first arc extinguishing structure 500 can effectively extinguish an arc.

In a possible implementation, the third line L3 and the fourth line L4 are located between the first line L1 and the second line L2, to improve an arc extinguishing effect. In this way, the first arc extinguishing structure 500 can better cut off the first arc S1, to improve an arc extinguishing effect. It should be understood that the first line L1, the second line L2, the third line L3, and the fourth line L4 may or may not exist in an actual product structure and are used to describe position relationships between the first arc extinguishing structure 500, the movable contact 400, and the first static contact 200.

In a possible implementation, an included angle between the third line L3 and the first line L1 is equal to an included angle between the fourth line L4 and the second line L2, to implement symmetrical distribution and ensure an arc extinguishing effect, and to effectively use space in the housing 100 and reduce a size.

In a possible implementation, a distance between the first arc extinguishing end part 51 and the second arc extinguishing end part 52 is greater than a distance between the first end 410 and the first contact end 210, to improve an arc extinguishing effect. When the first arc extinguishing structure 500 extends in a first direction X, a size of the first arc extinguishing structure 500 in the first direction X is greater than a size between the first end 410 and the first contact end 210 in the first direction X, to improve an arc extinguishing effect.

In a possible implementation, when the first end 410 of the movable contact 400 is disconnected from the first static contact 200, a first fracture 201 is formed between the first end 410 and the first static contact 200. The first arc S1 is formed in the first fracture 201. The first arc extinguishing structure 500 includes a plurality of first arc extinguishing gate plates 501 that are sequentially arranged at spacings. A gap between every two adjacent first arc extinguishing gate plates 501 forms a first arc extinguishing opening 502. The first arc extinguishing opening 502 is communicated with and disposed opposite to the first fracture 201, to improve an arc extinguishing effect. The first arc S1 is cut by the first arc extinguishing gate plate 501 and enters the first arc extinguishing opening 502. The first arc extinguishing opening 502 is equivalent to an air resistor. The first arc S1 may need to break through the first arc extinguishing opening 502 and therefore may consume energy. The first arc extinguishing structure 500 has a plurality of first arc extinguishing openings 502, and the plurality of first arc extinguishing openings 502 can improve an arc extinguishing effect.

In this implementation, the housing 100 includes a first side frame 101 and a second side frame 102 that are disposed opposite to each other in the first direction X. The first side frame 101 is disposed adjacent to the first static contact 200. The second side frame 102 is disposed adjacent to the second static contact 300. In the first direction X, the first arc extinguishing structure 500 is located between the first side frame 101 and the second side frame 102. The first arc extinguishing structure 500 includes the plurality of first arc extinguishing gate plates 501 that are arranged at spacings in the first direction X.

The first arc extinguishing structure 500 is located between the first side frame 101 and the second side frame 102. More first arc extinguishing gate plates 501 can be accommodated between the first side frame 101 and the second side frame 102. The plurality of first arc extinguishing gate plates 501 are arranged at spacings in the first direction X. The first arc extinguishing gate plates 501 extend in a second direction Y, to improve an arc extinguishing effect. In addition, the first static contact 200 is disposed adjacent to the first side frame 101. The first end 410 of the movable contact 400 is disposed adjacent to the second side frame 102 when the first end is disconnected. Two ends of the first arc S1 are respectively located at the first static contact 200 and the first end 410, so that the first arc extinguishing structure 500 can effectively extinguish the first arc S1. The first arc S1 and the first arc extinguishing structure 500 are disposed opposite to each other in the second direction Y, so that the first arc extinguishing structure 500 can accommodate most of the first arc S1, to extinguish the first arc S1. The first arc extinguishing gate plate 501 is made of metal and is configured to cut the first arc S1 to extinguish the arc.

Figure 10:
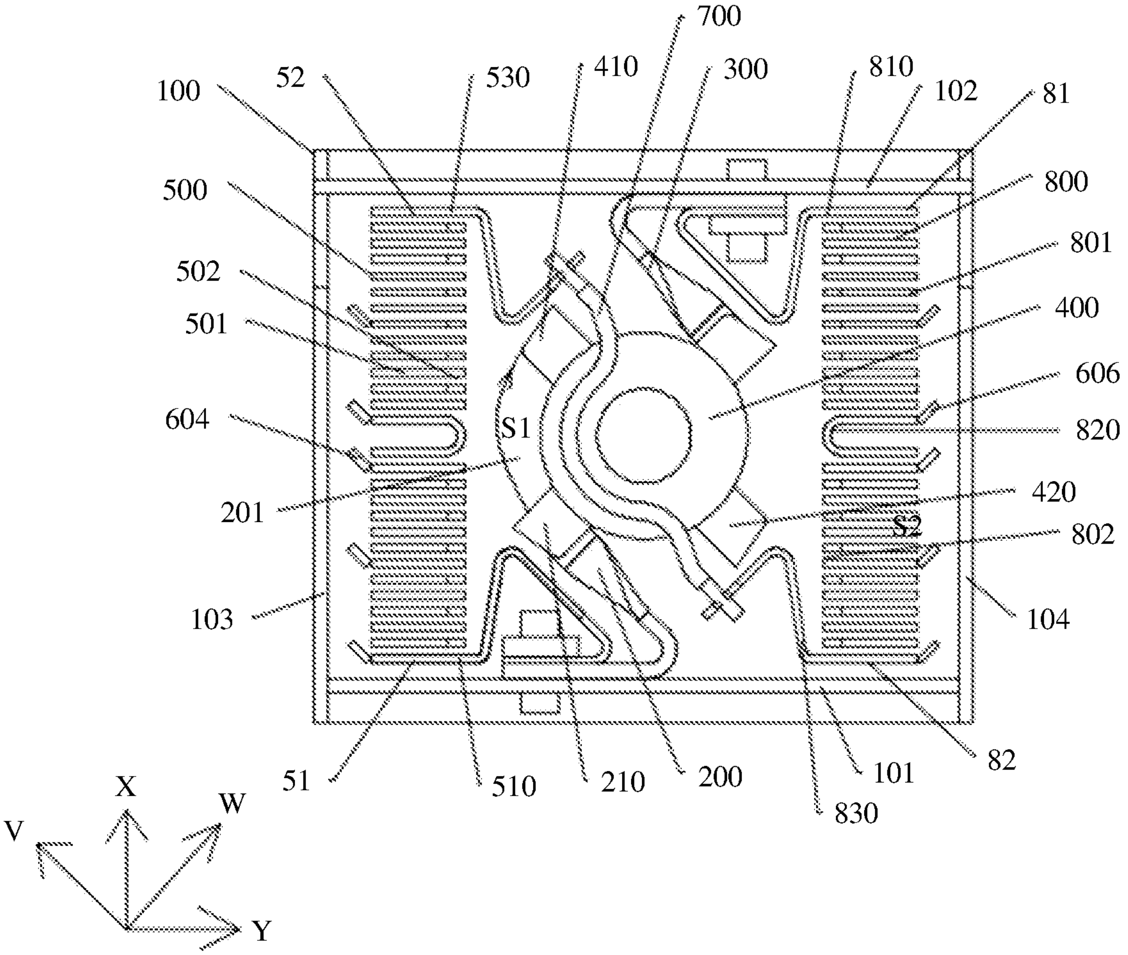
FIG. 10 is a schematic diagram of a structure of a turned-off switch unit according to an embodiment.
Figure 11:
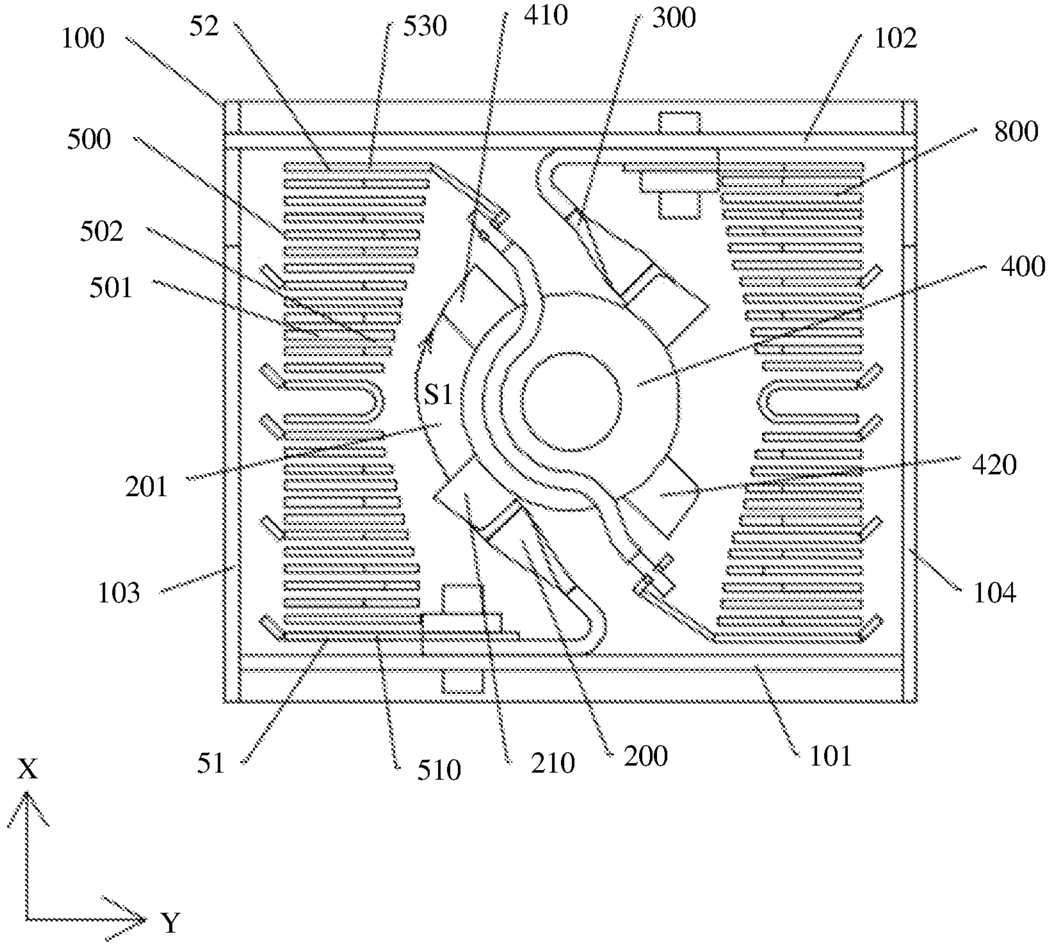
FIG. 11 is a schematic diagram of a structure of a turned-off switch unit according to an embodiment.

In this implementation, the housing 100 further includes a third side frame 103 and a fourth side frame 104 that are disposed opposite to each other in the second direction Y (as shown in FIG. 10). The first arc extinguishing structure 500 is arranged along the third side frame 103, so that more first arc extinguishing gate plates 501 can be distributed. In an implementation, the first direction X and the second direction Y perpendicularly intersect, and an extension direction of the first arc extinguishing gate plate 501 is the same as the second direction Y, so that assembly is simpler, space of the housing 100 can be fully used, and more first arc extinguishing gate plates 501 may be disposed. In this implementation, the housing 100 further includes a first side panel 105 and a second side panel 106 that are disposed opposite to each other in a third direction Z (as shown in FIG. 4). The third direction Z intersects with the first direction X and the second direction Y. In this implementation, the first direction X is a width direction of the switch unit 10, the second direction Y is a length direction of the switch unit 10, and the third direction Z is a thickness direction of the switch unit 10. The first arc extinguishing structure 500 may be fastened to the first side panel 105 and/or the second side panel 106. In another implementation, the first direction X is a length direction of the switch unit 10, and the second direction Y is a width direction of the switch unit 10.

In a possible implementation, a size of the first arc extinguishing structure 500 in the first direction X is greater than a size of the first fracture 201 in the first direction X (as shown in FIG. 9), to improve an arc extinguishing effect. Because the first arc S1 is formed in the first fracture 201, the size of the first arc extinguishing structure 500 in the first direction X is greater than a size of the first arc S1 in the first direction X, so that the first arc S1 can be effectively absorbed, to improve an arc extinguishing effect.

In a possible implementation, a ratio of a size of a gap between adjacent first arc extinguishing gate plates 501 in the first direction X to a size of the first arc extinguishing gate plate 501 in the first direction X is (1-1.5):1. In other words, a ratio of a size of the first arc extinguishing opening 502 in the first direction X to the size of the first arc extinguishing gate plate 501 in the first direction X is (1-1.5):1. This size ratio setting may enable a large quantity of first arc extinguishing gate plates 501 to be distributed in the housing 100, to improve an arc extinguishing effect.

In a possible implementation, sizes of the first arc extinguishing gate plates 501 between the first arc extinguishing end part 51 and the second arc extinguishing end part 52 in the first direction X are the same, so that a processing process is simple.

In a possible implementation, sizes of the first arc extinguishing gate plates 501 in the second direction Y gradually increase from the middle of the first arc extinguishing structure 500 to two ends, so that an end that is of the first arc extinguishing structure 500 and that faces the movable contact 400 is arc-shaped, to increase a size of the gate plate for cutting off the first arc S1. Sizes of the first arc extinguishing gate plates 501 between the first arc extinguishing end part 51 and the second arc extinguishing end part 52 in the first direction X are the same, so that a processing process is simple.

Figure 12:
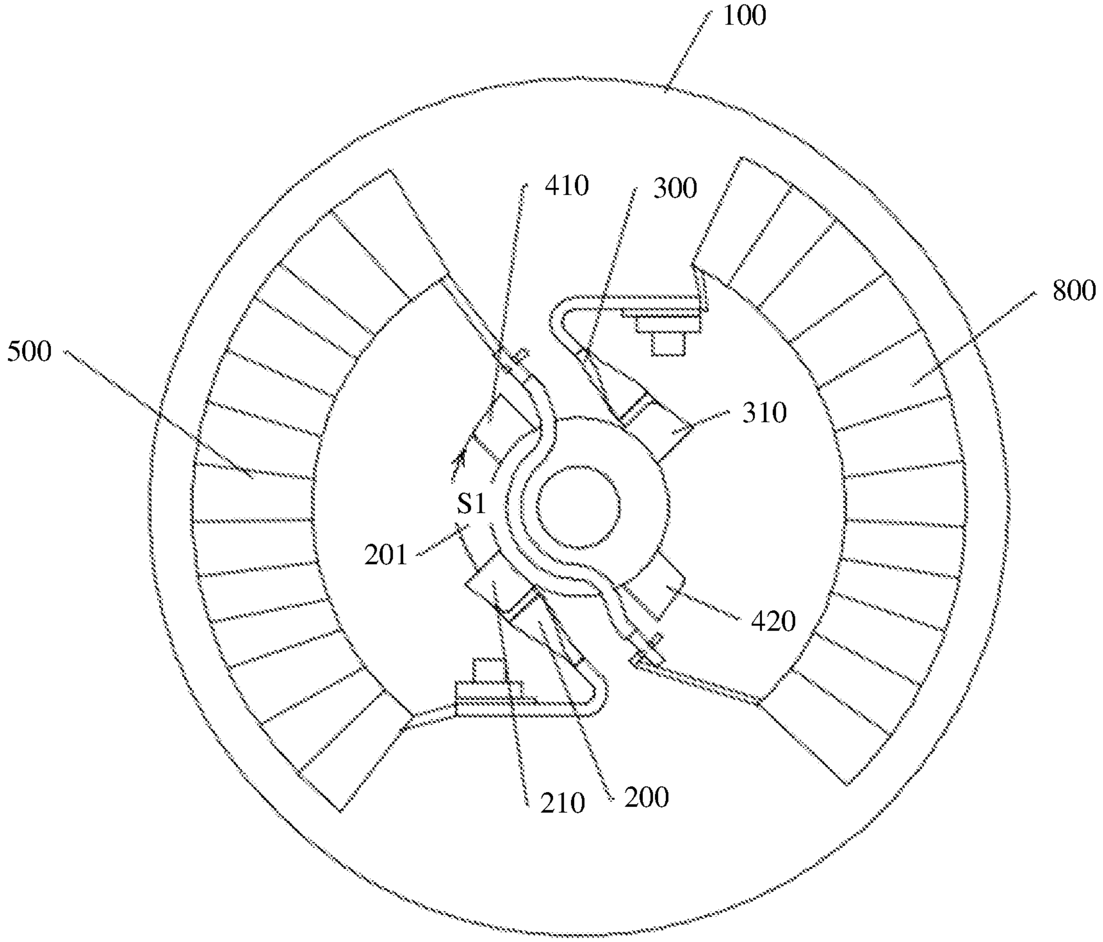
FIG. 12 is a schematic diagram of a structure of a turned-off switch unit according to an embodiment.

In a possible implementation, the first arc extinguishing structure 500 is disposed in an arc shape and is disposed around a periphery of the first fracture 201, to improve an arc extinguishing effect. The arc-shaped first arc extinguishing structure 500 may adapt to a case in which the housing 100 is a circular structure or an elliptical structure. The first arc extinguishing structure 500 in FIG. 12 is merely used to indicate an arc shape and does not represent a structure.

Figure 13:
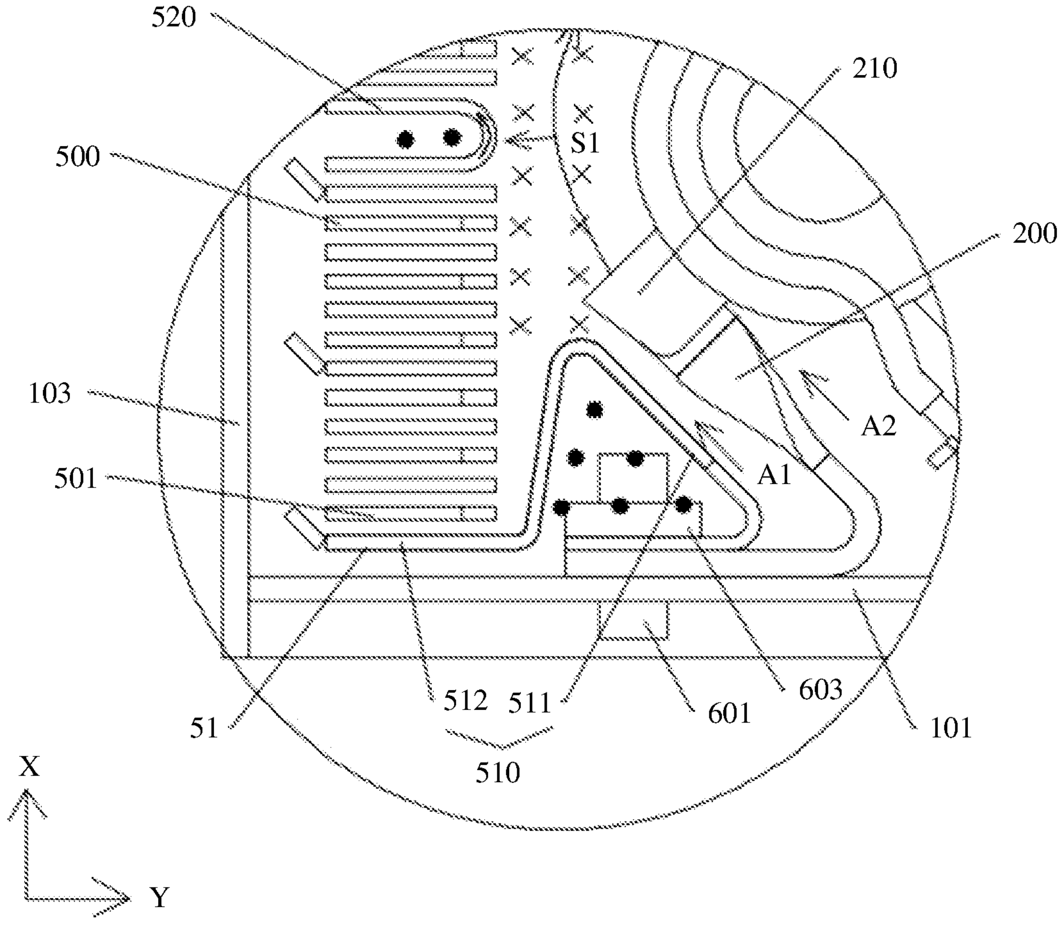
FIG. 13 is a partial schematic diagram of a turned-off switch unit according to an embodiment.

FIG. 13 is a partial enlarged diagram of a switch unit 10. In a possible implementation, the first arc extinguishing gate plate 501 located at the first arc extinguishing end part 51 is a first end-part arc extinguishing gate plate 510. The first end-part arc extinguishing gate plate 510 is electrically connected to the first static contact 200. The first arc S1 flows into the first arc extinguishing structure 500 by using the first end-part arc extinguishing gate plate 510, and all or most of the first arc extinguishing gate plates 501 in the first arc extinguishing structure 500 can be fully used. The first arc extinguishing gate plates 501 in the first arc extinguishing structure 500 are all disposed at spacings, so that the first arc S1 needs to break down the arranged first arc extinguishing gate plates 501 one by one. This is equivalent to guiding the first arc S1 into a large resistor (the first arc extinguishing structure 500), so that the first arc S1 is cut off and extinguished, to improve an off effect of the switch unit 10.

In a possible implementation, the first end-part arc extinguishing gate plate 510 includes a first curved part 511 and a first flat plate part 512 that are connected to each other. The first arc extinguishing gate plate 501 adjacent to the first flat plate part 512 and the first flat plate part 512 are arranged at a spacing in the first direction X. An end that is of the first curved part 511 and that is away from the first flat plate part 512 is electrically connected to the first static contact 200. The first curved part 511 is configured to drive the first arc S1 to move toward the first arc extinguishing structure 500 when the first contact end 210 is separated from the first end 410, to improve an arc extinguishing effect. In an implementation, the first flat plate part 512 is disposed in parallel to the first arc extinguishing gate plate 501.

In this implementation, an example in which the first static contact 200 is an inflow end of a current, and the current flows through the movable contact 400 and then flows out through the second static contact 300 is used for description. In another implementation, the first static contact 200 is a current output end, and the second static contact 300 is a current input end, and the effects are the same. In this implementation, when the first static contact 200 is separated from the first end 410 of the movable contact 400, the first curved part 511 is electrically connected to the first static contact 200, so that at least a part of the first arc S1 can flow into the first curved part 511 through the first static contact 200. There is a current A1 in the first curved part 511. According to an amperes rule in an electrified solenoid, a magnetic field line outward perpendicular to paper is generated on an inner side of the first curved part 511, and a magnetic field line inward perpendicular to paper is generated on an outer side of the first curved part 511. Magnetic field directions may be represented by "x" and "·" in physics, where "x" represents the direction inward perpendicular to paper (as shown in FIG. 13), and "·" represents the direction outward perpendicular to paper (as shown in FIG. 13). In this implementation, "x" and "." represent only magnetic field directions, and the density of "x" and "·" does not represent the density of magnetic induction lines and the intensity of a magnetic field. In an implementation shown in FIG. 13, a curvature center of the first curved part 511 is disposed away from the first arc S1, so that a direction of a magnetic field in an area in which the first arc S1 is located is a direction inward perpendicular to paper. Then according to the left-hand rule, the magnetic field line generates, on the first arc S1, an ampere force in a direction toward the first arc extinguishing structure 500. The ampere force drives the first arc S1 to move toward the first arc extinguishing structure 500. A path of the first arc S1 is extended to cool the first arc S1, and the first arc S1 can be more guided into the first arc extinguishing structure 500, to jointly improve an arc extinguishing effect.

Figure 14:
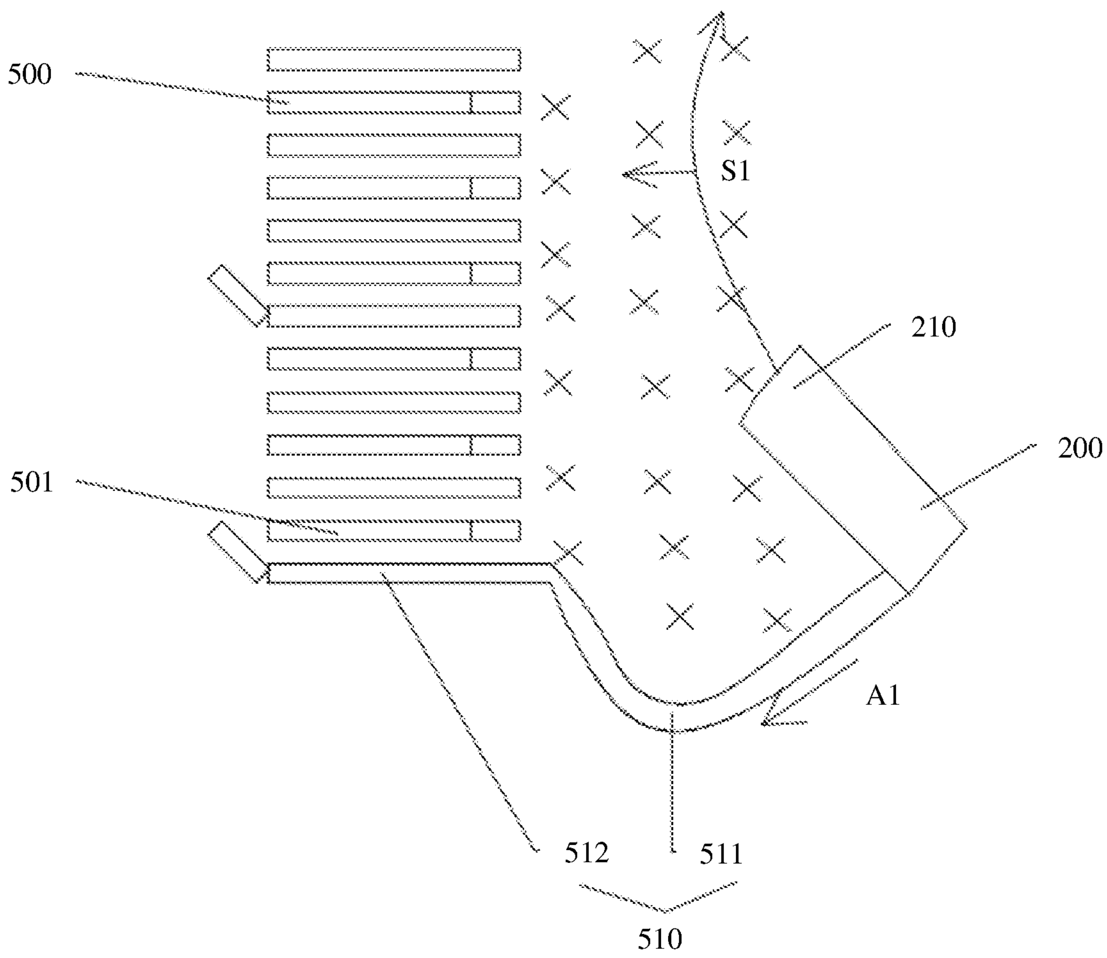
FIG. 14 is a schematic diagram of a first arc extinguishing structure and a first static contact of a turned-off switch unit according to an embodiment.

In an implementation, a curvature center of the first curved part 511 may alternatively be disposed toward the first arc S1. In this case, a direction of a magnetic field in an area in which the first arc S1 is located is also a direction inward perpendicular to paper. The magnetic field line generates, on the first arc S1, an ampere force in a direction toward the first arc extinguishing structure 500. The ampere force drives the first arc S1 to move toward the first arc extinguishing structure 500. A path of the first arc S1 is extended to cool the first arc S1, and the first arc S1 can be more guided into the first arc extinguishing structure 500, to jointly improve an arc extinguishing effect. It should be noted that the first static contact 200 and the first arc extinguishing structure 500 in FIG. 14 are simplified schematic diagrams, and do not represent an actual structure. FIG. 14 indicates that when the curvature center of the first curved part 511 is disposed toward the first arc S1, the first arc S1 may also be driven to move toward the first arc extinguishing structure 500.

In an implementation, the first curved part 511 may be in a triangle shape, an arc shape, a circular shape, or a multi-coil shape. The multi-coil shape can improve the density of magnetic field lines and increase a distance by which the first arc S1 moves toward the first arc extinguishing structure 500, to improve an arc extinguishing effect.

In a possible implementation, the first curved part 511 includes a first straight subpart 5111, a first curved subpart 5112, a second straight subpart 5113, a second curved subpart 5114, and a third straight subpart 5115 that are sequentially connected. The first static contact 200 includes a first contact end 210 and a first connection end 220. The first connection end 220 is disposed more adjacent to the first side frame 101 than the first contact end 210. The first contact end 210 is configured to connect to or disconnect from the first end 410 of the movable contact 400. An end that is of the first straight subpart 5111 and that is away from the first curved subpart 5112 is connected to the first connection end 220. Curvature centers of the first curved subpart 5112 and the second curved subpart 5114 are disposed away from the first static contact 200. The second curved subpart 5114 is disposed adjacent to the first contact end 210, to extend a movement path of the first arc S1 toward the first arc extinguishing structure 500. In this implementation, the first curved part 511 is disposed in a triangle shape, so that internal space of the housing 100 can be fully used, and internal structure distribution is more appropriate, to reduce a size of the switch unit 10. The two curved subparts (5112 and 5114) are disposed, to improve an arc extinguishing effect. The second curved subpart 5114 is disposed adjacent to the first contact end 210, so that the first arc S1 can be transferred into the second curved subpart 5114 by using the first contact end 210, to improve an arc extinguishing effect.

In an implementation, the first flat plate part 512 and the first straight subpart 5111 are disposed side by side in the second direction Y, so that internal space of the housing 100 is fully used.

Figure 20:
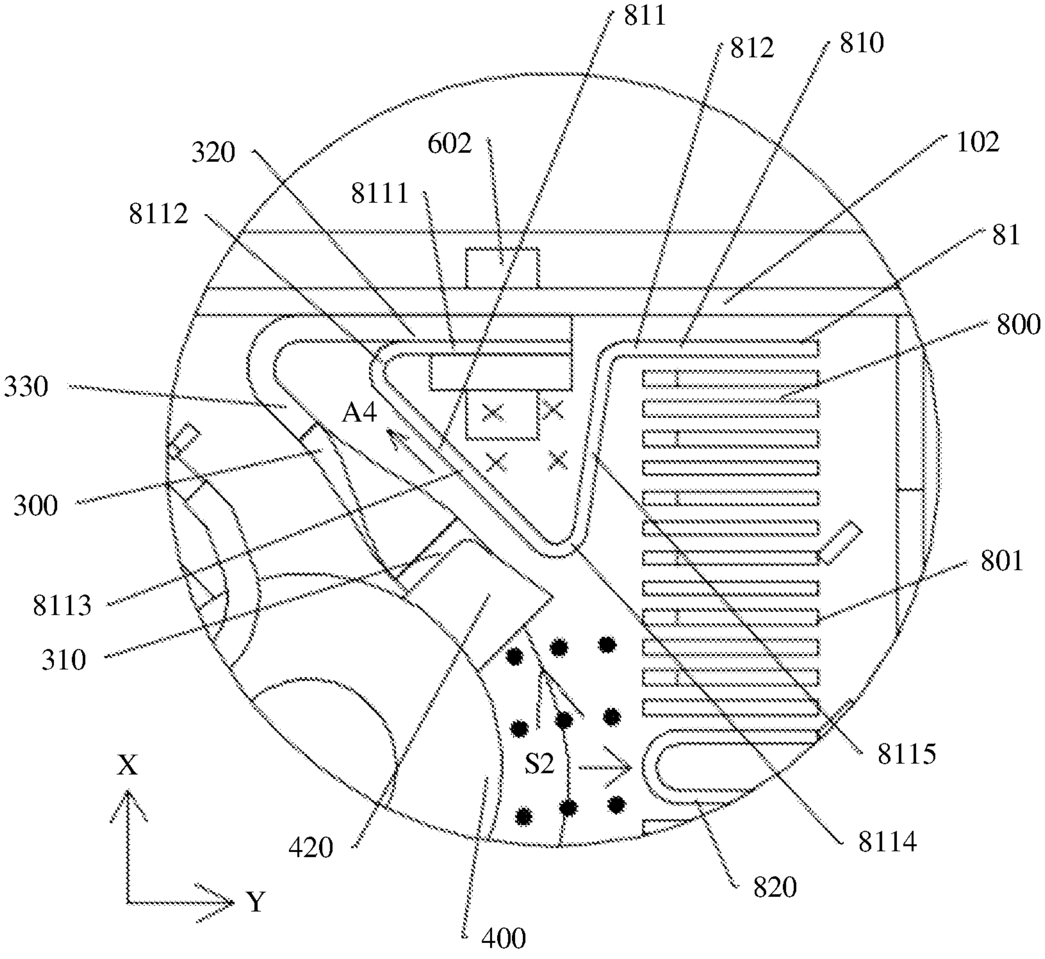
FIG. 20 is a partial schematic diagram of a turned-off switch unit according to an embodiment.
Figure 21:
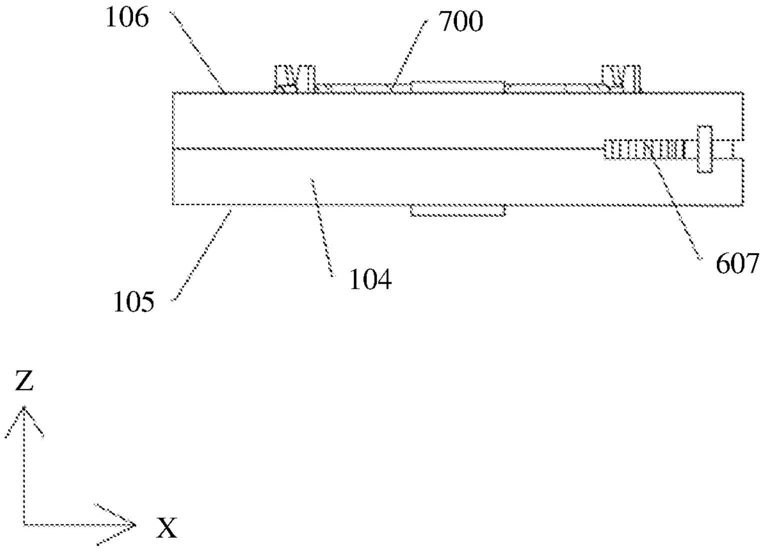
FIG. 21 is a side view of a switch unit according to an embodiment.

In an implementation, the first straight subpart 5111 may be fastened to the first connection end 220 through a screw, welding, or the like. In this implementation, the switch unit 10 further includes a first terminal 601 (as shown in FIG. 13). The first terminal 601 is fastened to the first side frame 101. The first straight subpart 5111 and the first connection end 220 are fastened to the first terminal 601 through a screw 603. The first terminal 601 is electrically connected to an external circuit, for example, electrically connected to a circuit board 3. The switch unit 10 further includes a second terminal 602 (as shown in FIG. 20). The second terminal 602 is fastened to the second side frame 102. The second static contact 300 is fastened to the second terminal 602 through a screw 603. The second terminal 602 is electrically connected to an external circuit, for example, electrically connected to a circuit board 3.

Figure 15:
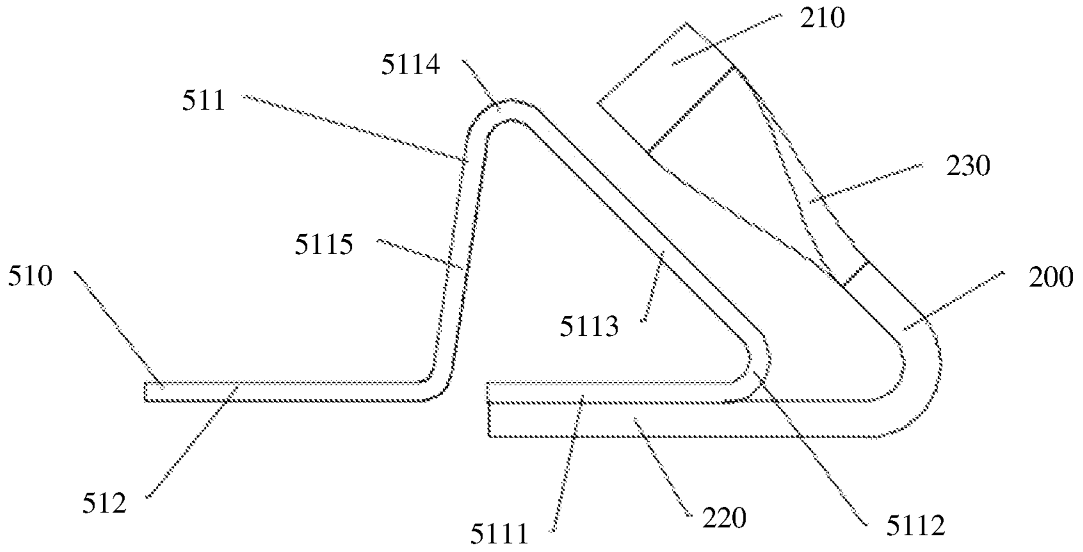
FIG. 15 is a schematic diagram of a first end-part arc extinguishing gate plate and a first static contact of a turned-off switch unit according to an embodiment.

In a possible implementation, the first static contact 200 is located on a side that is of the first curved part 511 and that is adjacent to the movable contact 400 (as shown in FIG. 13). A first bent part 230 is disposed between the first contact end 210 and the first connection end 220 (as shown in FIG. 15). A curvature center of the first bent part 230 faces the first curved part 511. The first bent part 230 is configured to drive the first arc S1 to move toward the first arc extinguishing structure 500 when the first static contact 200 is separated from the first end 410 of the movable contact 400, to improve an arc extinguishing effect. The first bent part 230 also has a curved section. When the first static contact 200 is separated from the first end 410 of the movable contact 400, a current direction A2 in the first static contact 200 is flowing from the first connection end 220 to the first contact end 210 (as shown in FIG. 13). According to the amperes rule in the electrified solenoid, a magnetic field line outward perpendicular to paper is generated on an inner side of the first bent part 230, and a magnetic field line inward perpendicular to paper is generated on an outer side of the first bent part 230. The first arc S1 is located in an external area of the first bent part 230. The magnetic field line generates, on the first arc S1, an ampere force in a direction toward the first arc extinguishing structure 500. The ampere force drives the first arc S1 to move toward the first arc extinguishing structure 500. A path of the first arc S1 is extended to cool the first arc S1, and the first arc S1 can be more guided into the first arc extinguishing structure 500, to jointly improve an arc extinguishing effect.

In this implementation, the first bent part 230 may further implement largest-surface intersection of the first contact end 210 and the first connection end 220. In an implementation, the first static contact 200 is an integrally formed structure, and a metal sheet may be twisted to form the first contact end 210, the first connection end 220, and the first bent part 230. The first contact end 210 and the first end 410 of the movable contact 400 are stacked in the third direction Z. The movable contact 400 may include two metal sheets. When the movable contact 400 is connected to the first static contact 200, the first contact end 210 is located at the first end 410 of the movable contact 400, and the first contact end 210 and the first end 410 are stacked in the third direction Z. The first connection end 220 and the first side frame 101 are stacked in the first direction X. Due to the shape of the first bent part 230, the first connection end 220 and the first side frame 101 can be stacked in the first direction X, and the first contact end 210 and the first end 410 can be stacked in the third direction Z. This setting can reduce consumption of internal space of the housing 100, and also reduce consumption of a material for preparing the first static contact 200. The first static contact 200 may be obtained only by twisting the metal sheet, and there is no need to remove a redundant metal material, so that costs can be reduced. When the first static contact 200 is made of copper, costs of copper metal are saved.

Figure 16:
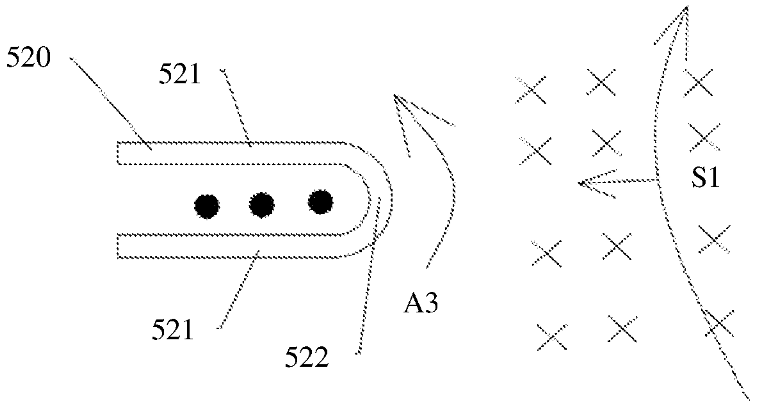
FIG. 16 is a schematic diagram of a first curved gate plate and a first arc of a turned-off switch unit according to an embodiment.

In a possible implementation, the first arc extinguishing structure 500 further includes a first curved gate plate 520. The first curved gate plate 520 is distributed between the first arc extinguishing gate plates 501 in the first direction X (as shown in FIG. 13). The first curved gate plate 520 is configured to drive the first arc S1 to move toward the first arc extinguishing structure 500, to improve an arc extinguishing effect. When the first static contact 200 is separated from the first end 410 of the movable contact 400, a current sequentially enters the first arc extinguishing gate plates 501 distributed in the first direction X by using the first end-part arc extinguishing gate plate 510. When the current flows through the first curved gate plate 520, as shown in FIG. 16, a curvature center of the first curved gate plate 520 is disposed away from the movable contact 400. A current direction A3 is flowing from the first connection end 220 to the first contact end 210. According to the amperes rule in the electrified solenoid, a magnetic field line outward perpendicular to paper is generated on an inner side of the first curved gate plate 520, and a magnetic field line inward perpendicular to paper is generated on an outer side of the first curved gate plate 520. The first arc S1 is located in an external area of the first curved gate plate 520. The magnetic field line generates, on the first arc S1, an ampere force in a direction toward the first arc extinguishing structure 500. The ampere force drives the first arc S1 to move toward the first arc extinguishing structure 500. A path of the first arc S1 is extended to cool the first arc S1, and the first arc S1 can be more guided into the first arc extinguishing structure 500, to jointly improve an arc extinguishing effect.

In an implementation, a curvature center of the first curved gate plate 520 is disposed toward the movable contact 400, so that the first curved gate plate 520 can still drive the first arc S1 to move toward the first arc extinguishing structure 500 when the first arc S1 is located in the first curved gate plate 520, to improve an arc extinguishing effect.

Figure 17:
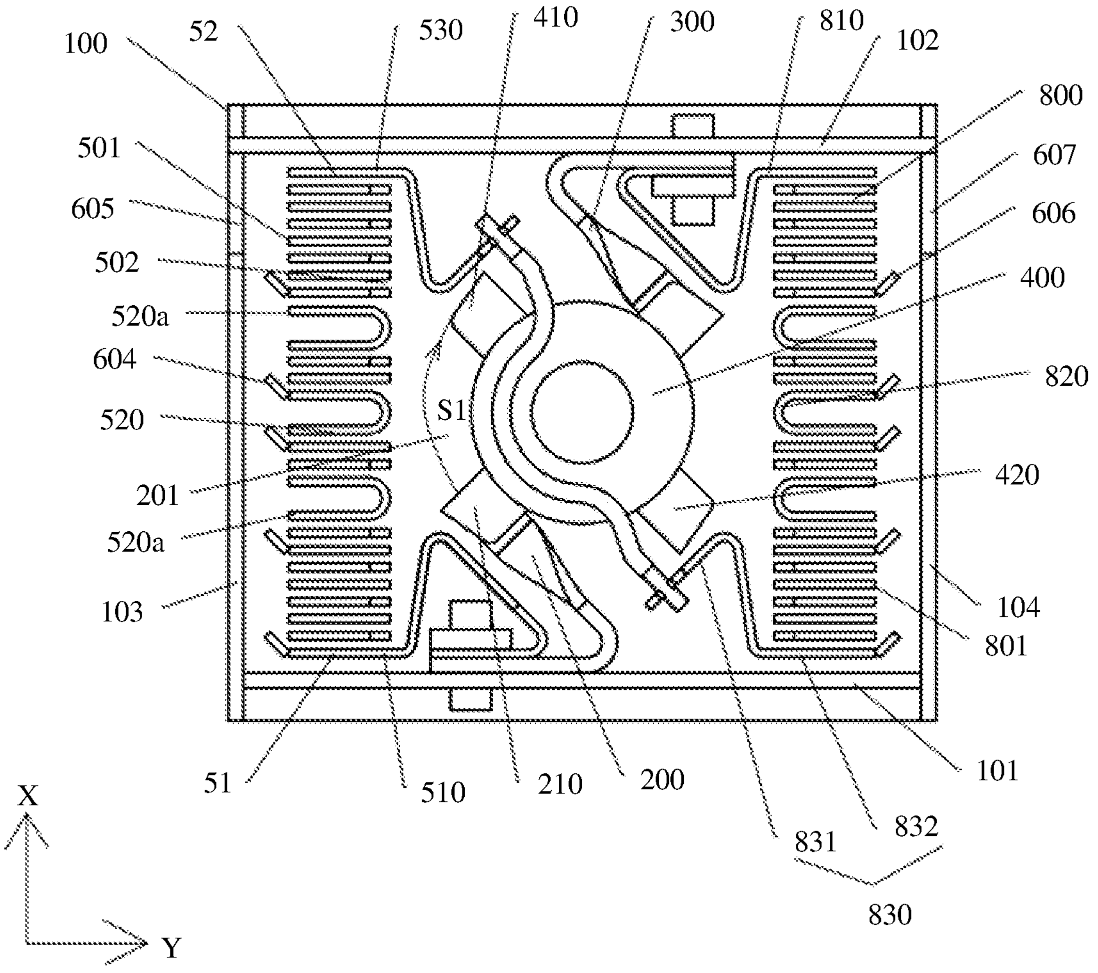
FIG. 17 is a schematic diagram of a structure of a turned-off switch unit according to an embodiment.
Figure 18:
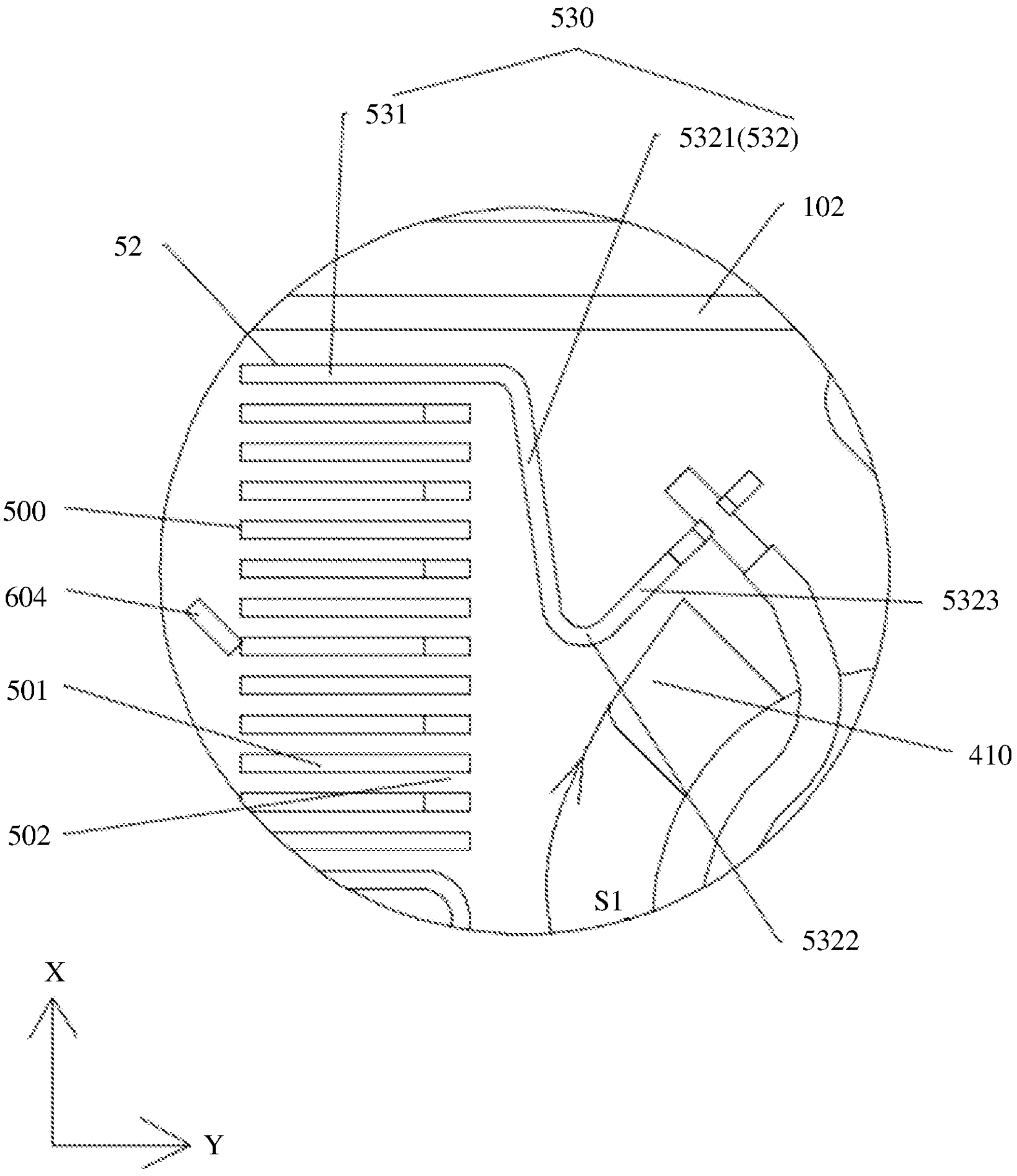
FIG. 18 is a partial schematic diagram of a turned-off switch unit according to an embodiment.

In an implementation, there may be one or more first curved gate plates 520. The first curved gate plate 520 includes two fourth straight subparts 521 and a third curved subpart 522 located between the two fourth straight subparts 521. The fourth straight subparts 521 and other first arc extinguishing gate plates 501 are disposed at spacings in the first direction X. A curvature center of the third curved subpart 522 may be disposed toward the movable contact 400 or away from the movable contact 400. When there may be a plurality of first curved gate plates 520, as shown in FIG. 17, the first curved gate plate 520 includes two first curved gate plates 520*a* and one first curved gate plate 520, and a curvature center is disposed away from the movable contact 400. Shapes of the first curved gate plates 520 may be the same or different. The first curved gate plates 520*a* and the first curved gate plate 520 are in a "U" shape. In another implementation, a shape of the first curved gate plate 520 is an "S" shape or the like.

In a possible implementation, a first arc extinguishing gate plate 501 located at the second arc extinguishing end 52 is a second end-part arc extinguishing gate plate 530. The second end-part arc extinguishing gate plate 530 includes a second curved part 532 and a second flat plate part 531 that are connected to each other. The first arc extinguishing gate plate 501 adjacent to the second flat plate part 531 and the second flat plate part 531 are arranged at a spacing in the first direction X. An end that is of the second curved part 532 and that is away from the second flat plate part 531 is disposed adjacent to the first end 410 of the movable contact 400. In an implementation, the second flat plate part 531 is disposed in parallel to the first arc extinguishing gate plate 501. The second curved part 532 is configured to drive the first arc S1 to move toward the first arc extinguishing structure 500 when the first static contact 200 is separated from the first end 410 of the movable contact 400, to improve an arc extinguishing effect. When the current flows through the second curved part 532, a magnetic field is generated. The magnetic field may drive the first arc 51 to move toward the first arc extinguishing structure 500, to improve an arc extinguishing effect. For a principle, refer to the foregoing description. Details are not described herein again. In this implementation, an end that is of the second curved part 532 and that is away from the second flat plate part 531 is electrically connected to a connecting piece 700.

In a possible implementation, the second curved part 532 includes a fifth straight subpart 5321, a fourth curved subpart 5322, and a sixth straight subpart 5323 that are sequentially connected. The fifth straight subpart 5321 is connected to the second flat plate part 531. A curvature center of the fourth curved subpart 5322 is disposed away from the first end 410. The fourth curved subpart 5322 is disposed adjacent to the first end 410, to extend a movement path of the first arc S1 toward the first arc extinguishing structure 500. When the first static contact 200 is separated from the first end 410 of the movable contact 400, the first end 410 is more adjacent to the fourth curved subpart 5322, so that the first arc S1 is better guided into the fourth curved subpart 5322, to improve an arc extinguishing effect. An included angle between every two of the fifth straight subpart 5321, the fourth curved subpart 5322, and the sixth straight subpart 5323 may be set based on a requirement. In this implementation, due to structure disposing of the second curved part 532, internal space of the housing 100 can be fully used.

In some implementations, a curvature center of the fourth curved subpart 5322 is disposed toward the first end 410. In addition, the movement path of the first arc S1 toward the first arc extinguishing structure 500 can be extended.

In an implementation, an area in which the first arc extinguishing structure 500 is located is a first arc extinguishing chamber. The second curved subpart 5114 and the fourth curved subpart 5322 are disposed opposite to each other in the first direction X, to form an opening of the first arc extinguishing chamber. The first arc S1 enters the first arc extinguishing chamber through the opening between the second curved subpart 5114 and the fourth curved subpart 5322.

Figure 19:
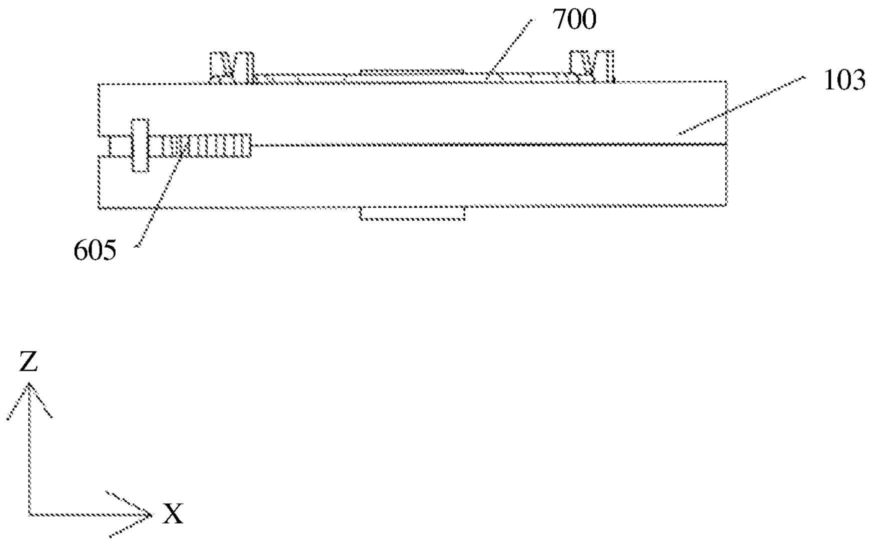
FIG. 19 is a side view of a switch unit according to an embodiment.

FIG. 19 is a side view of a switch unit 10. In a possible implementation, the switch unit 10 further includes a first guide member 604 (as shown in FIG. 17). The first guide member 604 is located on a side that is of the first arc extinguishing structure 500 and that is away from the movable contact 400 and is configured to discharge hot air generated by the first arc S1. In an implementation, the first guide member 604 may be located at an end that is of the first arc extinguishing gate plate 501 and that is away from the movable contact 400. The first guide member 604 and the first arc extinguishing gate plate 501 are disposed at an included angle. An extension direction of the first guide member 604 points to an air flow outlet.

In this implementation, the housing 100 includes a first outlet 605 (as shown in FIG. 17 and FIG. 19). The extension direction of the first guide member 604 is disposed corresponding to the first outlet 605, to exhaust hot air sequentially and orderly to a maximum extent, thereby avoiding arc rollback caused by air flow disorder. A quantity of the first guide members 604 may be set based on a requirement. This is not limited.

In a possible implementation, the switch unit 10 further includes a second arc extinguishing structure 800 and a second static contact 300 that are located in the housing 100. The second static contact 300 includes a second contact end 310 (as shown in FIG. 9). The movable contact 400 can rotate relative to the second static contact 300. The movable contact 400 includes a second end 420. The second end 420 is configured to connect to or disconnect from the second contact end 310. When the switch unit 10 is turned off, the second end 420 is separated from the second contact end 310, to generate a second arc S2. The second arc extinguishing structure 800 is located around the second static contact 300 and is configured to extinguish the second arc S2. The second arc extinguishing structure 800 includes a third arc extinguishing end part 81 and a fourth arc extinguishing end part 82. A connection line between the third arc extinguishing end part 81 and the rotation center O of the movable contact 400 is a fifth line L5. A connection line between the fourth arc extinguishing end part 82 and the rotation center O of the movable contact 400 is a sixth line L6. An included angle between the fifth line L5 and the sixth line L6 is a third included angle $\alpha 3$. An angle value of the third included angle $\alpha 3$ is greater than or equal to the angle value of the first included angle $\alpha 1$. When the switch unit 10 is turned off, an included angle by which the movable contact 400 rotates relative to the second static contact 300 is the same as the first included angle $\alpha 1$.

When the third included angle $\alpha 3$ is greater than or equal to the first included angle $\alpha 1$, a size of the second arc extinguishing structure 800 is greater than or at least equal to a size of the second arc S2. In other words, because the second arc S2 moves away from the movable contact 400 toward the second arc extinguishing structure 800, when the third included angle $\alpha 3$ is greater than or equal to the first included angle $\alpha 1$, the second arc extinguishing structure 800 can cover a part or the whole of a movement path of the second arc S2, so that the second arc S2 can be better cut off and extinguished, to improve an arc extinguishing effect. It should be understood that the fifth line L5 and the sixth line L6 may or may not exist in an actual product structure and are used to describe position relationships between the second arc extinguishing structure 800, the movable contact 400, and the second static contact 300.

A position of the third arc extinguishing end part 81 obtained from the fifth line L5 and a position of the fourth arc extinguishing end part 82 obtained from the sixth line L6 are positions that can maximize the third included angle $\alpha 3$, so that the second arc extinguishing structure 800 can effectively extinguish an arc.

In a possible implementation, the first line L1 and the fifth line L5 are collinear, and the second line L2 and the sixth line L6 are collinear, so that a structure distribution of the switch unit may be more regular and neat.

In a possible implementation, the second end 420 and the second contact end 310 are located between the fifth line L5 and the sixth line L6, to improve an arc extinguishing effect.

In a possible implementation, a distance between the third arc extinguishing end part 81 and the fourth arc extinguishing end part 82 is greater than a distance between the second end 420 and the second contact end 310, to improve an arc extinguishing effect.

In a possible implementation, the second arc extinguishing structure 800 may include a plurality of second arc extinguishing gate plates 801 that are sequentially arranged at spacings. A second arc extinguishing gate plate 801 located at the fourth arc extinguishing end part 82 is a fourth end-part arc extinguishing gate plate 830. The fourth end-part arc extinguishing gate plate 830 is electrically connected to the second static contact 300. A second arc extinguishing gate plate 801 located at the third arc extinguishing end part 81 is a third end-part arc extinguishing gate plate 810. The third end-part arc extinguishing gate plate 810 is electrically connected to the connecting piece 700. The second arc S2 flows into the second arc extinguishing structure 800 by using the fourth end-part arc extinguishing gate plate 830, and all or most of the second arc extinguishing gate plates 801 in the second arc extinguishing structure 800 can be fully used. The second arc extinguishing gate plates 801 in the second arc extinguishing structure 800 are all disposed at spacings, so that the second arc S2 needs to break down the arranged second arc extinguishing gate plates 801 one by one. This is equivalent to guiding the second arc S2 into a large resistor (the second arc extinguishing structure 800), so that the second arc S2 is cut off and extinguished, to improve an off effect of the switch unit 10.

In a possible implementation, when the second end 420 of the movable contact 400 is disconnected from the second static contact 300, a second fracture 202 is formed between the second end 420 and the second static contact 300. The second arc S2 is formed in the second fracture 202. The second arc extinguishing structure 800 may include a plurality of second arc extinguishing gate plates 801 that are sequentially arranged at spacings. A gap between every two adjacent second arc extinguishing gate plates 801 forms a second arc extinguishing opening 802 (as shown in FIG. 10). The second arc extinguishing opening 802 is communicated with and disposed opposite to the second fracture 202, to improve an arc extinguishing effect. The second arc S2 is cut by the second arc extinguishing gate plate 801 and enters the second arc extinguishing opening 802. The second arc extinguishing opening 802 is equivalent to an air resistor. The second arc S2 may need to break through the second arc extinguishing opening 802 and therefore may consume energy. The second arc extinguishing structure 800 has a plurality of second arc extinguishing openings 802, and the plurality of second arc extinguishing openings 802 can improve an arc extinguishing effect.

In an implementation, the second static contact 300 is disposed adjacent to the second side frame 102, and when receiving the switch-off signal, the operation mechanism 11 controls the switch unit 10 to be turned off, so that the second end 420 of the movable contact 400 is separated from the second static contact 300 and moves toward the first side frame 101. In a process in which the second end 420 of the movable contact 400 is separated from the second static contact 300, the second arc S2 is formed between the second end of the movable contact and the second static contact. The second arc extinguishing structure 800 and the first arc extinguishing structure 500 are distributed on two sides of the movable contact 400 in the second direction Y. The second direction Y intersects with the first direction X. In the first direction X, the second arc extinguishing structure 800 is located between the first side frame 101 and the second side frame 102. The second arc extinguishing structure 800 includes a plurality of second arc extinguishing gate plates 801 that are arranged at spacings in the first direction X. The second arc extinguishing structure 800 is configured to cool the second arc S2. The second static contact 300 is electrically connected to a second arc extinguishing gate plate 801 adjacent to the second side frame 102, to improve a cooling effect of the second arc extinguishing structure 800 on the second arc S2.

In a process in which the second static contact 300 is separated from the movable contact 400, gas with a high temperature, strong light emission, and strong conductivity, namely, the second arc S2, is generated between the first static contact 200 and the movable contact 400.

The second arc extinguishing structure 800 is located between the first side frame 101 and the second side frame 102. More second arc extinguishing gate plates 801 can be accommodated between the first side frame 101 and the second side frame 102. The plurality of second arc extinguishing gate plates 801 may be arranged at spacings in the first direction X. The second arc extinguishing gate plates 801 extend in the second direction Y, to improve an arc extinguishing effect. In addition, the second static contact 300 is disposed adjacent to the second side frame 102. The second end 420 of the movable contact 400 is disposed adjacent to the first side frame 101 when the second end is disconnected. Two ends of the second arc S2 are respectively located at the second static contact 300 and the second end 420, so that the second arc extinguishing structure 800 can effectively extinguish the second arc S2. The second arc S2 and the second arc extinguishing structure 800 are disposed opposite to each other, so that the second arc extinguishing structure 800 can accommodate most of the second arc S2, to extinguish the second arc S2. The second arc extinguishing gate plate 801 is made of metal and is configured to cut the second arc S2 to extinguish the arc.

In a possible implementation, the first static contact 200 and the second static contact 300 are disposed opposite to each other in a fourth direction W. The fourth direction W intersects with the first direction X. The first end 410 and the second end 420 of the movable contact 400 are disposed opposite to each other in a fifth direction V. The fifth direction V intersects with the first direction X. In an implementation, the fifth direction V and the first direction X are disposed at an included angle of 45°. In this arrangement, the first arc S1 in the first fracture 201 and the second arc S2 in the second fracture 202 may be radiated to the first arc extinguishing structure 500 and the second arc extinguishing structure 800 respectively, and each arc extinguishing gate plate in the first arc extinguishing structure 500 and the second arc extinguishing structure 800 is fully used, to improve an arc extinguishing effect.

In a possible implementation, a ratio of a size of a gap between adjacent second arc extinguishing gate plates 801 in the first direction X to a size of the second arc extinguishing gate plate 801 in the first direction X is (1-1.5):1. In other words, a ratio of a size of the second arc extinguishing opening 802 in the first direction X to the size of the second arc extinguishing gate plate 801 in the first direction X is (1-1.5):1. This size ratio setting may enable a large quantity of second arc extinguishing gate plates 801 to be distributed in the housing 100, to improve an arc extinguishing effect. The second arc extinguishing structure 800 is arranged along a fourth side frame 104, so that more first arc extinguishing gate plates 501 can be distributed.

In a possible implementation, a size of the second arc extinguishing structure 800 in the first direction X is greater than a size of the second fracture 202 in the first direction X, to improve an arc extinguishing effect. Because the second arc S2 is formed in the second fracture 202, the size of the second arc extinguishing structure 800 in the first direction X is greater than a size of the second arc S2 in the first direction X, so that the second arc S2 can be effectively absorbed, to improve an arc extinguishing effect.

In a possible implementation, sizes of the second arc extinguishing gate plates 801 between the third arc extinguishing end part 81 and the fourth arc extinguishing end part 82 in the first direction X are the same, so that a processing process is simple.

In a possible implementation, sizes of the second arc extinguishing gate plates 801 in the first direction X gradually increase from the middle of the second arc extinguishing structure 800 to two ends, so that an end that is of the second arc extinguishing structure 800 and that faces the movable contact 400 is arc-shaped, to increase a size of the gate plate for cutting off the second arc S2. Sizes of the second arc extinguishing gate plates 801 between the third arc extinguishing end part 81 and the fourth arc extinguishing end part 82 in the first direction X are the same, so that a processing process is simple.

In a possible implementation, the second arc extinguishing structure 800 is disposed in an arc shape and is disposed around a periphery of the second fracture 202, to improve an arc extinguishing effect. The arc-shaped second arc extinguishing structure 800 may adapt to a case in which the housing 100 is a circular structure or an elliptical structure.

In a possible implementation, the second arc extinguishing gate plate 801 that is in the second arc extinguishing structure 800 and that is adjacent to the second side frame 102 is a third end-part arc extinguishing gate plate 810. The third end-part arc extinguishing gate plate 810 includes a third curved part 811 and a third flat plate part 812 that are connected to each other. The second arc extinguishing gate plate 801 adjacent to the third flat plate part 812 and the third flat plate part 812 are arranged at a spacing in the first direction X. An end that is of the third curved part 811 and that is away from the third flat plate part 812 is electrically connected to the second static contact 300. The third curved part 811 is configured to drive the second arc S2 to move toward the second arc extinguishing structure 800 when the second static contact 300 is separated from the second end 420 of the movable contact 400, to improve an arc extinguishing effect. When the second static contact 300 is separated from the second end 420 of the movable contact 400, because the third curved part 811 is electrically connected to the second static contact 300, at least a part of the second arc S2 flows into the third curved part 811 through the second static contact 300. There is a current A4 in the third curved part 811. According to the amperes rule in the electrified solenoid, a magnetic field line outward perpendicular to paper is generated on an inner side of the third curved part 811, and a magnetic field line inward perpendicular to paper is generated on an outer side of the third curved part 811. In an implementation shown in FIG. 20, a curvature center of the third curved part 811 is disposed away from the second arc S2, so that a direction of a magnetic field in an area in which the second arc S2 is located is a direction outward perpendicular to paper. Then according to the left-hand rule, the magnetic field line generates, on the second arc S2, an ampere force in a direction toward the second arc extinguishing structure 800. The ampere force drives the second arc S2 to move toward the second arc extinguishing structure 800. A path of the second arc S2 is extended to cool the second arc S2, and the second arc S2 can be more guided into the second arc extinguishing structure 800, to jointly improve an arc extinguishing effect.

In an implementation, a curvature center of the third curved part 811 may alternatively be disposed toward the second arc S2. In this case, a direction of a magnetic field in an area in which the second arc S2 is located is also a direction outward perpendicular to paper. The magnetic field line generates, on the second arc S2, an ampere force in a direction toward the second arc extinguishing structure 800. The ampere force drives the second arc S2 to move toward the second arc extinguishing structure 800. A path of the second arc S2 is extended to cool the second arc S2, and the second arc S2 can be more guided into the second arc extinguishing structure 800, to jointly improve an arc extinguishing effect.

In an implementation, the third curved part 811 may be in a triangle shape, an arc shape, a circular shape, or a multi-coil shape. The multi-coil shape can improve the density of magnetic field lines and increase a distance by which the second arc S2 moves toward the second arc extinguishing structure 800, to improve an arc extinguishing effect.

In a possible implementation, the third curved part 811 includes a seventh straight subpart 8111, a fifth curved subpart 8112, an eighth straight subpart 8113, a sixth curved subpart 8114, and a ninth straight subpart 8115 that are sequentially connected. The second static contact 300 includes a second contact end 310 and a second connection end 320. The second connection end 320 is disposed more adjacent to the second side frame 102 than the second contact end 310. The second contact end 310 is configured to connect to or disconnect from the second end 420 of the movable contact 400. An end that is of the seventh straight subpart 8111 and that is away from the fifth curved subpart 8112 is connected to the second connection end 320. Curvature centers of the fifth curved subpart 8112 and the sixth curved subpart 8114 are disposed away from the second static contact 300. The sixth curved subpart 8114 is disposed adjacent to the second contact end 310, to extend a movement path of the second arc S2 toward the second arc extinguishing structure 800. In this implementation, internal space of the housing 100 is fully used, and internal structure distribution is more appropriate, to reduce a size of the switch unit 10. The two curved subparts (8112 and 8114) are disposed, to improve an arc extinguishing effect. The sixth curved subpart 8114 is disposed adjacent to the second contact end 310, so that the second arc S2 can be transferred into the sixth curved subpart 8114 by using the second contact end 310, to improve an arc extinguishing effect.

In an implementation, the third flat plate part 812 and the seventh straight subpart 8111 are disposed side by side in the second direction Y, so that internal space of the housing 100 is fully used.

In an implementation, the switch unit 10 further includes a second terminal 602. The second terminal 602 is fastened to the second side frame 102. The seventh straight subpart 8111 is fastened to the second terminal 602 through a screw. The second terminal 602 is electrically connected to an external circuit, for example, electrically connected to a circuit board 3.

In a possible implementation, the second static contact 300 is located on a side that is of the third curved part 811 and that is adjacent to the movable contact 400. A second bent part 330 is disposed between the second contact end 310 and the second connection end 320. A curvature center of the second bent part 330 faces the third curved part 811. The second bent part 330 is configured to drive the second arc S2 to move toward the second arc extinguishing structure 800 when the second static contact 300 is separated from the second end 420 of the movable contact 400, to improve an arc extinguishing effect. The second bent part 330 also has a curved section. When the second static contact 300 is separated from the second end 420 of the movable contact 400, a current direction in the second static contact 300 is flowing from the second contact end 310 to the second connection end 320. According to the amperes rule in the electrified solenoid, a magnetic field line inward perpendicular to paper is generated on an inner side of the second bent part 330, and a magnetic field line outward perpendicular to paper is generated on an outer side of the second bent part 330. The second arc S2 is located in an external area of the second bent part 330. The magnetic field line generates, on the second arc S2, an ampere force in a direction toward the second arc extinguishing structure 800. The ampere force drives the second arc S2 to move toward the second arc extinguishing structure 800. A path of the second arc S2 is extended to cool the second arc S2, and the second arc S2 can be more guided into the second arc extinguishing structure 800, to jointly improve an arc extinguishing effect.

In this implementation, a structure of the first static contact 200 is the same as that of the second static contact 300. For details, refer to the foregoing description.

In a possible implementation, the second arc extinguishing structure 800 further includes a second curved gate plate 820. The second curved gate plate 820 is distributed between the second arc extinguishing gate plates 801 in the first direction X. The second curved gate plate 820 is configured to drive the second arc S2 to move toward the second arc extinguishing structure 800, to improve an arc extinguishing effect. When the second static contact 300 is separated from the second end 420 of the movable contact 400, a current sequentially enters the second arc extinguishing gate plates 801 distributed in the first direction X by using the third end-part arc extinguishing gate plate 810. When the current flows through the second curved gate plate 820, as shown in FIG. 20, a curvature center of the second curved gate plate 820 is disposed away from the movable contact 400. A current direction is flowing from the second connection end 320 to the second contact end 310. According to the amperes rule in the electrified solenoid, a magnetic field line inward perpendicular to paper is generated on an inner side of the second curved gate plate 820, and a magnetic field line outward perpendicular to paper is generated on an outer side of the second bent part 330. The second arc S2 is located in an external area of the second curved gate plate 820. The magnetic field line generates, on the second arc S2, an ampere force in a direction toward the second arc extinguishing structure 800. The ampere force drives the second arc S2 to move toward the second arc extinguishing structure 800. A path of the second arc S2 is extended to cool the second arc S2, and the second arc S2 can be more guided into the second arc extinguishing structure 800, to jointly improve an arc extinguishing effect.

In an implementation, a curvature center of the second curved gate plate 820 is disposed toward the movable contact 400, so that the second curved gate plate 820 can still drive the second arc S1 to move toward the second arc extinguishing structure 800 when the second arc S2 is located in the second curved gate plate 820, to improve an arc extinguishing effect.

In an implementation, there may be one or more second curved gate plates 820 (as shown in FIG. 17). The second curved gate plate 820 includes two straight subparts and a curved subpart located between the two straight subparts. The straight subparts and other second arc extinguishing gate plates 801 are disposed at spacings in the first direction X. A curvature center of the curved subpart may be disposed toward the movable contact 400. When there may be a plurality of second curved gate plates 820, shapes of the second curved gate plates 820 may be the same or different. Some second curved gate plates 820 are in a "U" shape, and some second curved gate plates 820 are in an "S" shape, and the like.

In a possible implementation, a second arc extinguishing gate plate 801 that is of the second arc extinguishing structure 800 and that is adjacent to the first side frame 101 is a fourth end-part arc extinguishing gate plate 830. The fourth end-part arc extinguishing gate plate 830 includes a fourth curved part 831 and a fourth flat plate part 832 that are connected to each other (as shown in FIG. 17). The second arc extinguishing gate plate 801 adjacent to the fourth flat plate part 832 and the fourth flat plate part 832 are arranged at a spacing in the first direction X. An end that is of the fourth curved part 831 and that is away from the fourth flat plate part 832 is disposed adjacent to the second end 420 of the movable contact 400. The fourth curved part 831 is configured to drive the second arc S2 to move toward the second arc extinguishing structure 800 when the second static contact 300 is separated from the second end 420 of the movable contact 400, to improve an arc extinguishing effect. When the current flows through the fourth curved part 831, a magnetic field is generated. The magnetic field may drive the second arc S2 to move toward the second arc extinguishing structure 800, to improve an arc extinguishing effect. For a principle, refer to the foregoing description. Details are not described herein again. In this implementation, an end that is of the fourth curved part 831 and that is away from the fourth flat plate part 832 is electrically connected to a connecting piece 700.

In a possible implementation, a structure of the fourth curved part 831 is the same as that of the second curved part 532. For a structure of the fourth curved part 831, refer to the structure of the second curved part 532. The fourth curved part 831 is configured to extend a movement path of the second arc S2 toward the second arc extinguishing structure 800. When the second static contact 300 is separated from the second end 420 of the movable contact 400, the second end 420 is more adjacent to the fourth curved subpart 8322, so that the second arc S2 is better guided into the fourth curved subpart 8322, to improve an arc extinguishing effect.

In an implementation, an area in which the second arc extinguishing structure 800 is located is a second arc extinguishing chamber. The sixth curved subpart 8114 and a curved portion of the fourth curved part 831 are disposed opposite to each other in the first direction X, to form an opening of the second arc extinguishing chamber. The second arc S2 enters the second arc extinguishing chamber through the opening.

In a possible implementation, the switch unit 10 further includes a second guide member 606 (as shown in FIG. 17). The second guide member 606 is located on a side that is of the second arc extinguishing structure 800 and that is away from the movable contact 400 and is configured to discharge hot air generated by the second arc S1. In an implementation, the second guide member 606 may be located at an end that is of the second arc extinguishing gate plate 801 and that is away from the movable contact 400. The second guide member 606 and the second arc extinguishing gate plate 801 are disposed at an included angle. An extension direction of the second guide member 606 points to an air flow outlet.

In this implementation, the housing 100 includes a second outlet 607. The extension direction of the second guide member 606 is disposed corresponding to the second outlet 607, to exhaust hot air sequentially and orderly to a maximum extent, thereby avoiding arc rollback caused by air flow disorder. A quantity of the second guide members 606 may be set based on a requirement. This is not limited.

In a possible implementation, the switch unit 10 further includes a connecting piece 700. The connecting piece 700 is connected between the second arc extinguishing end part 52 and the fourth arc extinguishing end part 82. The second arc extinguishing end part 52 is connected to the fourth arc extinguishing end part 82 through the connecting piece 700. For the first arc S1, the first arc S1 is guided into the first arc extinguishing structure 500 and flows out of the second end-part arc extinguishing gate plate 530. If the connecting piece 700 is not disposed to connect the second end-part arc extinguishing gate plate 530 and the fourth end-part arc extinguishing gate plate 830, there is a risk that a current flowing into the second end-part arc extinguishing gate plate 530 breaks down air, flows into the first end 410 of the movable contact 400, and then burns the first end 410 of the movable contact 400. When the movable contact 400 is disconnected, the movable contact 400 has a risk of rebounding to the first static contact 200 and the second static contact 300, affecting an off effect of the switch unit 10. By using the connecting piece 700, a current of the first arc extinguishing structure 500 may be guided into the connecting piece 700, to reduce a risk of burning the first end 410 of the movable contact 400 and reduce a risk that the movable contact 400 rebounds to the first static contact 200 and the second static contact 300. For the second arc S2, the second arc S2 is guided into the second arc extinguishing structure 800, to reduce a risk of burning the second end 420 of the movable contact 400. The first arc extinguishing structure 500 and the second arc extinguishing structure 800 are connected through the connecting piece 700, so that potentials of the first arc extinguishing structure 500 and the second arc extinguishing structure 800 are equal, to improve safety of the switch unit 10.

In an implementation, the first arc extinguishing gate plate 501 that is of the first arc extinguishing structure 500 and that is adjacent to the second side frame 102 is a second end-part arc extinguishing gate plate 530. The second arc extinguishing gate plate 801 that is of the second arc extinguishing structure 800 and that is adjacent to the first side frame 101 is a fourth end-part arc extinguishing gate plate 830. The connecting piece 700 is connected to the second end-part arc extinguishing gate plate 530 and the fourth end-part arc extinguishing gate plate 830. The first arc extinguishing structure 500 and the second arc extinguishing structure 800 are connected through the connecting piece 700, so that potentials of the first arc extinguishing structure 500 and the second arc extinguishing structure 800 are equal, to improve safety of the switch unit 10.

In a possible implementation, the housing 100 includes a first side panel 105 and a second side panel 106 that are disposed opposite to each other in a third direction Z. The movable contact 400, the first static contact 200, the second static contact 300, the first arc extinguishing structure 500, and the second arc extinguishing structure 800 are located between the first side panel 105 and the second side panel 106. The connecting piece 700 is located on a side that is of the second side panel 106 and that is away from the first side panel 105. The second end-part arc extinguishing gate plate 530 and the fourth end-part arc extinguishing gate plate 830 penetrate through the second side panel 106 to be electrically connected to the connecting piece 700. In this way, the connecting piece 700 is insulated from the movable contact 400, and safety is improved.

In this implementation, the first side frame 101, the second side frame 102, the third side frame 103, the fourth side frame 104, the first side panel 105, and the second side panel 106 jointly form the housing 100.

Figure 22:
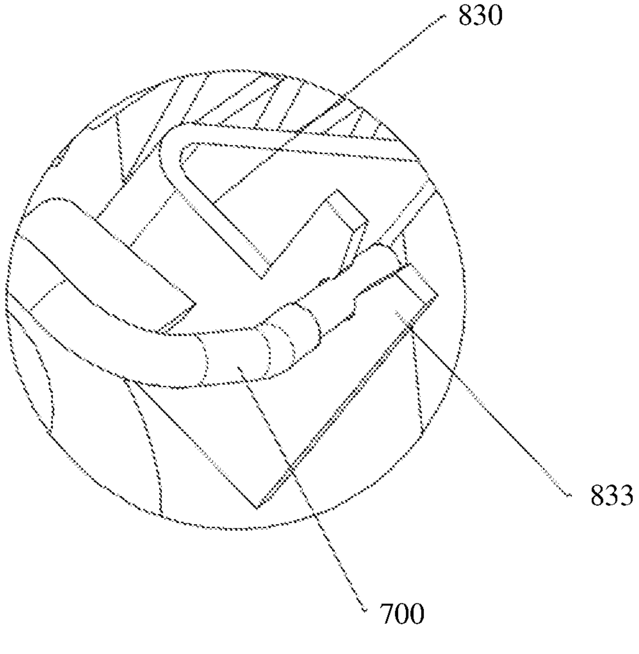
FIG. 22 is a partial schematic diagram of a switch unit according to an embodiment.

In an implementation, a first through hole (not shown in the figure) and a second through hole (not shown in the figure) are disposed in the second side panel 106. A first protrusion part 533 is disposed at an end of the second end-part arc extinguishing gate plate 530 (as shown in FIG. 1). A second protrusion part 833 is disposed at an end of the fourth end-part arc extinguishing gate plate 830 (as shown in FIG. 1 and FIG. 22). The first protrusion part 533 and the second protrusion part 833 penetrate through the first through hole and the second through hole to be electrically connected to two ends of the connecting piece 700 respectively. In an implementation, a surface of the connecting piece 700 is wrapped by an insulation material, to insulate the outside and improve safety.

In a possible implementation, the first arc extinguishing structure 500 further includes a first fastening plate 540. The first fastening plate 540 is configured to fasten the first arc extinguishing gate plate 501 in a specified direction, for example, the first direction X or an arc-shaped direction. The first fastening plate 540 is made of an insulation material, for example, a paper sheet. In an implementation, two first fastening plates 540 may be included. The two first fastening plates 540 are fastened to two ends of the first arc extinguishing gate plate 501 in the third direction Z. In an implementation, only one first fastening plate 540 may be included. The first fastening plate 540 and the first side panel 105 are fastened to two ends of the first arc extinguishing gate plate 501 in the third direction Z. In some implementations, the first fastening plate 540 may not be disposed. The first arc extinguishing gate plate 501 may be directly fastened to the first side panel 105 and/or the second side panel 106.

In a possible implementation, the second arc extinguishing structure 800 further includes a second fastening plate 840. The second fastening plate 840 is configured to fasten the second arc extinguishing gate plate 801 in a specified direction, for example, the first direction X or the arc-shaped direction. The second fastening plate 840 is made of an insulation material, for example, a paper sheet. In an implementation, two second fastening plates 840 may be included. The two second fastening plates 840 are fastened to two ends of the second arc extinguishing gate plate 801 in the third direction Z. In an implementation, only one second fastening plate 840 may be included. The second fastening plate 840 and the first side panel 105 are fastened to two ends of the second arc extinguishing gate plate 801 in the third direction Z. In some implementations, the second fastening plate 840 may not be disposed. The second arc extinguishing gate plate 801 may be directly fastened to the first side panel 105 and/or the second side panel 106.

In an implementation, when the switch unit 10 is turned on, an extension direction of the movable contact 400 and the second direction Y are disposed at an included angle of 45°. When the switch unit 10 is turned off, the movable contact 400 rotates clockwise by 90°. Therefore, the movable contact 400 in an off state and the movable contact in an on state are in mirror symmetry with respect to the second direction Y. In this case, the included angle between the extension direction of the movable contact 400 and the second direction Y is 45°.

In a possible implementation, the first arc extinguishing structure 500 and the second arc extinguishing structure 800 rotate about the rotation center O of the movable contact 400 to implement 180° symmetry, and the first static contact 200 and the second static contact 300 rotate about the rotation center O of the movable contact 400 to implement 180° symmetry, so that the switch unit 10 has a more regular structure and is convenient to install and prepare.

Figure 23:
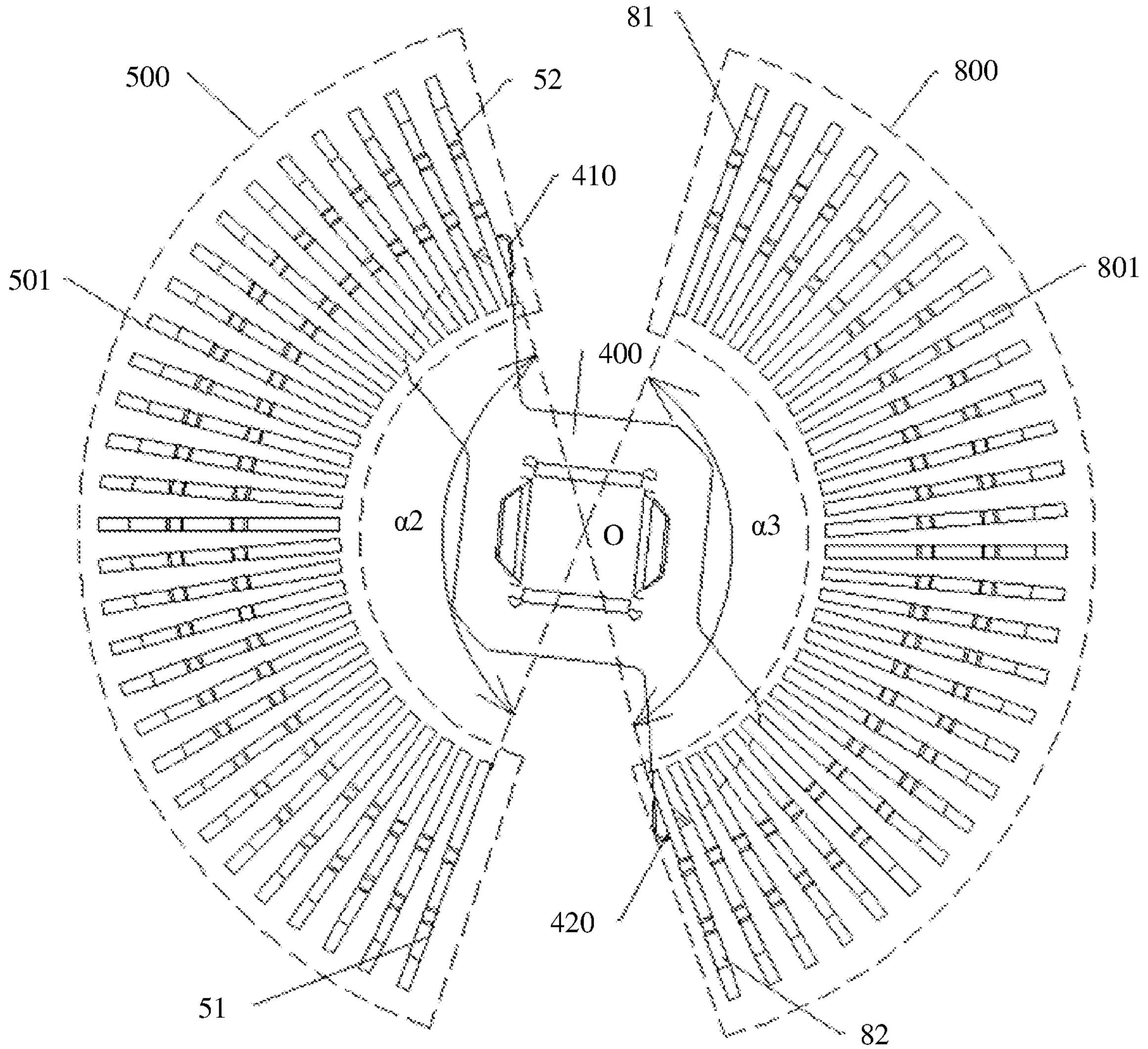
FIG. 23 is a top view of a first arc extinguishing structure, a second arc extinguishing structure, and a movable contact in a switch unit according to an embodiment.
Figure 24:
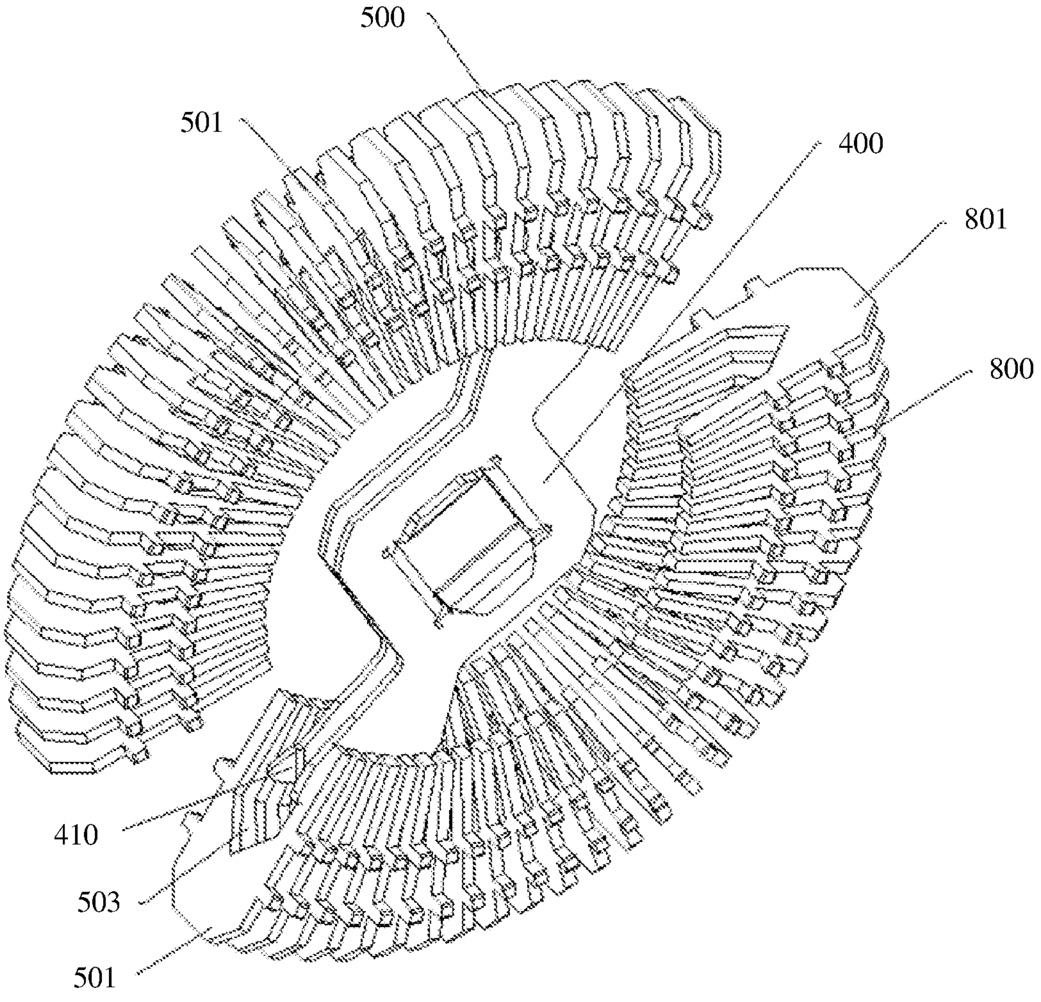
FIG. 24 is a schematic three-dimensional diagram of a structure of a first arc extinguishing structure, a second arc extinguishing structure, and a movable contact in a switch unit according to FIG. 23.
Figure 25:
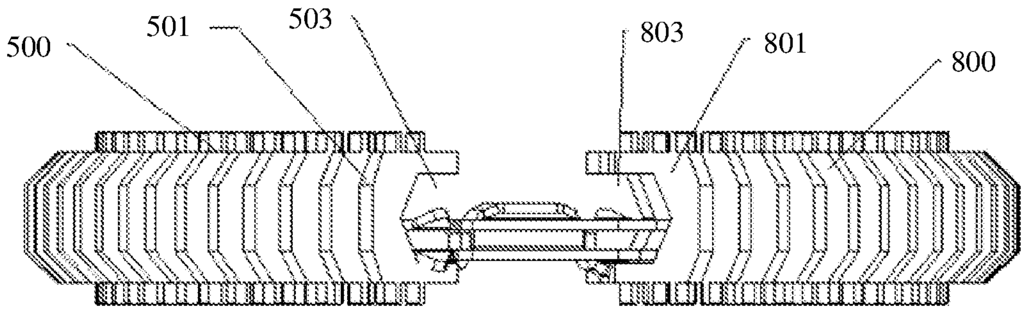
FIG. 25 is a side view of a first arc extinguishing structure, a second arc extinguishing structure, and a movable contact in a switch unit according to FIG. 23.

FIG. 23 is a top view of a first arc extinguishing structure 500, a second arc extinguishing structure 800, and a movable contact 400 in a switch unit according to an embodiment. FIG. 24 is a schematic three-dimensional diagram of a structure of a first arc extinguishing structure 500, a second arc extinguishing structure 800, and a movable contact 400 in a switch unit according to FIG. 23. FIG. 25 is a side view of a first arc extinguishing structure 500, a second arc extinguishing structure 800, and a movable contact 400 in a switch unit according to FIG. 23. In this implementation, the first arc extinguishing structure 500 and the second arc extinguishing structure 800 are arc-shaped structures. The first arc extinguishing structure 500 and the second arc extinguishing structure 800 are set to the arc-shaped structures, so that a quantity of arc extinguishing gate plates in the switch unit 10 can be increased, to improve an arc extinguishing effect. Alternatively, a same quantity of arc extinguishing gate plates in the first arc extinguishing structure 500 and the second arc extinguishing structure 800 may be distributed more compactly, so that a size of the first arc extinguishing structure 500 and the second arc extinguishing structure 800 is smaller, and a size of the switch unit 10 may be reduced.

In a possible implementation, the first arc extinguishing structure 500 includes a plurality of first arc extinguishing gate plates 501 that are sequentially arranged at spacings (as shown in FIG. 23). The plurality of first arc extinguishing gate plates 501 may be arranged in a sector shape. Extension directions of two adjacent first arc extinguishing gate plates 501 intersect. In this implementation, the plurality of first arc extinguishing gate plates 501 may be arranged in the sector shape. One end of each of the first arc extinguishing gate plates 501 is folded toward the rotation center O, and the other end of each of the first arc extinguishing gate plates 501 is unfolded away from the rotation center O, so that more first arc extinguishing gate plates 501 can be accommodated in the switch unit 10, to improve an arc extinguishing effect.

In a possible implementation, the first arc extinguishing structure 500 includes 58 first arc extinguishing gate plates 501. In some implementations, the first arc extinguishing structure 500 includes 68 first arc extinguishing gate plates 501 or 72 first arc extinguishing gate plates 501. In another implementation, a quantity of first arc extinguishing gate plates 501 may be set based on a requirement.

In a possible implementation, included angles between every two adjacent first arc extinguishing gate plates 501 are equal, and sizes of the first arc extinguishing gate plates 501 are the same. In this way, an inner side of the first arc extinguishing structure 500 is arc-shaped, and an outer side of the first arc extinguishing structure 500 is arc-shaped. In some implementations, due to a process error, an included angle between some two first arc extinguishing gate plates 501 is large or small, but a difference between the included angles between every two adjacent first arc extinguishing gate plates 501 is less than 2°.

In a possible implementation, an angle value of the second included angle $\alpha 2$ is greater than or equal to 120°. In this way, the first arc extinguishing structure 500 has a good arc extinguishing effect.

In a possible implementation, an angle value of the third included angle $\alpha 3$ is greater than or equal to 120°. In this way, the second arc extinguishing structure 800 has a good arc extinguishing effect.

In a possible implementation, an angle value of the second included angle $\alpha 2$ is greater than or equal to 140° and less than or equal to 180°. In this way, the first arc extinguishing structure 500 has a good arc extinguishing effect.

In a possible implementation, an angle value of the third included angle $\alpha 3$ is greater than or equal to 140° and less than or equal to 180°. In this way, the second arc extinguishing structure 800 has a good arc extinguishing effect.

In a possible implementation, an angle value of the second included angle $\alpha 2$ is equal to an angle value of the third included angle $\alpha 3$. In some implementations, an angle value of the second angle $\alpha 2$ is not equal to an angle value of the third angle $\alpha 3$.

In this implementation, an angle value of the second included angle $\alpha 2$ is equal to 140°, and an angle value of the third included angle $\alpha 3$ is equal to 140°. In this way, the first arc extinguishing structure 500 and the second arc extinguishing structure 800 have a good arc extinguishing effect. In this implementation, shapes of the first arc extinguishing structure 500 and the second arc extinguishing structure 800 are similar to a "C" shape.

Figure 26:
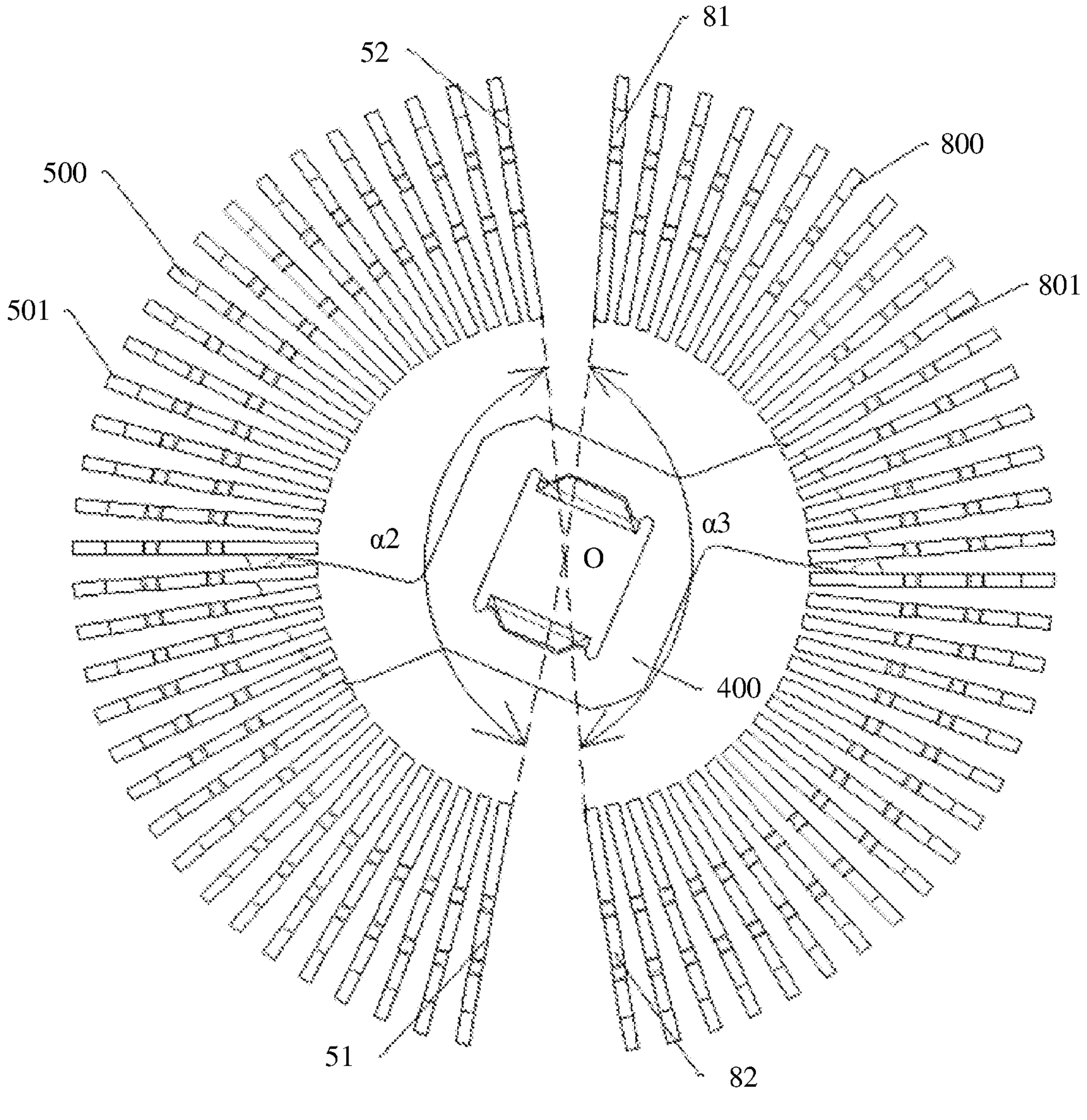
FIG. 26 is a top view of a first arc extinguishing structure, a second arc extinguishing structure, and a movable contact in a switch unit according to an embodiment.

FIG. 26 is a top view of a first arc extinguishing structure 500, a second arc extinguishing structure 800, and a movable contact 400 in a switch unit according to an embodiment. In this implementation, an angle value of the second included angle $\alpha 2$ is equal to 160°, and an angle value of the third included angle $\alpha 3$ is equal to 160°. In this way, the first arc extinguishing structure 500 and the second arc extinguishing structure 800 have a good arc extinguishing effect.

Figure 27:
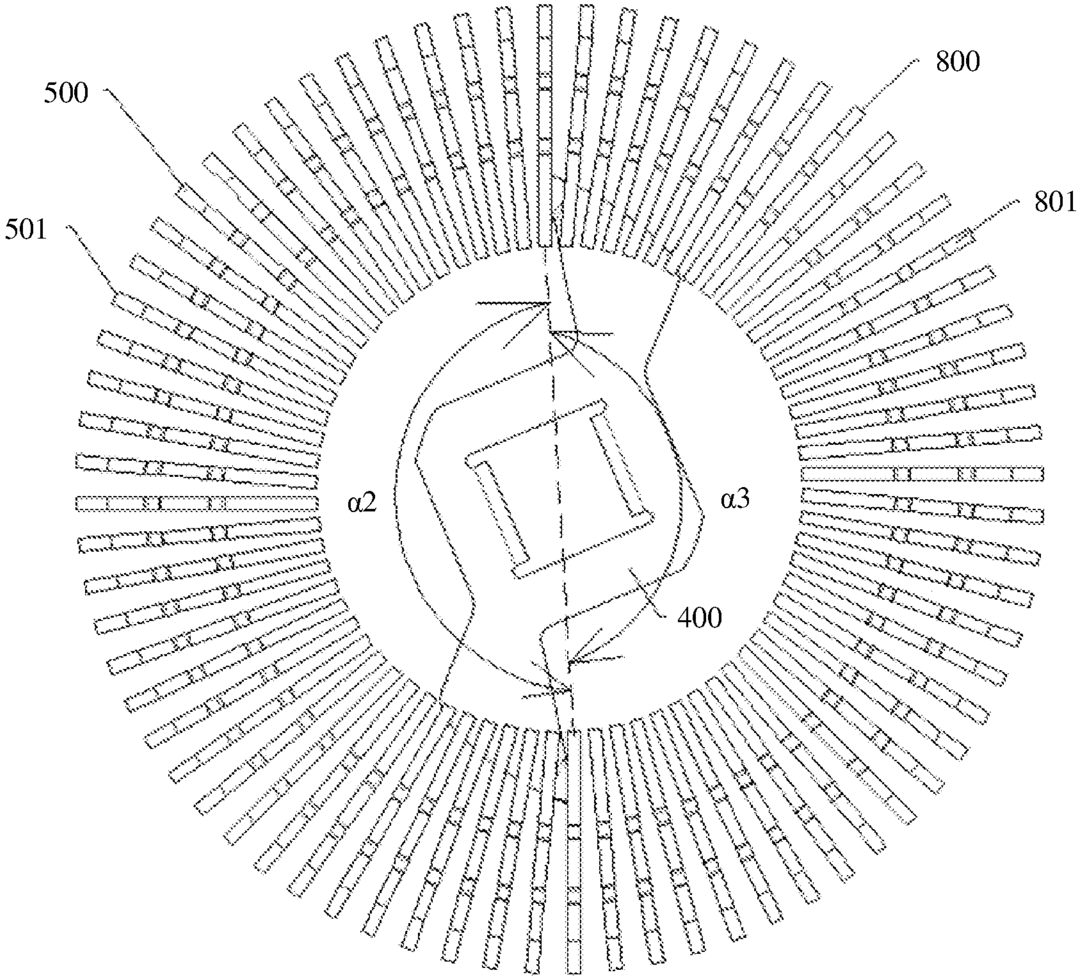
FIG. 27 is a top view of a first arc extinguishing structure, a second arc extinguishing structure, and a movable contact in a switch unit according to an embodiment.

FIG. 27 is a top view of a first arc extinguishing structure 500, a second arc extinguishing structure 800, and a movable contact 400 in a switch unit according to an embodiment. In this implementation, an angle value of the second included angle $\alpha 2$ is equal to 180°, and an angle value of the third included angle $\alpha 3$ is equal to 180°. In this way, the first arc extinguishing structure 500 and the second arc extinguishing structure 800 have a good arc extinguishing effect. In this implementation, the first arc extinguishing structure 500 and the second arc extinguishing structure 800 form a circle, so that more arc extinguishing gate plates may be arranged in the switch unit, to improve an arc extinguishing capability.

It should be noted that radians of the first arc extinguishing structure 500 and the second arc extinguishing structure 800 are not limited to the angles shown in FIG. 23, FIG. 26, and FIG. 27, and may be further set based on a requirement.

Figure 28:
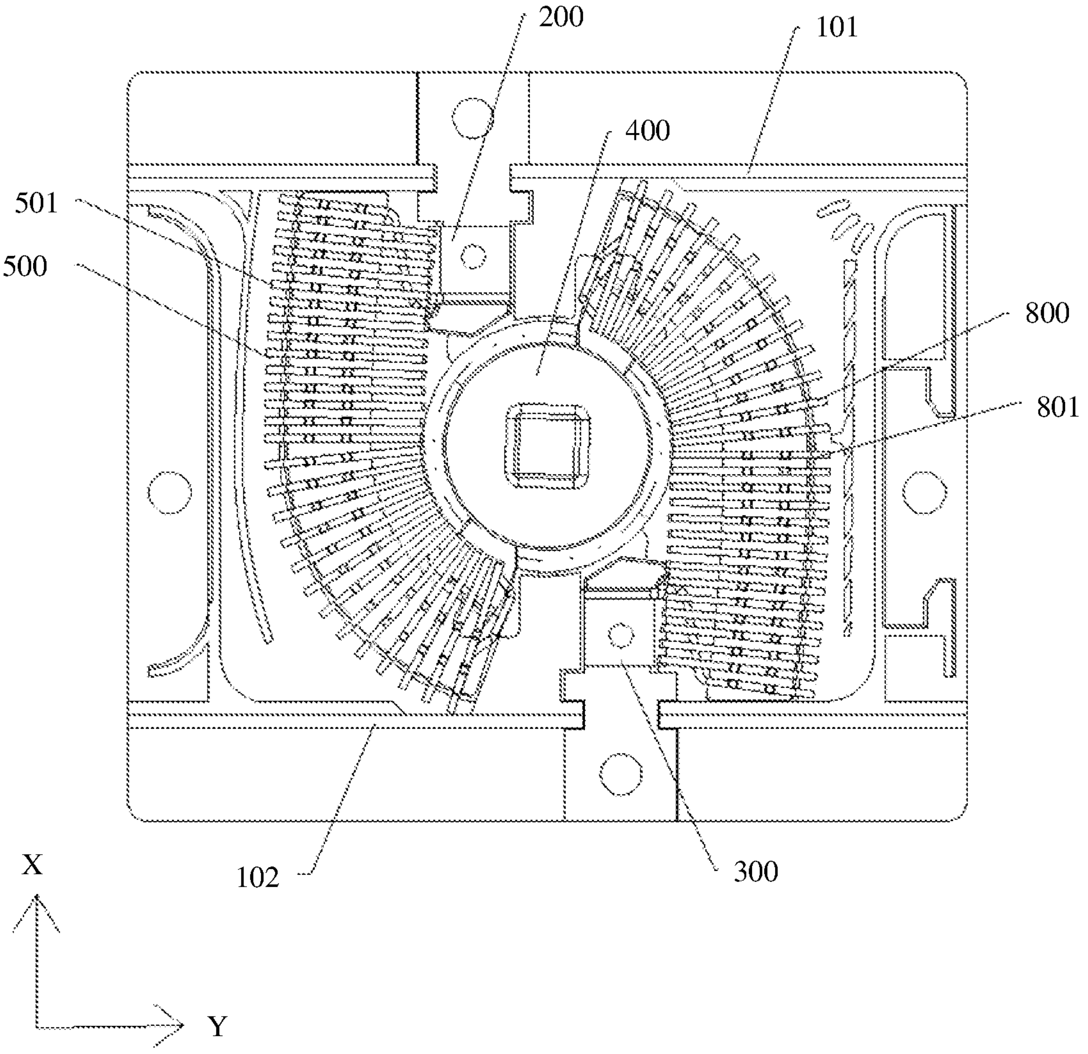
FIG. 28 is a top view of a switch unit according to an embodiment.
Figure 29:
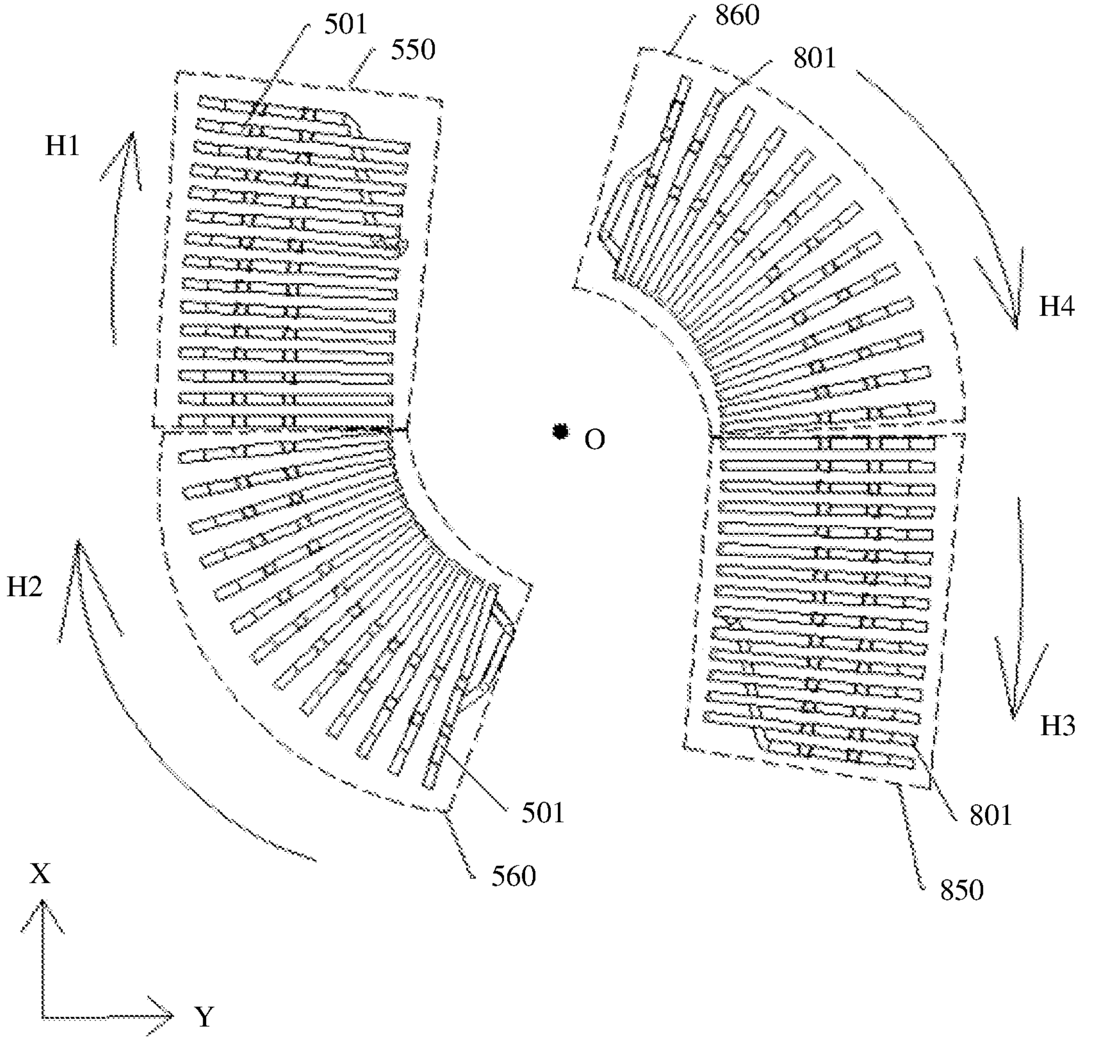
FIG. 29 is a top view of a first arc extinguishing structure and a second arc extinguishing structure according to FIG. 28.

FIG. 28 is a top view of a switch unit according to an embodiment. FIG. 29 is a top view of a first arc extinguishing structure 500 and a second arc extinguishing structure 800 in FIG. 28. The first arc extinguishing structure 500 includes a first arc extinguishing part 550 and a second arc extinguishing part 560. The second arc extinguishing structure 800 includes a third arc extinguishing part 850 and a fourth arc extinguishing part 860. In this implementation, the first arc extinguishing structure 500 includes a first arc extinguishing part 550 and a second arc extinguishing part 560. The first arc extinguishing part 550 includes a plurality of first arc extinguishing gate plates 501 that are sequentially arranged at spacings. The second arc extinguishing part 560 includes a plurality of first arc extinguishing gate plates 501 that are sequentially arranged at spacings. An arrangement direction of the plurality of first arc extinguishing gate plates 501 in the first arc extinguishing part 550 intersects with an arrangement direction of the plurality of first arc extinguishing gate plates 501 in the second arc extinguishing part 560.

In this implementation, the arrangement direction of the first arc extinguishing gate plates 501 in the first arc extinguishing part 550 and the arrangement direction of the first arc extinguishing gate plates 501 in the second arc extinguishing part 560 are different. In the implementation shown in FIG. 9, all the first arc extinguishing gate plates 501 in the first arc extinguishing structure 500 are arranged at spacings in the first direction X. It may be understood that the arrangement directions of the first arc extinguishing gate plates 501 in FIG. 28 and FIG. 9 are different. In this implementation, the arrangement direction of the plurality of first arc extinguishing gate plates 501 in the first arc extinguishing part 550 intersects with the arrangement direction of the plurality of first arc extinguishing gate plates 501 in the second arc extinguishing part 560, so that the first arc extinguishing gate plates 501 in the first arc extinguishing structure 500 are distributed more flexibly. A shape of the first arc extinguishing structure 500 may be flexibly set based on a structure in the switch unit 10, so that more first arc extinguishing gate plates 501 are placed in limited space, to improve an arc extinguishing effect.

In a possible implementation, the first arc extinguishing gate plates 501 in the first arc extinguishing part 550 are sequentially arranged in a direction from the second arc extinguishing part 560 to the first static contact 200, so that the first arc extinguishing part 550 can effectively extinguish the first arc S1. In this implementation, an extension direction of the first arc extinguishing part 550 is adjacent to the first static contact 200, so that the first arc S1 generated when the first static contact 200 is separated from the movable contact 400 can quickly enter the first arc extinguishing part 550, to improve an arc extinguishing effect.

In a possible implementation, the first arc extinguishing part 550 is an arc-shaped structure. The plurality of first arc extinguishing gate plates 501 in the first arc extinguishing part 550 may be arranged along a first arc shape H1 The first arc extinguishing part 550 is more adjacent to the first static contact 200 than the second arc extinguishing part 560. The plurality of first arc extinguishing gate plates 501 in the second arc extinguishing part 560 may be arranged along a second arc shape H2. A curvature radius of the first arc shape H1 is less than a curvature radius of the second arc shape H2. A larger curvature radius indicates a larger bending degree. In this implementation, a curvature radius of the first arc extinguishing part 550 is less than a curvature radius of the second arc extinguishing part 560. Ends that are of the first arc extinguishing gate plates 501 in the second arc extinguishing part 560 and that are adjacent to the rotation center O are gathered more closely, to reduce space consumption and reduce a size of the second arc extinguishing part 560. Because the first arc extinguishing part 550 is more adjacent to the first static contact 200, the first arc extinguishing part 550 has a narrow disposing space. The curvature radius of the first arc extinguishing part 550 is reduced, to facilitate installation and manufacturing and reduce process difficulty. In this implementation, the first arc extinguishing part 550 and the second arc extinguishing part 560 are used in combination, to improve an arc extinguishing effect and also simplify a manufacturing process.

In this implementation, the second arc extinguishing structure 800 is similar to the first arc extinguishing structure 500.

The second arc extinguishing structure 800 may include a third arc extinguishing part 850 and a fourth arc extinguishing part 860. The third arc extinguishing part 850 includes a plurality of second arc extinguishing gate plates 801 that are sequentially arranged at spacings. The fourth arc extinguishing part 860 includes a plurality of second arc extinguishing gate plates 801 that are sequentially arranged at spacings. An arrangement direction of the plurality of second arc extinguishing gate plates 801 in the third arc extinguishing part 850 intersects with an arrangement direction of the plurality of second arc extinguishing gate plates 801 in the fourth arc extinguishing part 860.

In this implementation, the arrangement direction of the second arc extinguishing gate plates 801 in the third arc extinguishing part 850 and the arrangement direction of the second arc extinguishing gate plates 801 in the fourth arc extinguishing part 860 are different. In the implementation shown in FIG. 9, all the second arc extinguishing gate plates 801 in the second arc extinguishing structure 800 are arranged at spacings in the first direction X. It may be understood that the arrangement directions of the second arc extinguishing gate plates 801 in FIG. 28 and FIG. 9 are different. In this implementation, the arrangement direction of the plurality of second arc extinguishing gate plates 801 in the third arc extinguishing part 850 intersects with the arrangement direction of the plurality of second arc extinguishing gate plates 801 in the fourth arc extinguishing part 860, so that the second arc extinguishing gate plates 801 in the second arc extinguishing structure 800 are distributed more flexibly. A shape of the second arc extinguishing structure 800 may be flexibly set based on a structure in the switch unit 10, so that more second arc extinguishing gate plates 801 are placed in limited space.

In a possible implementation, the second arc extinguishing gate plates 801 in the third arc extinguishing part 850 are sequentially arranged in a direction from the fourth arc extinguishing part 860 to the second static contact 300, so that the third arc extinguishing part 850 can effectively extinguish the second arc S2. In this implementation, an extension direction of the third arc extinguishing part 850 is adjacent to the second static contact 300, so that the second arc S2 generated when the second static contact 300 is separated from the movable contact 400 can quickly enter the third arc extinguishing part 850, to improve an arc extinguishing effect.

In a possible implementation, the third arc extinguishing part 850 is an arc-shaped structure. The plurality of second arc extinguishing gate plates 801 in the third arc extinguishing part 850 may be arranged along a third arc shape H3. The third arc extinguishing part 850 is more adjacent to the second static contact 300 than the fourth arc extinguishing part 860. The plurality of second arc extinguishing gate plates 801 in the fourth arc extinguishing part 860 may be arranged along a fourth arc shape H4. A curvature radius of the third arc shape H3 is less than a curvature radius of the fourth arc shape H4. A larger curvature radius indicates a larger bending degree. In this implementation, a curvature radius of the third arc extinguishing part 850 is less than a curvature radius of the fourth arc extinguishing part 860. Ends that are of the second arc extinguishing gate plates 801 in the fourth arc extinguishing part 860 and that are adjacent to the rotation center O are gathered more closely, to reduce space consumption and reduce a size of the fourth arc extinguishing part 860. Because the third arc extinguishing part 850 is more adjacent to the second static contact 300, the curvature radius of the third arc extinguishing part 850 is reduced, to facilitate installation and manufacturing and reduce process difficulty. In this implementation, the third arc extinguishing part 850 and the fourth arc extinguishing part 860 are used in combination, to improve an arc extinguishing effect and also simplify a manufacturing process.

In a possible implementation, curvature radiuses of the first arc shape H1 and the third arc shape H3 are the same, and curvature radiuses of the second arc shape H2 and the fourth arc shape H4 are the same, so that the first arc extinguishing structure 500 and the second arc extinguishing structure 800 rotate about the rotation center O to implement 180° symmetry.

In a possible implementation, the first arc extinguishing part 550 and the fourth arc extinguishing part 860 are more adjacent to the first side frame 101, and the second arc extinguishing part 560 and the third arc extinguishing part 850 are more adjacent to the second side frame 102.

In a possible implementation, the second arc extinguishing structure 800 and the first arc extinguishing structure 500 rotate about the rotation center O to implement 180° symmetry.

Figure 30:
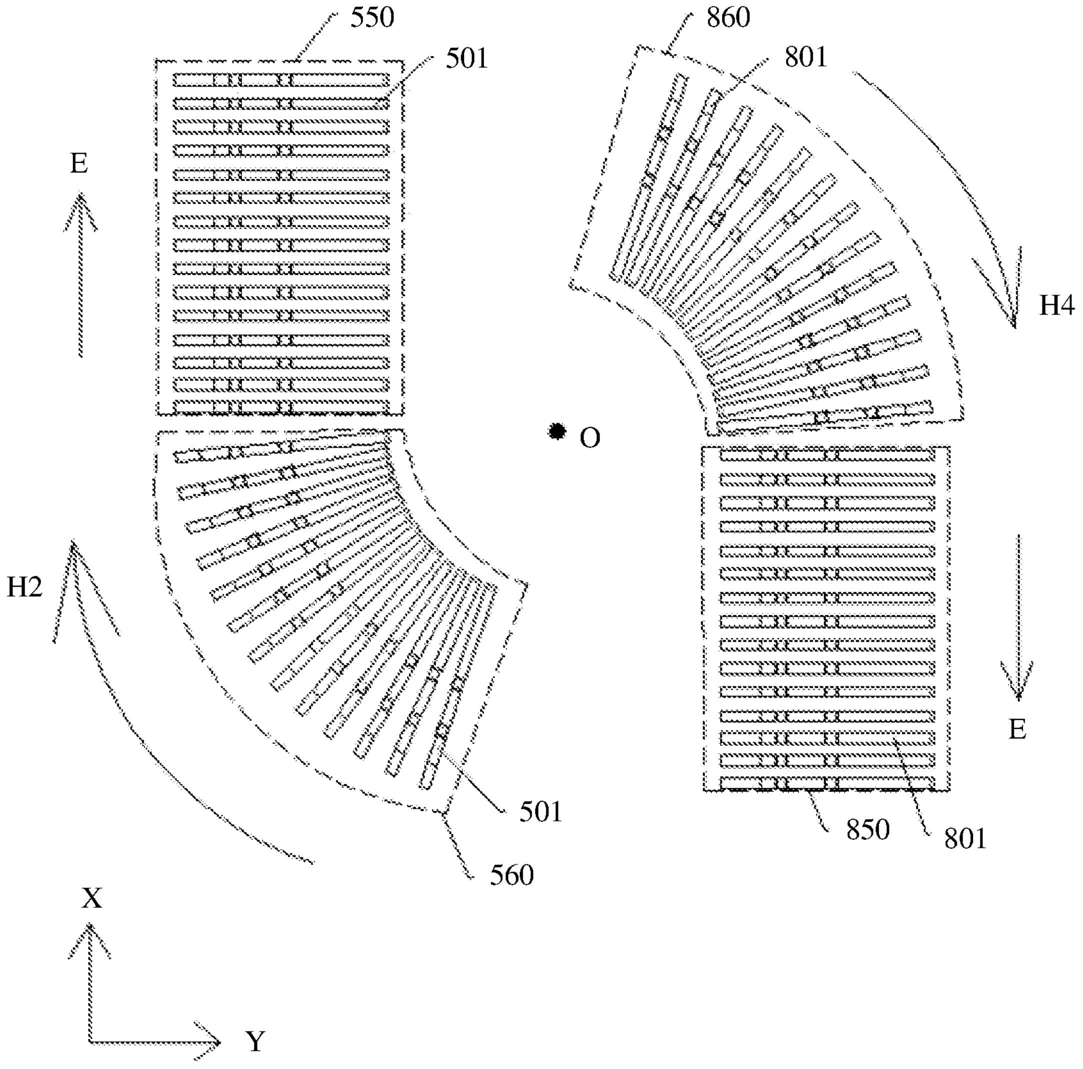
FIG. 30 is a top view of a first arc extinguishing structure and a second arc extinguishing structure in a switch unit according to an embodiment.

FIG. 30 is a top view of a first arc extinguishing structure and a second arc extinguishing structure in a switch unit according to an embodiment. The first arc extinguishing structure 500 includes a first arc extinguishing part 550 and a second arc extinguishing part 560. The second arc extinguishing structure 800 includes a third arc extinguishing part 850 and a fourth arc extinguishing part 860. In a possible implementation, the plurality of first arc extinguishing gate plates 501 in the first arc extinguishing part 550 may be arranged in a sixth direction E. The first arc extinguishing part 550 is more adjacent to the first static contact 200 than the second arc extinguishing part 560. The second arc extinguishing part 560 is an arc-shaped structure. The plurality of first arc extinguishing gate plates 501 in the second arc extinguishing part 560 may be arranged along a second arc shape H2. The sixth direction E intersects with an extension direction of the first arc extinguishing gate plates 501 in the first arc extinguishing part 550. The sixth direction E intersects with an extension direction of the second arc shape H2. Different from the implementation shown in FIG. 29, the sixth direction E in which the first arc extinguishing gate plates 501 in the first arc extinguishing part 550 are arranged is a straight line. The sixth direction E intersects with the second direction Y. The sixth direction E is the same as the first direction X. In this implementation, the first arc extinguishing structure 500 also has a good arc extinguishing effect, and may adapt to different application scenarios, to improve installation flexibility of the first arc extinguishing structure 500.

In an implementation, in the first arc extinguishing part 550, an included angle between the sixth direction E and the extension direction of the first arc extinguishing gate plates 501 in the first arc extinguishing part 550 is less than 90°.

In an implementation, the second arc extinguishing part 560 is arranged in a sector shape. The first arc extinguishing gate plates 501 in the second arc extinguishing part 560 are arranged in a direction from the first arc extinguishing part 550 around the rotation center O.

In this implementation, the plurality of second arc extinguishing gate plates 801 in the third arc extinguishing part 850 may be arranged in the sixth direction E. The third arc extinguishing part 850 is more adjacent to the second static contact 300 than the fourth arc extinguishing part 860. The fourth arc extinguishing part 860 is an arc-shaped structure. The plurality of second arc extinguishing gate plates 801 in the fourth arc extinguishing part 860 may be arranged along the fourth arc shape H4. The sixth direction E intersects with the extension direction of the second arc extinguishing gate plates 801 in the third arc extinguishing part 850. The sixth direction E intersects with an extension direction of the fourth arc shape H4. Different from the implementation shown in FIG. 29, the sixth direction E in which the second arc extinguishing gate plates 801 in the third arc extinguishing part 850 are arranged is a straight line. The sixth direction E intersects with the second direction Y. The sixth direction E is the same as the first direction X.

In an implementation, in the third arc extinguishing part 850, an included angle between the sixth direction E and the extension direction of the second arc extinguishing gate plates 801 in the third arc extinguishing part 850 is less than 90°.

In an implementation, the fourth arc extinguishing part 860 is arranged in a sector shape. The second arc extinguishing gate plates 801 in the fourth arc extinguishing part 860 are arranged in a direction from the third arc extinguishing part 850 around the rotation center O.

Figure 31:
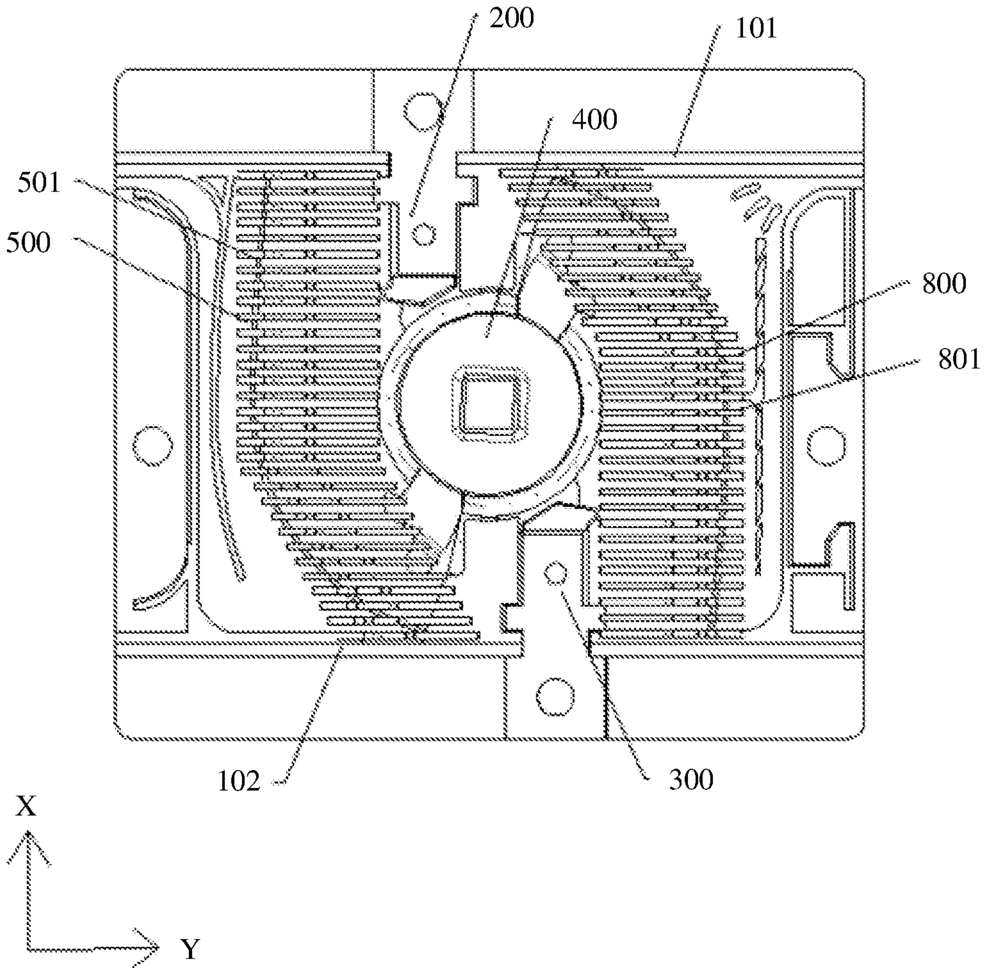
FIG. 31 is a top view of a switch unit according to an embodiment.
Figure 32:
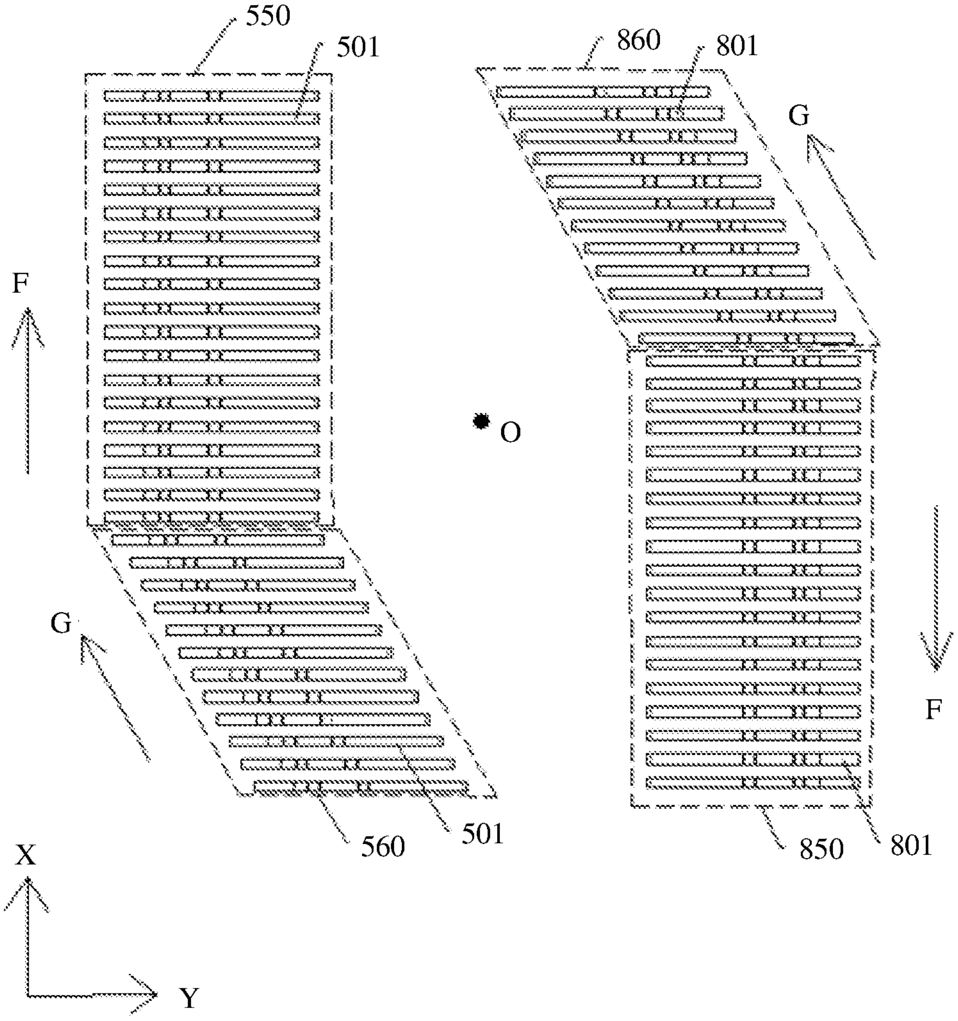
FIG. 32 is a top view of a first arc extinguishing structure and a second arc extinguishing structure according to FIG. 31.

FIG. 31 is a top view of a switch unit according to an embodiment. FIG. 32 is a top view of a first arc extinguishing structure 500 and a second arc extinguishing structure 800 in FIG. 31. The first arc extinguishing structure 500 includes a first arc extinguishing part 550 and a second arc extinguishing part 560. The second arc extinguishing structure 800 includes a third arc extinguishing part 850 and a fourth arc extinguishing part 860. In a possible implementation, the plurality of first arc extinguishing gate plates 501 in the first arc extinguishing part 550 may be arranged in a seventh direction F. The seventh direction F intersects with an extension direction of the first arc extinguishing gate plates 501 in the first arc extinguishing part 550. The plurality of first arc extinguishing gate plates 501 in the second arc extinguishing part 560 may be arranged in an eighth direction G. The eighth direction G intersects with an extension direction of the first arc extinguishing gate plates 501 in the second arc extinguishing part 560. The seventh direction F intersects with the eighth direction G. The first arc extinguishing part 550 is more adjacent to the first static contact 200 than the second arc extinguishing part 560.

In this implementation, the seventh direction F and the eighth direction G are straight lines. Arrangement directions of the first arc extinguishing gate plates 501 in the first arc extinguishing part 550 and the second arc extinguishing part 560 are straight lines.

In this implementation, the first arc extinguishing gate plates 501 in the first arc extinguishing part 550 and the second arc extinguishing part 560 are parallel. Alternatively, in some implementations, due to a process error, an included angle between some two first arc extinguishing gate plates 501 is large or small, but a difference between the included angles between every two adjacent first arc extinguishing gate plates 501 is less than 1°, so that the first arc extinguishing gate plates are substantially parallel.

In this implementation, the seventh direction F and the first direction X are parallel. In some implementations, the seventh direction F and the first direction X intersect.

In this implementation, the second arc extinguishing structure 800 and the first arc extinguishing structure 500 are the same. The plurality of second arc extinguishing gate plates 801 in the third arc extinguishing part 850 may be arranged in the seventh direction F. The seventh direction F intersects with the extension direction of the second arc extinguishing gate plates 801 in the third arc extinguishing part 850. The plurality of second arc extinguishing gate plates 801 in the fourth arc extinguishing part 860 may be arranged in the eighth direction G. The eighth direction G intersects with the extension direction of the second arc extinguishing gate plates 801 in the fourth arc extinguishing part 860. The seventh direction F intersects with the eighth direction G. The third arc extinguishing part 850 is more adjacent to the second static contact 300 than the fourth arc extinguishing part 860.

In this implementation, the first arc extinguishing structure 500 and the second arc extinguishing structure 800 rotate about the rotation center O to implement 180° symmetry.

It should be noted that in any one of the foregoing implementations, for example, the implementations shown in FIG. 23, FIG. 26, FIG. 27, FIG. 29, FIG. 30, and FIG. 32, the first arc extinguishing structure 500 and the second arc extinguishing structure 800 may be replaced. For example, in an implementation, the first arc extinguishing structure 500 shown in FIG. 23 is used, and the second arc extinguishing structure 800 shown in FIG. 26 is used. For another example, in an implementation, the first arc extinguishing structure 500 shown in FIG. 29 is used, and the second arc extinguishing structure 800 shown in FIG. 32 is used.

Figure 33:
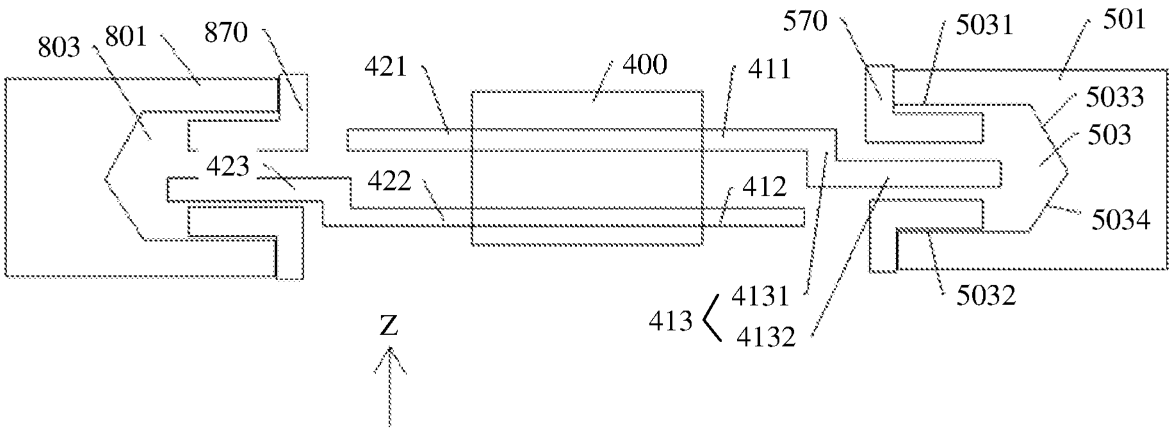
FIG. 33 is a schematic diagram of a structure of a first arc extinguishing gate plate, a second arc extinguishing gate plate, and a movable contact according to an embodiment.

FIG. 33 is a schematic diagram of a structure of a first arc extinguishing gate plate 501, a second arc extinguishing gate plate 801, and a movable contact 400 according to an embodiment. In a possible implementation, the first arc extinguishing structure 500 includes the plurality of first arc extinguishing gate plates 501 that are sequentially arranged at spacings. A first groove 503 that is concave in a direction away from the movable contact 400 is disposed at an end that is of the first arc extinguishing gate plate 501 and that faces the movable contact 400. The first end 410 that is of the movable contact 400 and that is away from the rotation center O is located in the first groove 503 and is spaced from an inner wall of the first groove 503. In this implementation, the first end 410 of the movable contact 400 moves in the first groove 503. The first grooves 503 in all the first arc extinguishing gate plates 501 form a channel for the first end 410 of the movable contact 400 to move. The first arc S1 generated when the first end 410 is separated from the first static contact 200 can more quickly enter the first arc extinguishing structure 500, to improve an arc extinguishing effect. In addition, a length of the inner wall of the first groove 503 is increased, to improve an effect of cutting off the first arc S1.

In a possible implementation, the second arc extinguishing structure 800 includes the plurality of second arc extinguishing gate plates 801 that are sequentially arranged at spacings. A second groove 803 that is concave in a direction away from the movable contact 400 is disposed at an end that is of the second arc extinguishing gate plate 801 and that faces the movable contact 400. The second end 420 that is of the movable contact 400 and that is away from the rotation center O is located in the second groove 803 and is spaced from an inner wall of the second groove 803. In this implementation, the second end 420 of the movable contact 400 moves in the second groove 803. The second grooves 803 in all the second arc extinguishing gate plates 801 form a channel for the second end 420 of the movable contact 400 to move. The second arc S2 generated when the second end 420 is separated from the second static contact 300 can more quickly enter the second arc extinguishing structure 800, to improve an arc extinguishing effect. In addition, a length of the inner wall of the second groove 803 is increased, to improve an effect of cutting off the second arc S2.

It should be noted that in any one of the foregoing implementations, for example, the implementations shown in FIG. 23, FIG. 26, FIG. 27, FIG. 28, FIG. 29, FIG. 30, and FIG. 32, the first groove 503 in the first arc extinguishing gate plate 501 or the second groove 803 in the second arc extinguishing gate plate 801 may be disposed based on a requirement. Sizes and shapes of the first groove 503 and the second groove 803 may be set based on a requirement. This is not limited herein.

In a possible implementation, the first end 410 of the movable contact 400 includes a first movable contact plate 411 and a second movable contact plate 412 that are arranged at a spacing in the third direction Z. When the movable contact 400 is connected to the first static contact 200, the first movable contact plate 411 and the second movable contact plate 412 are clamped on two sides of the first static contact 200 in the third direction Z and electrically connected to the first static contact 200. A first extension part 413 is disposed at an end that is of the first movable contact plate 411 and that is away from the rotation center O. The first extension part 413 extends into the first groove 503.

In this implementation, the first extension part 413 and the first movable contact plate 411 are of an integrated structure. The first extension part 413 is electrically connected to the first movable contact plate 411. The first extension part 413 is located in the first groove 503, so that when the first movable contact plate 411 and the first static contact 200 generate the first arc S1, the first arc S1 is guided into the first groove 503 in the first arc extinguishing gate plate 501 by using the first extension part 413, to improve an arc extinguishing effect.

In a possible implementation, the first extension part 413 includes a first bent part 4131 and a first horizontal part 4132. The first horizontal part 4132 and the first movable contact plate 411 are located at two ends of the first bent part 4131 in the third direction Z. The first horizontal part 4132 is located in the first groove 503. In this implementation, the first horizontal part 4132 is disposed in a direction approaching the second movable contact plate 412 by using the first bent part 4131, so that the first horizontal part 4132 can be accommodated in the first groove 503, and a size of the first arc extinguishing gate plate 501 can be equivalent to a size of the movable contact 400 in the third direction Z, to reduce a size of the switch unit 10 in the third direction Z.

In a possible implementation, a first insulation structure 570 is disposed on the first arc extinguishing structure 500. The first insulation structure 570 covers an end face that is of the first arc extinguishing gate plate 501 and that faces the rotation center O and covers a part of a side wall of the first groove 503. In this way, when the first arc S1 is generated, the first insulation structure 570 is heated, so that the first insulation structure 570 absorbs heat and burns to generate more hot gases and more hot substances. The hot gases and the hot substances move toward the groove bottom of the first groove 503 and drive the first arc S1 to move toward the groove bottom of the first groove 503, to improve an arc extinguishing effect.

In a possible implementation, a groove wall of the first groove 503 includes a first side wall 5031 and a second side wall 5032 that are disposed opposite to each other in the third direction Z, and a first bevel wall 5033 and a second bevel wall 5034 that are located between the first side wall 5031 and the second side wall 5032. The first bevel wall 5033 and the second bevel wall 5034 intersect at an included angle, and an end that is of the first extension part 413 and that is away from the first movable contact plate 411 is disposed directly opposite to the included angle between the first bevel wall 5033 and the second bevel wall 5034, to improve an arc extinguishing effect. In this implementation, the switch unit 10 includes two first insulation structures 570 that are disposed opposite to each other in the third direction Z. The end face that is of the first arc extinguishing gate plate 501 and that faces the rotation midline O includes a first sub end face and a second sub end face (not shown in the figure) that are separated by the first groove 503. The first sub end face is disposed adjacent to the first side wall 5031. The second sub end face is disposed adjacent to the second side wall 5032. One first insulation structure 570 covers the first sub end face that is of the first arc extinguishing gate plate 501 and that faces the rotation midline O and covers the first side wall 5031 of the first groove 503. The other first insulation structure 570 covers the second sub end face that is of the first arc extinguishing gate plate 501 and that faces the rotation midline O and covers the second side wall 5032 of the first groove 503.

In a possible implementation, the second end 420 of the movable contact 400 includes a third movable contact plate 421 and a fourth movable contact plate 422 that are arranged at a spacing in the third direction Z. When the movable contact 400 is connected to the second static contact 300, the third movable contact plate 421 and the fourth movable contact plate 422 are clamped on two sides of the second static contact 300 in the third direction Z and electrically connected to the second static contact 300. A second extension part 423 is disposed at an end that is of the fourth movable contact plate 422 and that is away from the rotation center O. The second extension part 423 extends into the second groove 803. A structure of the second extension part 423 is similar to that of the first extension part 413, and an end of the first extension part 413 may extend into the second groove 803 through bending. In this implementation, the second extension part 423 is disposed at an end of the fourth movable contact plate 422. In some implementations, the second extension part 423 may alternatively be disposed at an end of the third movable contact plate 421 and extend into the second groove 803. In some implementations, the first extension part 413 may alternatively be disposed at an end of the second movable contact plate 412 and extend into the first groove 503.

In a possible implementation, a second insulation structure 870 is disposed on the second arc extinguishing structure 800. The second insulation structure 870 covers an end face that is of the second arc extinguishing gate plate 801 and that faces the rotation midline O and covers a part of a side wall of the second groove 803. In this way, when the second arc S2 is generated, the second insulation structure 870 is heated, so that the second insulation structure 870 absorbs heat and burns to generate more hot gases and more hot substances. The hot gases and the hot substances move toward the groove bottom of the second groove 803 and drive the second arc S2 to move toward the groove bottom of the second groove 803, to improve an arc extinguishing effect. In this implementation, when a structure of the second arc extinguishing gate plate 801 is the same as that of the first arc extinguishing gate plate 501, a structure of the second insulation structure is the same as that of the first insulation structure 570. Details are not described herein again. In some implementations, a structure of the second insulation structure 870 may be different from that of the first insulation structure 570.

Figure 34:
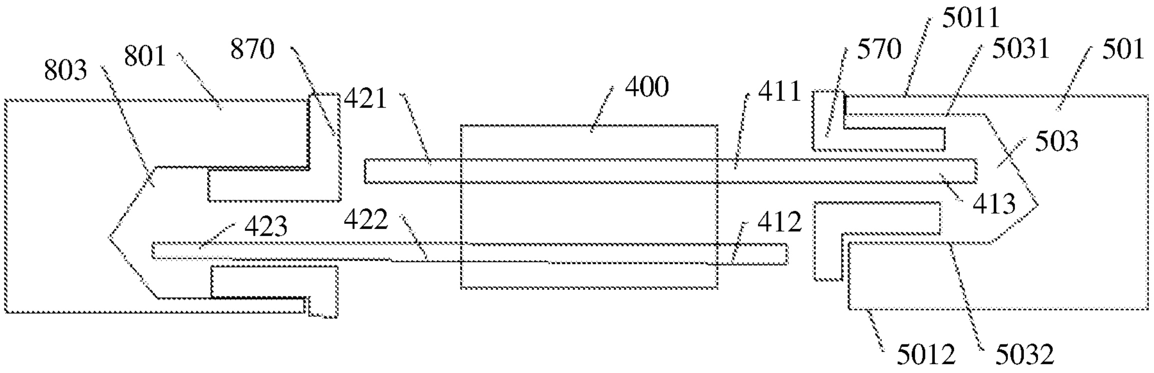
FIG. 34 is a schematic diagram of a structure of a first arc extinguishing gate plate, a second arc extinguishing gate plate, and a movable contact according to an embodiment.

FIG. 34 is a schematic diagram of a structure of a first arc extinguishing gate plate 501, a second arc extinguishing gate plate 801, and a movable contact 400 according to an embodiment. In a possible implementation, the first extension part 413 and the first movable contact plate 411 are coplanar. The groove wall of the first groove 503 includes a first side wall 5031 and a second side wall 5032 that are disposed opposite to each other in the third direction Z. The first arc extinguishing gate plate 501 includes a first surface 5011 and a second surface 5012 that are disposed opposite to each other in the third direction Z. The first side wall 5031 is disposed adjacent to the first surface 5011. The second side wall 5032 is disposed adjacent to the second surface 5012. A size between the first side wall 5031 and the first surface 5011 in the third direction Z is less than a size between the second side wall 5032 and the second surface 5012 in the third direction Z, so that the first extension part 413 can extend into the first groove 503. In this implementation, because the first extension part 413 and the first movable contact plate 411 are coplanar, if thicknesses of the two gate pins that are of the first groove 503 and that face the rotation center O are the same, the first extension part 413 cannot extend into the first groove 503. In this implementation, a thickness of an upper gate pin of the first groove 503 is set to be less than a thickness of a lower gate pin. In other words, a size between the first side wall 5031 and the first surface 5011 in the third direction Z is less than a size between the second side wall 5032 and the second surface 5012 in the third direction Z, so that the first extension part 413 can extend into the first groove 503, and a size of the switch unit 10 in the third direction Z does not need to be additionally increased.

In a possible implementation, a size of the first insulation structure 570 may be set based on a shape and a size of the first arc extinguishing gate plate 501 in this implementation. For example, when a size between the first side wall 5031 and the first surface 5011 decreases in the third direction Z, a size of the first insulation structure 570 covering the first sub end face may be reduced, so that the first insulation structure 570 adapts to the first arc extinguishing gate plate 501.

In a possible implementation, the second extension part 423 and the fourth movable contact plate 422 are coplanar. Thicknesses of two gate pins in the second groove 803 in the second arc extinguishing gate plate 801 may be set to be different, so that the second extension part 423 can extend into the second groove 803.

In some implementations, a first extension part 413 may be disposed at an end of the second movable contact plate 412, and a second extension part 423 may be disposed at an end of the third movable contact plate 421. Thickness of gate pins of the first groove 503 and the second groove 803 may be set based on a requirement.

Figure 35:
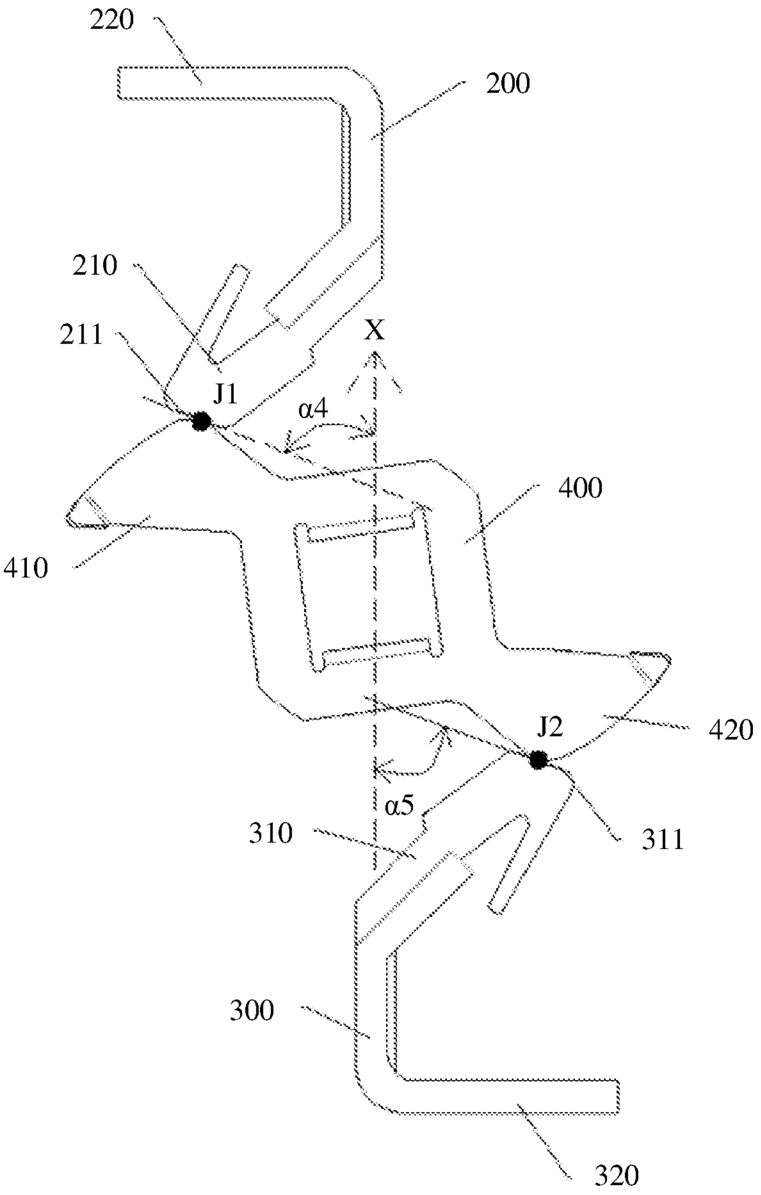
FIG. 35 is a schematic diagram of a structure of a movable contact, a first static contact, and a second static contact according to an embodiment.

FIG. 35 is a schematic diagram of a structure of a movable contact 400, a first static contact 200, and a second static contact 300 according to an embodiment. In a possible implementation, the first static contact 200 includes a first connection end 220 and a first contact end 210. An end face of the first contact end 210 has a first static contact surface 211. The first static contact surface 211 has a first contact point J1. The first contact point J1 is located at an end that is of the first static contact surface 211 and that is adjacent to the first arc extinguishing structure 500. The first end 410 is configured to be separated from the first contact end 210 through the first contact point J1 when the first end 410 of the movable contact 400 and the first contact end are disconnected 210.

In this implementation, the first contact point J1 is a position at which the first end 410 of the movable contact 400 is separated from the first static contact 200 and is also a position at which the first arc S1 starts. When the first contact point J1 is located at the end that is of the first static contact surface 211 and that is adjacent to the first arc extinguishing structure 500, once being generated, the first arc S1 can quickly enter the first arc extinguishing structure 500 to be cut off and extinguished by the first arc extinguishing structure 500, to improve an arc extinguishing effect.

In a possible implementation, an angle value of the fourth included angle α4 between the first static contact surface 211 and the first direction Y is greater than or equal to 70° and is less than or equal to 75°, and the first contact point J1 at which the first end 410 of the movable contact 400 comes into contact with the first static contact surface 211 is adjacent to the first arc extinguishing structure 500, so that the start position of the first arc S1 is more adjacent to the first arc extinguishing structure 500 during separation, to improve an arc extinguishing effect.

In a possible implementation, a distance between the first contact point J1 and the closest first arc extinguishing gate plate 501 in the first arc extinguishing structure 500 is 2 millimeters to 3 millimeters, so that the first arc S1 quickly enters the first arc extinguishing gate plate 501. For example, when the included angle between the first direction X and the connection line between a switch-on position (or the first contact point J1) of the first end 410 of the movable contact 400 and the first static contact 200 and the rotation center O is 45°, a distance between the first contact point J1 and the closest first arc extinguishing gate plate 501 in the first arc extinguishing structure 500 is 2 millimeters to 3 millimeters, to improve an arc extinguishing effect.

In some implementations, a shape of the first end 410 of the movable contact 400 and a shape of the first static contact surface 211 may be set, so that the first contact point J1 is more adjacent to the first arc extinguishing structure 500, to improve an arc extinguishing effect. It should be noted that the shape of the first end 410 of the movable contact 400 and the shape of the first static contact surface 211 are not limited to the shape shown in FIG. 32 and may be set based on a requirement.

In a possible implementation, the second static contact 300 includes a second connection end 320 and a second contact end 310. An end face of the second contact end 310 has a second static contact surface 311. A second contact point J2 at which the second end 420 of the movable contact 400 comes into contact with the second static contact surface 311 is located at an end that is of the second static contact surface 311 and that is adjacent to the second arc extinguishing structure 800.

In this implementation, the second contact point J2 is a position at which the second end 420 of the movable contact 400 is separated from the second static contact 300 and is also a position at which the second arc S2 starts. When the second contact point J2 is located at the end that is of the second static contact surface 311 and that is adjacent to the second arc extinguishing structure 800, once being generated, the second arc S2 can quickly enter the second arc extinguishing structure 800 to be cut off and extinguished by the second arc extinguishing structure 800, to improve an arc extinguishing effect.

In a possible implementation, an angle value of a fifth included angle α5 between the second static contact surface 311 and the first direction Y is greater than or equal to 70° and is less than or equal to 75°, and the second contact point J2 at which the second end 420 of the movable contact 400 comes into contact with the second static contact surface 311 is adjacent to the second arc extinguishing structure 800, so that the start position of the second arc S2 is more adjacent to the second arc extinguishing structure 800 during separation, to improve an arc extinguishing effect.

In a possible implementation, a distance between the second contact point J2 and the closest second arc extinguishing gate plate 801 in the second arc extinguishing structure 800 is 2 millimeters to 3 millimeters, so that the second arc S2 quickly enters the second arc extinguishing gate plate 801. For example, when the included angle between the first direction X and the connection line between a switch-on position (or the second contact point J2) of the second end 420 of the movable contact 400 and the second static contact 300 and the rotation center O is 45°, a distance between the first contact point J1 and the closest first arc extinguishing gate plate 501 in the first arc extinguishing structure 500 is 2 millimeters to 3 millimeters, to improve an arc extinguishing effect.

In some implementations, a shape of the second end 420 of the movable contact 400 and a shape of the second static contact surface 311 may be set, so that the second contact point J2 is more adjacent to the second arc extinguishing structure 800, to improve an arc extinguishing effect. It should be noted that the shape of the second end 420 of the movable contact 400 and the shape of the second static contact surface 311 are not limited to the shape shown in FIG. 32 and may be set based on a requirement.

Figure 36:
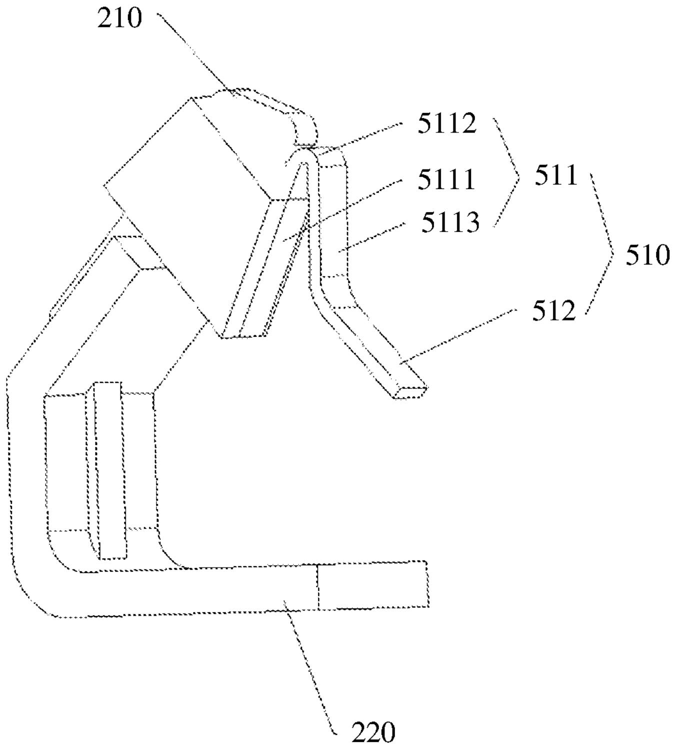
FIG. 36 is a schematic diagram of a structure of a first static contact and a first end-part arc extinguishing gate plate according to an embodiment.
Figure 38:
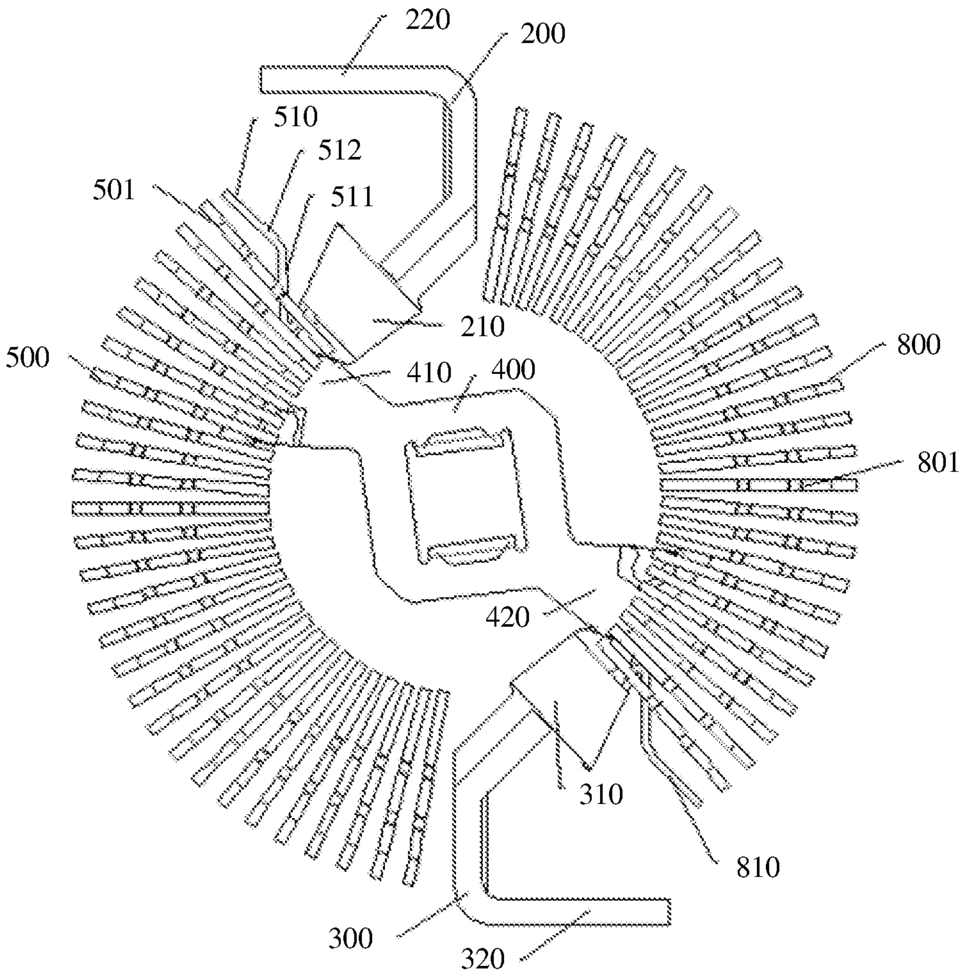
FIG. 38 is a schematic diagram of a structure of a movable contact, a first static contact, a second static contact, a first arc extinguishing structure, and a second arc extinguishing structure according to an embodiment.

FIG. 36 is a schematic diagram of a structure of a first static contact 200 and a first end-part arc extinguishing gate plate 510 according to an embodiment. In a possible implementation, the first end-part arc extinguishing gate plate 510 includes a first curved part 511 and a first flat plate part 512 that are connected to each other. The first arc extinguishing gate plate 501 adjacent to the first flat plate part 512 and the first flat plate part 512 are arranged at a spacing in the first direction X (as shown in FIG. 38). An end that is of the first curved part 511 and that is away from the first flat plate part 512 is electrically connected to the first static contact 200. The first curved part 511 is configured to drive the first arc S1 to move toward the first arc extinguishing structure 500 when the first contact end 210 is separated from the first end 410, to improve an arc extinguishing effect. In this implementation, an extension direction of the first flat plate part 512 intersects with an extension direction of the first arc extinguishing gate plate 501, so that the first flat plate part 512 is disposed more adjacent to another first arc extinguishing gate plate 501 in the first arc extinguishing structure 500. In some implementations, an extension direction of the first flat plate part 512 is parallel to an extension direction of the first arc extinguishing gate plate 501.

Figure 37:
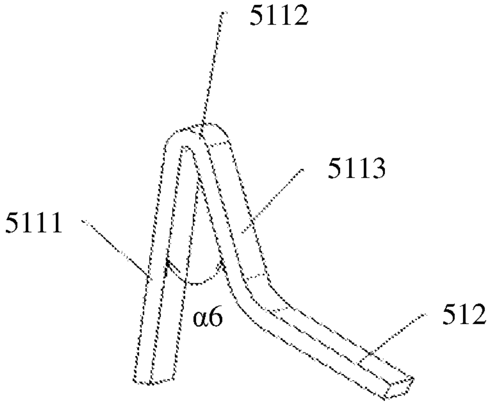
FIG. 37 is a schematic diagram of a structure of a first end-part arc extinguishing gate plate according to an embodiment.

In this implementation, the first curved part 511 includes a first straight subpart 5111, a first curved subpart 5112, and a second straight subpart 5113 that are sequentially connected (as shown in FIG. 36 and FIG. 37). The first straight subpart 5111 is fastened to the first contact end 210. The second straight subpart 5113 is connected to the first flat plate part 512. The first curved subpart 5112 is located on a periphery of the first contact end 210. An angle value of a sixth included angle α6 between the first straight subpart 5111 and the second straight subpart 5113 is less than or equal to 45° (as shown in FIG. 37). In this implementation, when the first static contact 200 is separated from the first end 410 of the movable contact 400, the first curved part 511 is electrically connected to the first static contact 200, so that at least a part of the first arc S1 can flow into the first curved part 511 through the first static contact 200. There is a current in the first curved part 511. According to the amperes rule in the electrified solenoid, a magnetic field line is generated on an inner side of the first curved part 511. According to the left-hand rule, the magnetic field line generates, on the first arc S1, an ampere force in a direction toward the first arc extinguishing structure 500. The ampere force drives the first arc S1 to move toward the first arc extinguishing structure 500. A path of the first arc S1 is extended to cool the first arc S1, and the first arc S1 can be more guided into the first arc extinguishing structure 500, to jointly improve an arc extinguishing effect.

In this implementation, the first contact end 210 is disposed more adjacent to the first curved subpart 5112 than the first connection end 220, so that a magnetic field line at a position of the first arc S1 is increased, and a speed of driving the first arc S1 to move toward the first arc extinguishing structure 500 is increased, to improve an arc extinguishing effect.

In a possible implementation, a curvature center of the first curved subpart 5112 is disposed away from the first end 410 of the movable contact 400.

In a possible implementation, an angle value of the sixth included angle $\alpha 6$ between the first straight subpart 5111 and the second straight subpart 5113 is less than or equal to 30°, or the sixth included angle $\alpha 6$ is less than or equal to 15°. A smaller sixth included angle $\alpha 6$ may increase nearby magnetic field strength, so that the first arc S1 quickly enters the first arc extinguishing gate plate 501 in the first arc extinguishing structure 500.

In a possible implementation, a manner in which the first straight subpart 5111 is fastened to the first contact end 210 includes welding, riveting, and screw fastening.

In a possible implementation, a structure of the third end-part arc extinguishing gate plate 810 in the second arc extinguishing structure 800 is the same as a structure of the first end-part arc extinguishing gate plate 510 in this implementation. Details are not described herein again.

In a possible implementation, a manner in which the first straight subpart 5111 is fastened to the first contact end 210 includes welding, riveting, and screw fastening. A manner in which the third end-part arc extinguishing gate plate 810 is fastened to the second static contact 300 includes welding, riveting, and screw fastening.

It should be noted that a process manner of the movable contact 400, the first static contact 200, and the second static contact 300 may be integral molding such as stamping, cutting, casting, forging, powder metallurgy, or 3D printing, or multi-component combination molding such as riveting, welding, screw fastening, or bonding.

Figure 39:
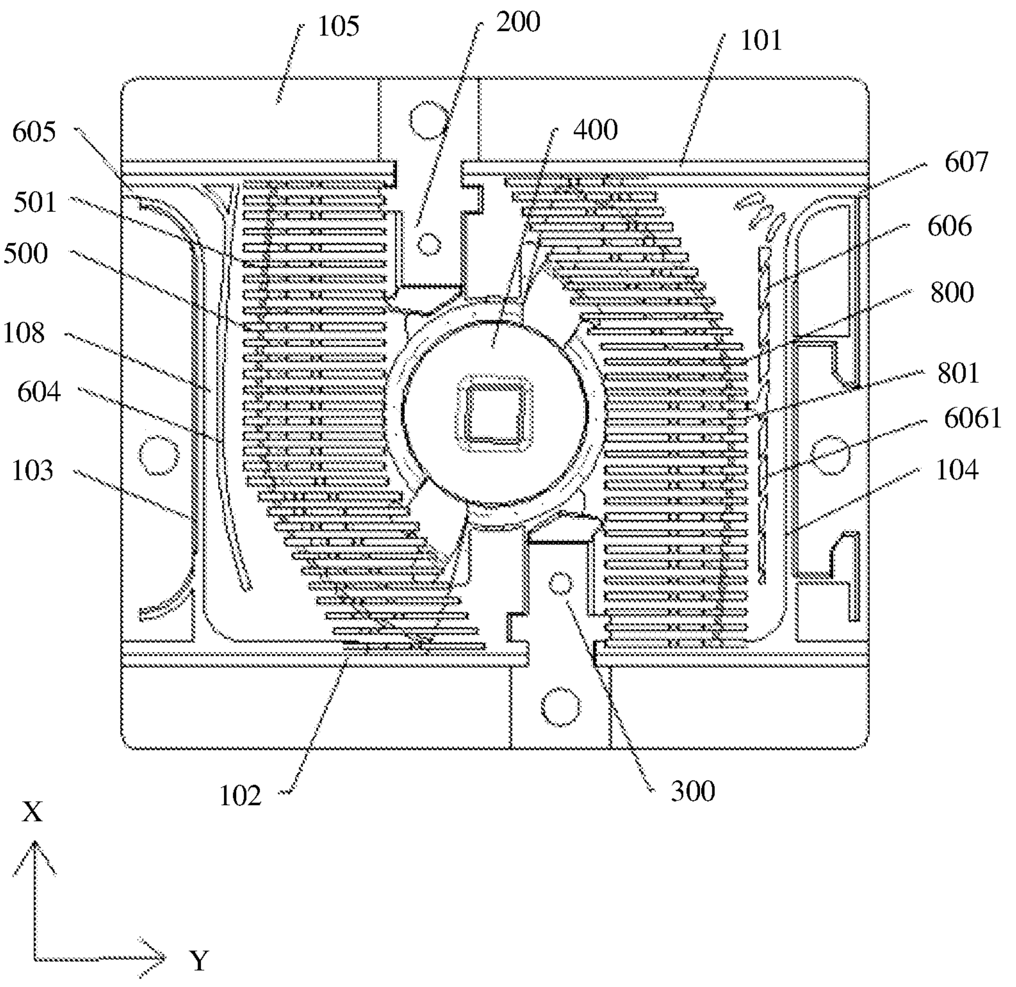
FIG. 39 is a top view of a switch unit according to an embodiment.

FIG. 39 is a top view of a switch unit according to an embodiment. In this implementation, the housing 100 further includes a first side panel 105 and a second side panel (not shown in FIG. 38) that are disposed opposite to each other in the third direction Z. The housing 100 further includes a third side frame 103 and a fourth side frame 104 that are disposed opposite to each other in the second direction Y. In this implementation, in a possible implementation, the switch unit 10 further includes a first guide member 604. The first guide member 604 is located on a side that is of the first arc extinguishing structure 500 and that is away from the movable contact 400 and is configured to discharge hot air generated by the first arc S1.

In this implementation, the first guide member 604 is located between a third side frame 103 and the first arc extinguishing structure 500. The first guide member 604 extends in the first direction X (as shown in FIG. 39). The third side frame 103 and the first guide member 604 are spaced to form a guiding channel 108.

In this implementation, the first guide member 604 extends in the first direction X. After the first arc S1 generated when the first end 410 of the movable contact 400 is separated from the first static contact 200 enters the first arc extinguishing structure 500, the generated hot gas flows from a gap between the first arc extinguishing structure 500 and the first guide member 604, bypasses an end of the first guide member 604 to enter the guiding channel 108, and then flows through the guiding channel 108 to be discharged out of the switch unit 10 through the first outlet 605. In this implementation, the first guide member 604 is disposed to increase a flow path of the hot gas generated by the first arc S1, so that the hot gas is effectively cooled, and a temperature of the gas discharged through the first outlet 605 is low, to avoid that high-temperature hot gas discharged out of the switch unit burns an external device.

In this implementation, the first outlet 605 is disposed adjacent to a second side frame 102. The first guide member 604 and a first side frame 101 are spaced to form an exhaust outlet 109. The generated hot gas flows from the gap between the first arc extinguishing structure 500 and the first guide member 604, bypasses the exhaust outlet 109 at an end of the first guide member 604, and enters the guiding channel 108. After passing through the guiding channel 108, the generated hot gas flows out of the switch unit 10 through the first outlet 605. The first outlet 605 and the exhaust outlet 109 are respectively disposed at two ends of the first guide member 604 in the first direction X, so that a flow path of the hot gas can be extended, to improve a cooling effect.

In an implementation, the first side panel 105 and the first guide member 604 are an integral molding structure. This improves structure reliability.

In a possible implementation, the switch unit 10 is further provided with a second guide member. The second guide member is located between the fourth side frame 104 and the second arc extinguishing structure 800. The second guide member extends in the first direction X. The fourth side frame 104 and the second guide member are spaced to form a guiding channel. The second guide member is configured to extend a flow path of hot gas generated by the second arc S2. In this implementation, the second guide member and the second side frame 102 form an exhaust outlet (not shown in the figure). A second outlet is disposed in the fourth side frame 104. The second outlet in the fourth side frame 104 and the exhaust outlet formed by the second guide member and the second side frame 102 are located on two sides of the second guide member in the first direction X. The second outlet is disposed adjacent to the first side frame 101.

In this implementation, a second outlet 607 and a second guide member 606 are disposed on the fourth side frame 104. The second guide member 606 is located between the third side frame 103 and the second arc extinguishing structure 800. The second guide member 606 includes a plurality of second guide submembers 6061 that are arranged at spacings in the first direction X. There is a gap between two adjacent second guide submembers 6061. The hot gas generated by the second arc S2 passes through the gap between the two second guide submembers 6061, to implement an effect of cooling the hot gas. In this implementation, the second outlet 607 may be disposed adjacent to the second side frame 102, which facilitates component layout around the switch unit 10. When there is another external device at a position of the fourth side frame 104 adjacent to the first side frame 101, the second outlet 607 cannot be disposed adjacent to the first side frame 101, which affects performance of the another external device at the position of the fourth side frame 104 adjacent to the first side frame 101. In this case, the second outlet 607 may be disposed adjacent to the second side frame 102, in addition, a cooling effect is improved by using a plurality of second guide submembers 6061 arranged at spacings for the second guide member 606.

In some implementations, the first guide member 604 may also be disposed in a manner in which a plurality of first guide submembers are arranged at spacings in the first direction X. The first guide member 604 and the second guide member 606 may alternatively be in another structure manner and may be disposed based on a requirement.

Figure 40:
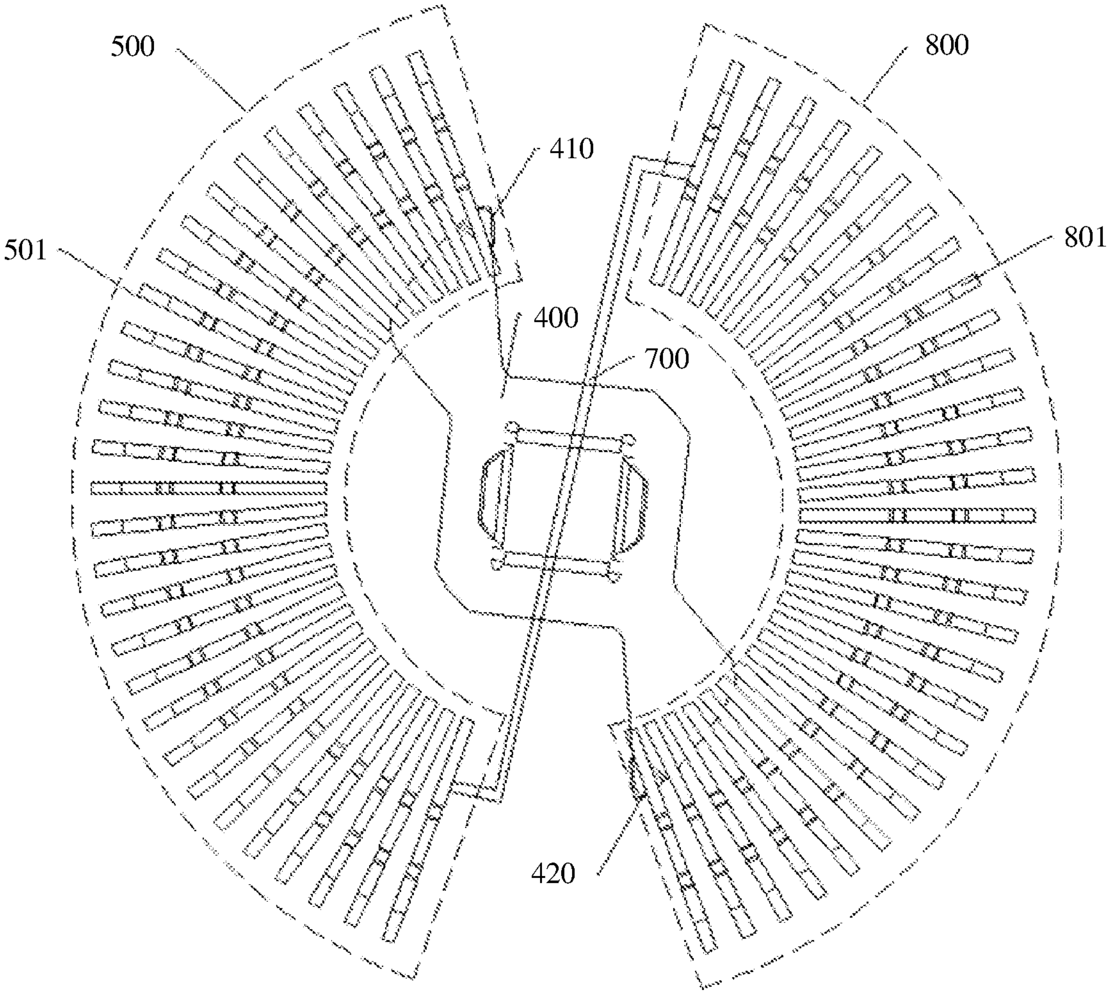
FIG. 40 is a top view of a movable contact, a first static contact, a second static contact, and a connecting piece according to an embodiment.

FIG. 40 is a top view of a movable contact, a first static contact, a second static contact, and a connecting piece according to an embodiment. In this implementation, the switch unit 10 further includes a connecting piece 700. The connecting piece 700 is connected between the first arc extinguishing structure 500 and the second arc extinguishing structure 800. The first arc extinguishing structure 500 and the second arc extinguishing structure 800 are connected through the connecting piece 700. By using the connecting piece 700, a current of the first arc extinguishing structure 500 may be guided into the connecting piece 700, to reduce a risk of burning the first end 410 of the movable contact 400 and reduce a risk that the movable contact 400 rebounds to the first static contact 200 and the second static contact 300. For the second arc S2, the second arc S2 is guided into the second arc extinguishing structure 800, to reduce a risk of burning the second end 420 of the movable contact 400. The first arc extinguishing structure 500 and the second arc extinguishing structure 800 are connected through the connecting piece 700, so that potentials of the first arc extinguishing structure 500 and the second arc extinguishing structure 800 are equal, to improve safety of the switch unit 10.

It should be noted that the connecting piece 700 may also be disposed in the embodiments shown in FIG. 26, FIG. 27, FIG. 28, FIG. 30, and FIG. 31.

Another embodiment may provide a switch unit 10. The switch unit 10 is used in a switch 1. The switch 1 includes a knob 12, the switch unit 10, and an operation mechanism 11 connected between the knob 12 and the switch unit 10. The knob 12 can control, by using the operation mechanism 11, the switch unit 10 to turned off or on. In this implementation, a user rotates the knob 12 to turn off or on the switch unit 10. The switch unit 10 includes a housing 100, a first static contact 200, a second static contact 300, a movable contact 400, and a first arc extinguishing structure 500. The first static contact 200, the second static contact 300, the movable contact 400, and the first arc extinguishing structure 500 are located in the housing 100. The first static contact 200 includes a first contact end 210. The movable contact 400 has a rotation midline O. The movable contact 400 can rotate about the rotation center O relative to the first static contact 200. The movable contact 400 is configured to connect to or disconnect from the first static contact 200. When the switch unit 10 is turned off, the movable contact 400 rotates about the rotation center O by a first included angle α1 relative to the first static contact 200 to be separated from the first contact end 210, to generate a first arc S1. The first arc extinguishing structure 500 is located around the first static contact 200 and is configured to extinguish the first arc S1. The first arc extinguishing structure 500 includes a first arc extinguishing end part S1 and a second arc extinguishing end part 52. A connection line between the first arc extinguishing end part S1 and the rotation center O of the movable contact 400 is a first line L1. A connection line between the second arc extinguishing end part 52 and the rotation center O of the movable contact 400 is a second line L2. An included angle between the first line L1 and the second line L2 is a second included angle α2. An angle value of the second included angle α2 is greater than or equal to an angle value of the first included angle α1.

Descriptions and deformation solutions of the housing 100, the first static contact 200, the second static contact 300, the movable contact 400, the first arc extinguishing structure 500, the second arc extinguishing structure 800, and the connecting piece 700 in the power supply system in the foregoing embodiments may be applicable to the housing 100, the first static contact 200, the second static contact 300, the movable contact 400, the first arc extinguishing structure 500, the second arc extinguishing structure 800, and the connecting piece 700 in the switch unit 10 in this embodiment. Descriptions and deformation solutions of position relationships of the housing 100, the first static contact 200, the second static contact 300, the movable contact 400, the first arc extinguishing structure 500, the second arc extinguishing structure 800, and the connecting piece 700 in the power supply system in the foregoing embodiments may be applicable to position relationships of the housing 100, the first static contact 200, the second static contact 300, the movable contact 400, the first arc extinguishing structure 500, the second arc extinguishing structure 800, and the connecting piece 700 in the switch unit 10 in this embodiment. Details are not described herein again.

The power supply system and the switch unit provided in the embodiments are described in detail above. The principles and embodiments are described herein by using examples. The description about the foregoing embodiments is merely provided to help understand the method and related ideas. In addition, a person of ordinary skill in the art can make variations and modifications in terms of the embodiments.

What is claimed is:

1. A power supply system, comprising:

a control unit;

a switch;

a direct current source; and a power change unit, wherein the switch is electrically connected between the direct current source and the power change unit, the control unit is configured to send a switch-off signal to the switch when the direct current source or the power change unit is faulty, the switch comprises a switch unit and an operation mechanism, the operation mechanism is configured to receive the switch-off signal and control the switch unit to be turned on or off, and the switch unit comprises:

a first static contact;

a movable contact, having a rotation center, wherein the movable contact is configured to rotate about the rotation center relative to the first static contact, the movable contact is configured to connect to or disconnect from the first static contact, and when the switch unit is turned off, the movable contact rotates about the rotation center relative to the first static contact by a first included angle to be separated from the first static contact, to generate a first arc;

a first arc extinguishing structure, located around the first static contact, and configured to extinguish the first arc, wherein the first arc extinguishing structure comprises a first arc extinguishing end part and a second arc extinguishing end part, a connection line between the first arc extinguishing end part and the rotation center of the movable contact is a first line, a connection line between the second arc extinguishing end part and the rotation center of the movable contact is a second line, an included angle between the first line and the second line is a second included angle, and an angle value of the second included angle is greater than or equal to an angle value of the first included angle.

2. The power supply system according to claim 1, wherein the first static contact comprises a first contact end, the movable contact comprises a first end, the first end is configured to connect to or disconnect from the first contact end, the first arc is formed between the first end and the first contact end, and the first end and the first contact end are located between the first line and the second line, to improve an arc extinguishing effect.

3. The power supply system according to claim 2, wherein an end of the first contact end has a first static contact surface, the first static contact surface has a first contact point, the first contact point is located at an end that is of the first static contact surface and that is adjacent to the first arc extinguishing structure, and the first end is configured to be separated from the first contact end through the first contact point when the first end is disconnected from the first contact end.

4. The power supply system according to claim 2, wherein the first arc extinguishing structure comprises:

a plurality of first arc extinguishing gate plates that are sequentially arranged at spacings, a first arc extinguishing gate plate located at the first arc extinguishing end part is a first end-part arc extinguishing gate plate, and the first end-part arc extinguishing gate plate is electrically connected to the first static contact.

5. The power supply system according to claim 4, wherein the first end-part arc extinguishing gate plate comprises a first curved part and a first flat plate part that are connected to each other, the first arc extinguishing gate plate adjacent to the first flat plate part and the first flat plate part are arranged at a spacing, an end that is of the first curved part and that is away from the first flat plate part is electrically connected to the first static contact, and the first curved part is configured to drive the first arc to move toward the first arc extinguishing structure when the first contact end is separated from the first end, to improve an arc extinguishing effect.

6. The power supply system according to claim 5, wherein the first curved part comprises:

a first straight subpart, a first curved subpart, a second straight subpart, a second curved subpart, and a third straight subpart that are sequentially connected, the first static contact further comprises a first connection end, the first connection end is farther away from the movable contact than the first contact end, an end that is of the first straight subpart and that is away from the first curved subpart is connected to the first connection end, curvature centers of the first curved subpart and the second curved subpart are disposed away from the first static contact, and the second curved subpart is disposed more adjacent to the first contact end than the first curved subpart, to extend a movement path of the first arc toward the first arc extinguishing structure.

7. The power supply system according to claim 5, wherein the first curved part comprises:

a first straight subpart, a first curved subpart, and a second straight subpart that are sequentially connected, the first straight subpart is fastened to the first contact end, the second straight subpart is connected to the first flat plate part, the first curved subpart is located on a periphery of the first contact end, and an angle value of a sixth included angle between the first straight subpart and the second straight subpart is less than or equal to 45°.

8. The power supply system according to claim 5, wherein the first static contact is located on a side that is of the first curved part and that is adjacent to the movable contact, a first bent part is disposed between the first contact end and the first connection end, a curvature center of the first bent part faces the first curved part, and the first bent part is configured to drive the first arc to move toward the first arc extinguishing structure when the first static contact is separated from the first end of the movable contact, to improve an arc extinguishing effect.

9. The power supply system according to claim 1, wherein, when the movable contact is disconnected from the first static contact, a first fracture is formed between the movable contact and the first static contact, the first arc extinguishing structure comprises a plurality of first arc extinguishing gate plates that are sequentially arranged at spacings, a gap between every two adjacent first arc extinguishing gate plates forms a first arc extinguishing opening, and the first arc extinguishing opening is communicated with and disposed opposite to the first fracture, to improve an arc extinguishing effect.

10. The power supply system according to claim 1, wherein at least a part of the first arc extinguishing structure is an arc-shaped structure.

11. The power supply system according to claim 10, wherein the first arc extinguishing structure is an arc-shaped structure, and the angle value of the second included angle is greater than or equal to 120°; or the first arc extinguishing structure is an arc-shaped structure, and the angle value of the second included angle is greater than or equal to 140° and less than or equal to 180°.

12. The power supply system according to claim 11, wherein the first arc extinguishing structure comprises a plurality of first arc extinguishing gate plates that are sequentially arranged at spacings, the first arc extinguishing gate plates are arranged in a sector shape, and extension directions of two adjacent first arc extinguishing gate plates intersect.

13. The power supply system according to claim 1, wherein the first arc extinguishing structure comprises:

a first arc extinguishing part; and a second arc extinguishing part, the first arc extinguishing part comprises a plurality of first arc extinguishing gate plates that are sequentially arranged at spacings, the second arc extinguishing part comprises a plurality of first arc extinguishing gate plates that are sequentially arranged at spacings, and an arrangement direction of the plurality of first arc extinguishing gate plates in the first arc extinguishing part intersects with an arrangement direction of the plurality of first arc extinguishing gate plates in the second arc extinguishing part.

14. The power supply system according to claim 13, wherein all of the first arc extinguishing gate plates in the first arc extinguishing part are sequentially arranged in a direction from the second arc extinguishing part to the first static contact.

15. The power supply system according to claim 13, wherein the first arc extinguishing part is an arc-shaped structure, the first arc extinguishing gate plates in the first arc extinguishing part are arranged along a first arc shape, the first arc extinguishing part is more adjacent to the first static contact than the second arc extinguishing part, the plurality of first arc extinguishing gate plates in the second arc extinguishing part are arranged along a second arc shape, and a curvature radius of the first arc shape is less than a curvature radius of the second arc shape; or the plurality of first arc extinguishing gate plates in the first arc extinguishing part are arranged in a sixth direction, the sixth direction intersects with an extension direction of the first arc extinguishing gate plates in the first arc extinguishing part, the first arc extinguishing part is more adjacent to the first static contact than the second arc extinguishing part, the second arc extinguishing part is an arc-shaped structure, the plurality of first arc extinguishing gate plates in the second arc extinguishing part are arranged along a second arc shape, and the sixth direction intersects with an extension direction of the second arc shape.

16. The power supply system according to claim 13, wherein the plurality of first arc extinguishing gate plates in the first arc extinguishing part are arranged in a seventh direction, the seventh direction intersects with an extension direction of the first arc extinguishing gate plates in the first arc extinguishing part, the plurality of first arc extinguishing gate plates in the second arc extinguishing part are arranged in an eighth direction, the eighth direction intersects with an extension direction of the first arc extinguishing gate plates in the second arc extinguishing part, the seventh direction intersects with the eighth direction, and the first arc extinguishing part is more adjacent to the first static contact than the second arc extinguishing part.

17. The power supply system according to claim 1, wherein the first arc extinguishing structure comprises the plurality of first arc extinguishing gate plates that are sequentially arranged at spacings, a first groove that is concave in a direction away from the movable contact is disposed at an end that is of the first arc extinguishing gate plate and that faces the movable contact, and the first end that is of the movable contact and that is away from the rotation center is located in the first groove, and is spaced from an inner wall of the first groove.

18. The power supply system according to claim 17, wherein the first end of the movable contact comprises:

a first movable contact plate; and a second movable contact plate that are arranged at a spacing, when the movable contact is connected to the first static contact, the first movable contact plate and the second movable contact plate are clamped on two sides of the first static contact and electrically connected to the first static contact, and a first extension part is disposed at an end that is of the first movable contact plate and that is away from the rotation center, and the first extension part extends into the first groove.

19. The power supply system according to claim 1, wherein the first arc extinguishing structure further comprises:

a first curved gate plate, a curvature center of the first curved gate plate is disposed away from the movable contact, and the first curved gate plate is configured to drive the first arc to move toward the first arc extinguishing structure, to improve an arc extinguishing effect, wherein the switch unit further comprises a first guide member, and the first guide member is located on a side that is of the first arc extinguishing structure and that is away from the movable contact, and is configured to discharge hot air generated by the first arc, wherein the switch unit further comprises a second arc extinguishing structure and a second static contact, the movable contact is configured to connect to or disconnect from the second static contact, when the switch unit is turned off, the movable contact is separated from the second static contact, to generate a second arc, the second arc extinguishing structure is located around the second static contact, and is configured to extinguish the second arc, the second arc extinguishing structure comprises a third arc extinguishing end part and a fourth arc extinguishing end part, a connection line between the third arc extinguishing end part and the rotation center of the movable contact is a fifth line, a connection line between the fourth arc extinguishing end part and the rotation center of the movable contact is a sixth line, an included angle between the fifth line and the sixth line is a third included angle, and an angle value of the third included angle is greater than or equal to the angle value of the first included angle, wherein the switch unit further comprises a connecting piece, and the connecting piece is connected between the second arc extinguishing end part and the fourth arc extinguishing end part, wherein the switch unit further comprises a housing, the first static contact, the second static contact, the movable contact, the first arc extinguishing structure, and the second arc extinguishing structure are located in the housing, the housing comprises a first side frame and a second side frame that are disposed opposite to each other in a first direction, the first side frame is disposed more adjacent to the first static contact than the second side frame, the second side frame is disposed more adjacent to the second static contact than the first side frame, when the switch unit is turned off, the first end of the movable contact moves toward the second side frame, a second end of the movable contact moves toward the first side frame, and the first arc extinguishing structure and the second arc extinguishing structure are located between the first side frame and the second side frame, wherein the switch unit further comprises a housing, the housing further comprises a first side panel and a second side panel that are disposed opposite to each other in a third direction, the movable contact, the first static contact, the second static contact, the first arc extinguishing structure, and the second arc extinguishing structure are located between the first side panel and the second side panel, the connecting piece is located on a side that is of the second side panel and that is away from the first side panel, and the second arc extinguishing end part and the fourth arc extinguishing end part penetrate through the second side panel to be electrically connected to the connecting piece.

20. A switch unit, wherein the switch unit is used in a switch, and the switch comprises:

a knob, the switch unit, and an operation mechanism connected between the knob and the switch unit, the knob is configured to control, by using the operation mechanism, the switch unit to be turned on or off, and the switch unit comprises:

a first static contact;

a movable contact, having a rotation center, wherein the movable contact is configured to rotate about the rotation center relative to the first static contact, the movable contact is configured to connect to or disconnect from the first static contact, and when the switch unit is turned off, the movable contact rotates about the rotation center relative to the first static contact by a first included angle to be separated from the first static contact, to generate a first arc;

a first arc extinguishing structure, located around the first static contact, and configured to extinguish the first arc, wherein the first arc extinguishing structure comprises a first arc extinguishing end part and a second arc extinguishing end part, a connection line between the first arc extinguishing end part and the rotation center of the movable contact is a first line, a connection line between the second arc extinguishing end part and the rotation center of the movable contact is a second line, an included angle between the first line and the second line is a second included angle, and an angle value of the second included angle is greater than or equal to an angle value of the first included angle.

* * * * *